(12) United States Patent
Sawai et al.

(10) Patent No.: US 10,688,388 B2
(45) Date of Patent: Jun. 23, 2020

(54) OPERATION APPARATUS

(71) Applicant: Sony Interactive Entertainment Inc., Tokyo (JP)

(72) Inventors: Kunihito Sawai, Kanagawa (JP); Yuichi Machida, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 167 days.

(21) Appl. No.: 16/079,421

(22) PCT Filed: Dec. 7, 2016

(86) PCT No.: PCT/JP2016/086400
§ 371 (c)(1),
(2) Date: Aug. 23, 2018

(87) PCT Pub. No.: WO2017/149888
PCT Pub. Date: Sep. 8, 2017

(65) Prior Publication Data
US 2019/0009172 A1    Jan. 10, 2019

(30) Foreign Application Priority Data

Mar. 4, 2016  (JP) ................................ 2016-042577

(51) Int. Cl.
*G05G 1/58*    (2008.04)
*A63F 13/98*   (2014.01)
(Continued)

(52) U.S. Cl.
CPC ............ *A63F 13/245* (2014.09); *A63F 13/24* (2014.09); *A63F 13/98* (2014.09); *G05G 1/00* (2013.01);
(Continued)

(58) Field of Classification Search
None
See application file for complete search history.

(56) References Cited

U.S. PATENT DOCUMENTS 5,796,354 A       8/1998  Cartabiano
2001/0035856 A1*  11/2001 Myers ..................... G06F 3/014
                                                             345/156
(Continued)

FOREIGN PATENT DOCUMENTS

JP        884858 A    4/1996
JP       3132531 U    6/2007
(Continued)

OTHER PUBLICATIONS

Extended European Search Report for corresponding EP Application No. 16892723.4, 7 pages, dated Jul. 8, 2019.
(Continued)

*Primary Examiner* — James S. McClellan
*Assistant Examiner* — Peter J Iannuzzi
(74) *Attorney, Agent, or Firm* — Matthew B. Dernier, Esq.

(57) ABSTRACT

An operation apparatus mountable to one hand of a user includes: a first operation section that is located on a front surface side and that can be operated by the thumb of the one hand; a second operation section that is located on a back surface side and that can be operated by a finger other than the thumb; and a first contact surface with which the palm of the one hand makes contact. At least one of the first contact surface and an extension plane of the first contact surface is inclined relative to a virtual plane in such a direction as to be spaced more therefrom in going in a first direction, the virtual plane being defined by the first direction from the front surface side toward the back surface side and a second direction being orthogonal to the first direction (Continued)

and directed from a bottom surface side toward a top surface side.

15 Claims, 33 Drawing Sheets

(51) Int. Cl.
*A63F 13/24* (2014.01)
*A63F 13/245* (2014.01)
*G06F 3/038* (2013.01)
*G05G 1/00* (2006.01)
*G06F 1/16* (2006.01)
*G06F 3/01* (2006.01)
*G06F 3/0346* (2013.01)
*G06F 3/0338* (2013.01)
*A63F 13/211* (2014.01)

(52) U.S. Cl.
CPC ............ *G05G 1/58* (2013.01); *G06F 1/1694* (2013.01); *G06F 3/014* (2013.01); *G06F 3/016* (2013.01); *G06F 3/038* (2013.01); *G06F 3/0346* (2013.01); *A63F 13/211* (2014.09); *G06F 3/0338* (2013.01); *G06F 2203/013* (2013.01); *G06F 2203/015* (2013.01)

(56) References Cited

U.S. PATENT DOCUMENTS

| | | | | |
|---|---|---|---|---|
| 2002/0175894 | A1* | 11/2002 | Grillo | G06F 3/014 |
| | | | | 345/156 |
| 2007/0279380 | A1* | 12/2007 | Murillo | G06F 3/014 |
| | | | | 345/161 |
| 2009/0131171 | A1 | 5/2009 | Miyazaki | |
| 2013/0207890 | A1* | 8/2013 | Young | G06F 3/014 |
| | | | | 345/156 |
| 2016/0342218 | A1* | 11/2016 | Burba | G06F 3/017 |
| 2017/0235364 | A1* | 8/2017 | Nakamura | G06F 3/016 |
| | | | | 345/156 |

FOREIGN PATENT DOCUMENTS

| | | |
|---|---|---|
| JP | 2009152337 A | 7/2009 |
| WO | 2014115541 A1 | 7/2014 |

OTHER PUBLICATIONS

International Search Report for corresponding PCT Application No. PCT/JP2016/086400, 4 pages, dated Feb. 21, 2017.
International Preliminary Report on Patentability and Written Opinion for corresponding PCT Application No. PCT/JP2016/086400, 15 pages, dated Sep. 13, 2018.

* cited by examiner

OPERATION APPARATUS

TECHNICAL FIELD

The present invention relates to an operation apparatus.

BACKGROUND ART

Hitherto, there has been known an operation apparatus that is connected to an information processing device such as a personal computer (PC) or a game machine and that transmits an operation signal to the information processing device (see, for example, PTL 1).

A controller (operation apparatus) described in PTL 1 includes a left side grasping section and a right side grasping section which are grasped by the left and right hands of a user, and direction buttons and operation buttons which are disposed at a front surface of the controller.

CITATION LIST

Patent Literature

[PTL 1] U.S. Patent Application Publication No. 2009/0131171

SUMMARY

Technical Problems

Meanwhile, the controller described in PTL 1 is one that is grasped by both hands, and therefore has a problem of limiting the movements of the left and right hands.

On the other hand, use of a controller mounted to one hand can be contemplated, but the controller has a problem of difficulty in operation depending on the shape of the controller.

It is an object of the present invention to solve at least some of the above-mentioned problems, and it is an object to provide an operation apparatus which is easy to operate.

An operation apparatus according to one mode of the present invention is an operation apparatus mountable to one hand of a user. The operation apparatus includes a casing, an operation section that is provided on the casing and that can be operated by the one hand, and a mounting member by which the casing is mounted to the one hand. The mounting member includes an attachment member attached to the casing, and a band member that is attached to the attachment member and that is wound along a palm and a back of the one hand. The band member includes a main body member, a belt-shaped member that is connected to the main body member at one end thereof and that is wound around the one hand, a sliding mechanism to which the main body member and the other end of the belt-shaped member are connected, and which slides relative to the main body member to extend or contract an inside circumference size of the band member, and a locking member that locks the sliding mechanism in a state in which the inside circumference size has been contracted by sliding of the sliding mechanism.

Solution to Problems

An operation apparatus according to one mode of the present invention is an operation apparatus mountable to one hand of a user. The operation apparatus includes a first operation section that is located on a front surface side and that can be operated by a thumb of the one hand, a second operation section that is located on a back surface side and that can be operated by a finger other than the thumb of the one hand, and a first contact surface with which a palm of the one hand makes contact. At least one of the first contact surface and an extension plane of the first contact surface is inclined relative to a virtual plane in such a direction as to be spaced more therefrom in going in a first direction, the virtual plane being defined by the first direction from the front surface side toward the back surface side and a second direction being orthogonal to the first direction and directed from a bottom surface side toward a top surface side.

According to the configuration as above, an operation apparatus that is easy to operate with one hand can be configured.

DESCRIPTION OF EMBODIMENT

One embodiment of the present invention will be described below, based on the drawings.

General Configuration of Information Processing System

Figure 1:
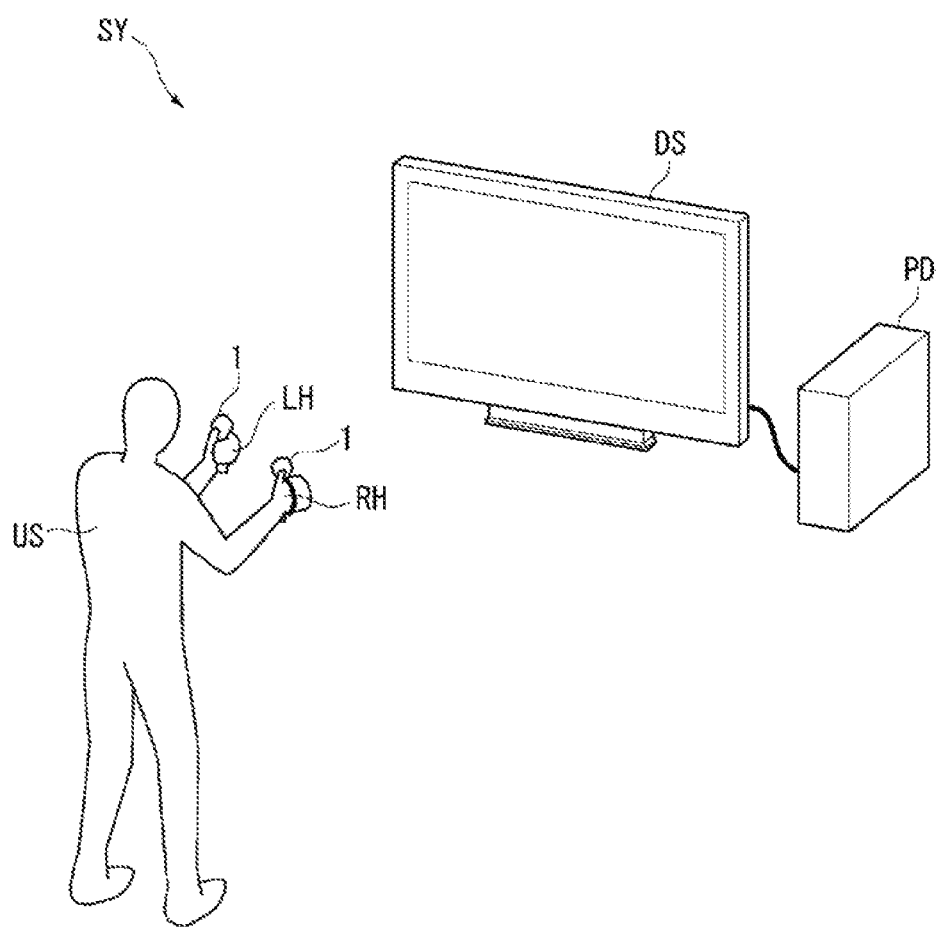
FIG. 1 is a schematic view depicting an information processing system according to an embodiment of the present invention.

FIG. 1 is a schematic view depicting an information processing system SY according to the present embodiment.

The information processing system SY according to the present embodiment includes an information processing device such as a game machine or a PC, an image display device DS for displaying the results of processing by the information processing device PD, and at least one operation apparatus 1 that performs communication with the information processing device and transmits operation information according to operations by a user US.

Among these, the information processing device PD receives operation information transmitted from the operation apparatus 1 by a predetermined communication system, executes processing of a game or the like based on the operation information, and transmits the processing results to the image display device DS, to cause the processing results to be displayed. Also, the information processing device PD detects the position of light output from the operation apparatus 1, and executes such processing as determining the position of the operation apparatus 1 according to the position of the light. Further, the information processing device PD is configured to be able to set the color of the light output by the operation apparatus 1 and be able to determine who of the users US possesses the relevant operation apparatus 1 by detecting the color.

In other words, in the information processing system SY according to the present embodiment, a plurality of the operation apparatuses 1 that perform communication with the information processing device PD may be present, one user US may utilize at least one operation apparatus 1, and a plurality of users US may individually utilize at least one operation apparatus 1.

General Configuration of Operation Apparatus

Figure 2:
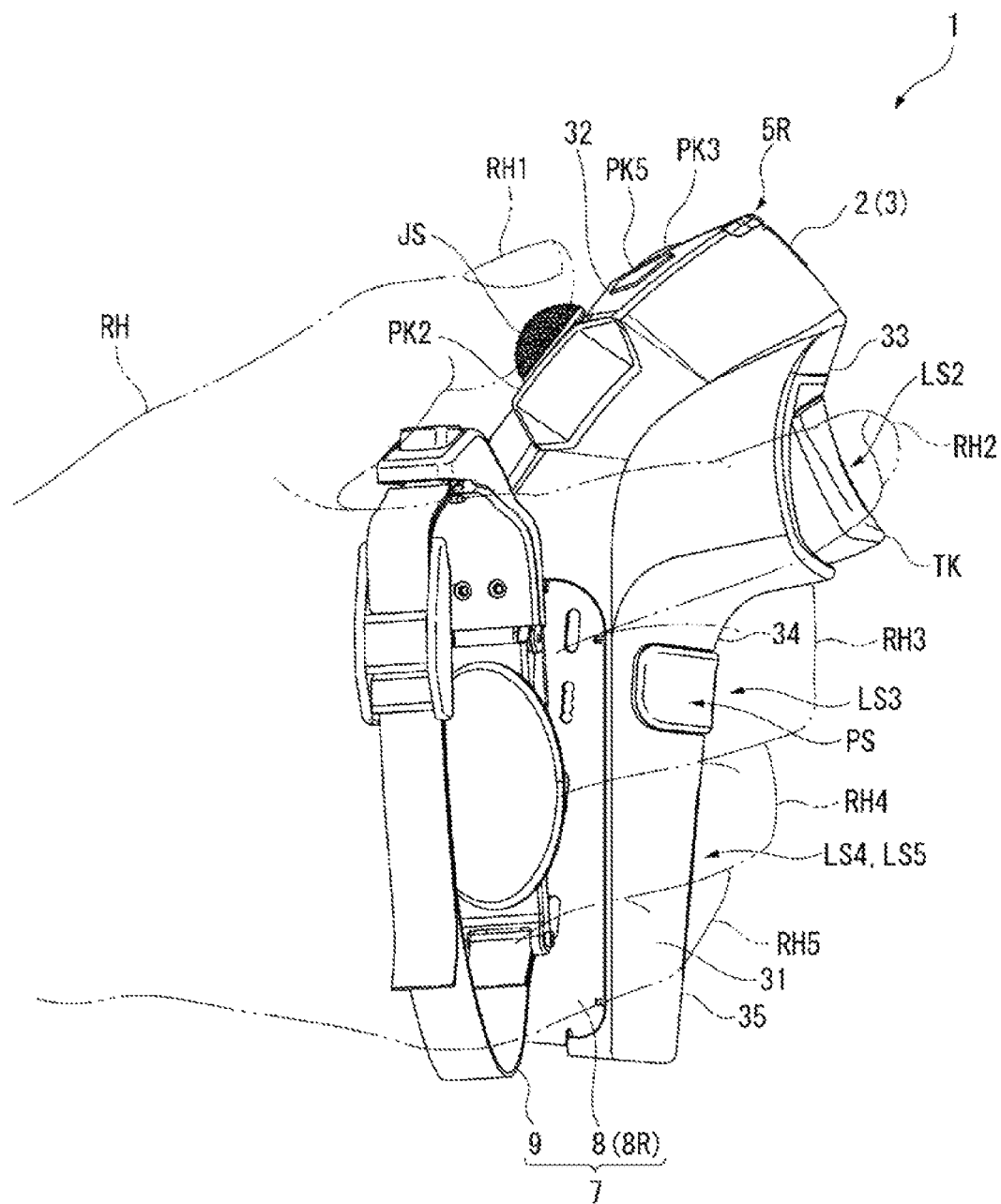
FIG. 2 is a side view depicting an operation apparatus mounted to a user's right hand in the embodiment.
Figure 3:
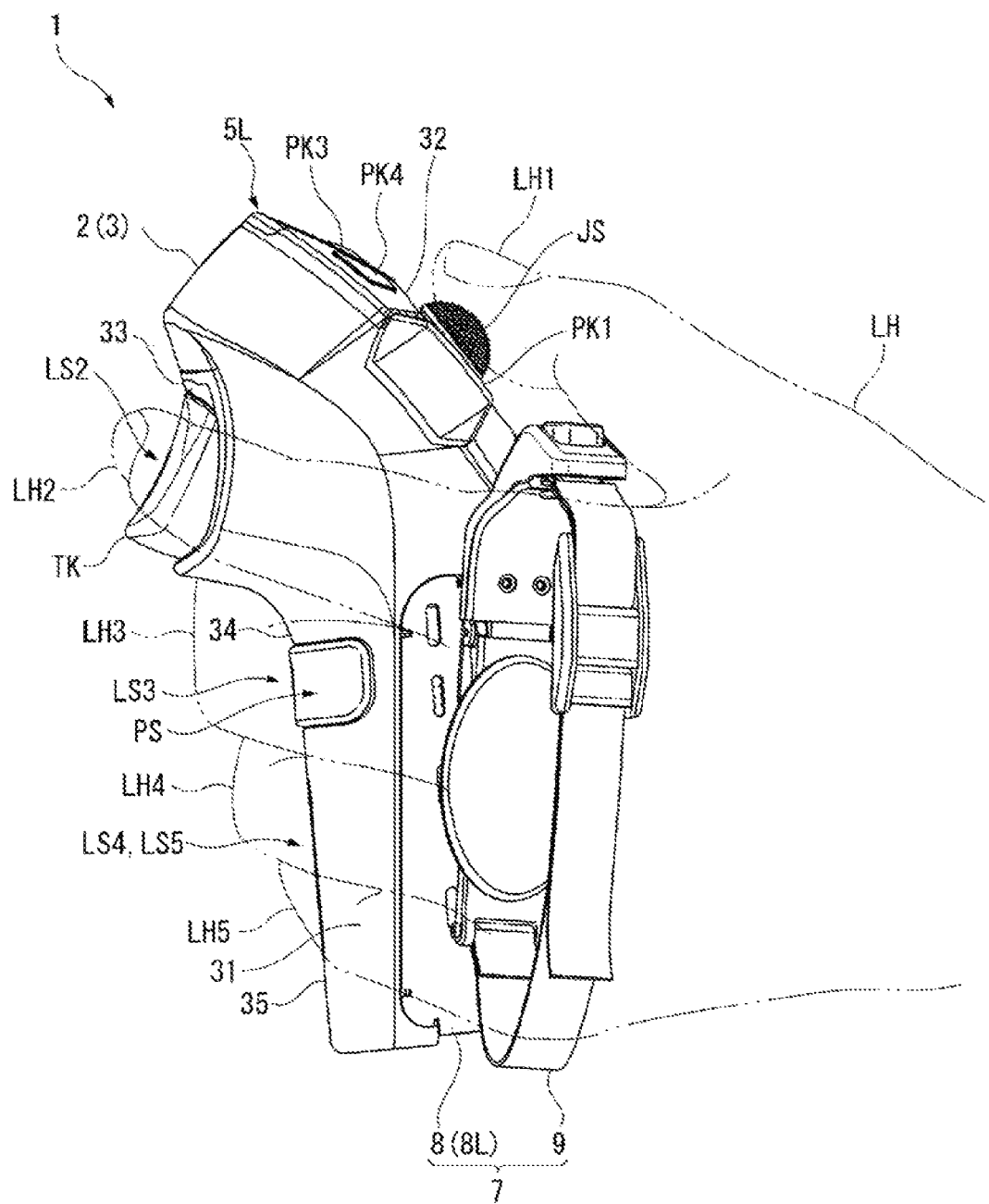
FIG. 3 is a side view depicting the operation apparatus mounted to the user's left hand in the embodiment.
Figure 4:
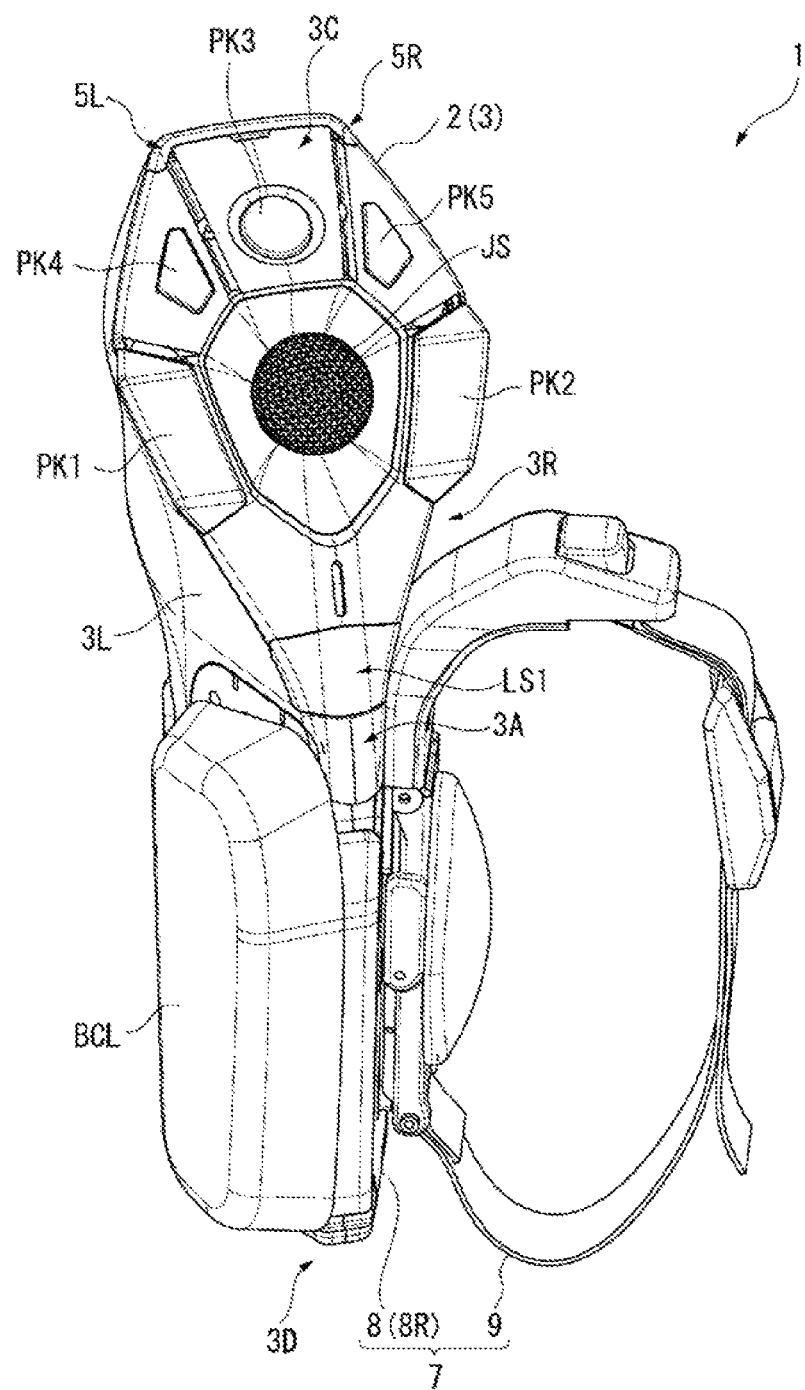
FIG. 4 is a perspective view, as viewed from a front side, of the operation apparatus wherein a mounting member is attached to a right side of an apparatus main body in the embodiment.
Figure 5:
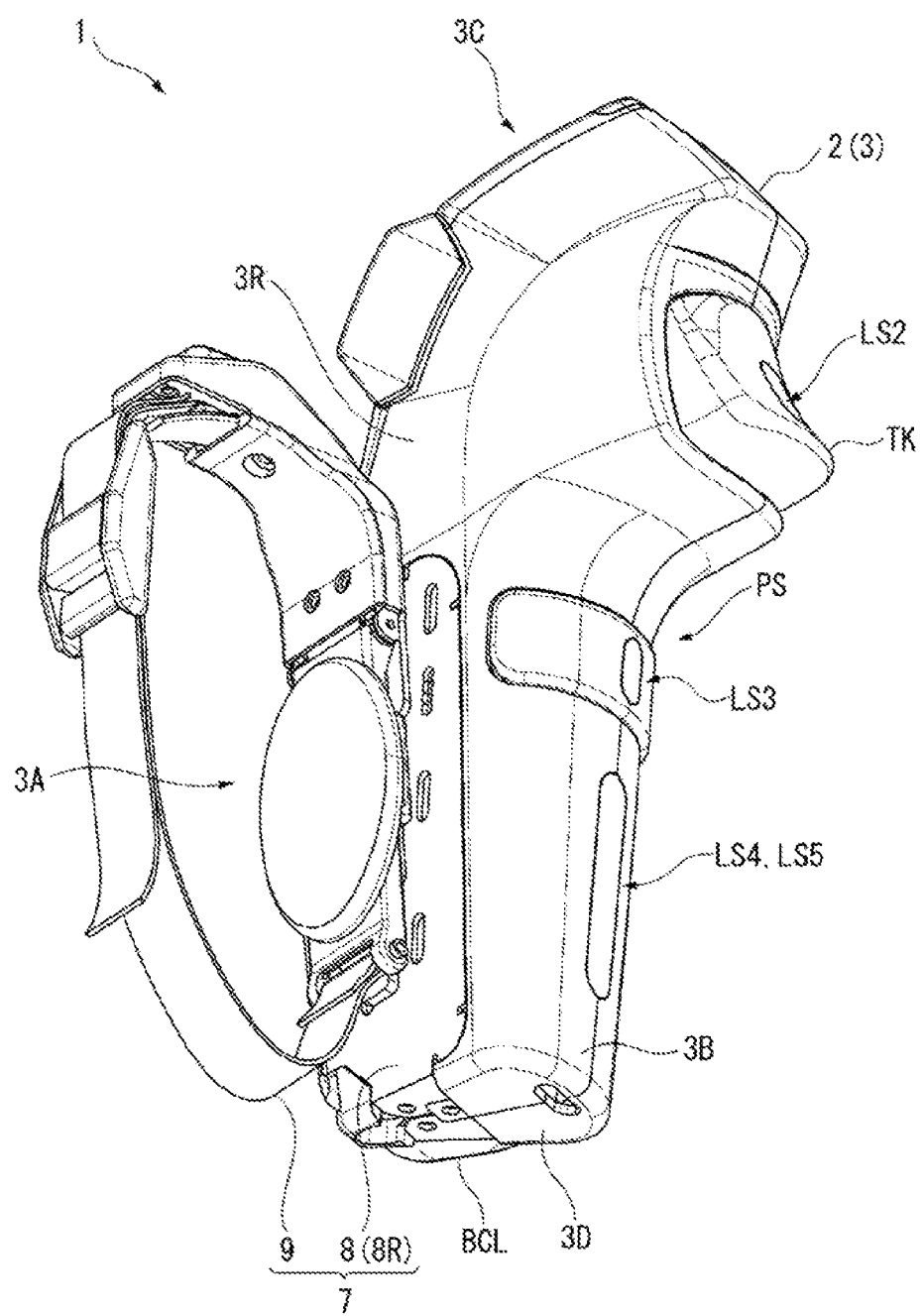
FIG. 5 is a perspective view, as viewed from a back side, of the operation apparatus wherein the mounting member is attached to the right side of the apparatus main body in the embodiment.

FIG. 2 is a side view depicting the operation apparatus 1 mounted to the right hand RH of a user US, and FIG. 3 is a side view depicting the operation apparatus 1 mounted to the left hand LH. In addition, FIGS. 4 and 5 are perspective views, as viewed from a front side and a back side, of the operation apparatus 1 wherein a mounting member 7 is attached to a right side of an apparatus main body 2.

As depicted in FIGS. 1 to 3, the operation apparatus 1 is used in the state of being mounted to one hand (at least one of the right hand RH and the left hand LH) of the user US, detects movements of the user's hand and/or fingers and the like, and transmits operation information according to the detection results to the information processing device PD. As depicted in FIGS. 2 to 5, the operation apparatus 1 includes the apparatus main body 2, the mounting member 7 which is attached to a right side surface 3R or a left side surface 3L of a casing 3 constituting the apparatus main body 2 and by which the apparatus main body 2 is mounted to the one hand of the user US, and battery cases BCL and BCR (for the battery case BCR, see FIG. 13) attached to that side surface of the apparatus main body 2 which is located on the side opposite to the mounting member 7. In the operation apparatus 1 having such a configuration, the apparatus main body 2 is mounted to the one hand by the mounting member 7, and, therefore, the state of mounting of the operation apparatus 1 to the one hand can be maintained even in the case where all the fingers are put off the apparatus main body 2.

While details will be described later, the operation apparatus 1 configured as above is firstly characterized in that extension planes EPL and EPR (see FIG. 33) of contact surfaces 951A brought into contact with the user's palm are inclined relative to a center plane CP of the casing 3 constituting the apparatus main body 2. This ensures that the operation apparatus 1 is easy to grasp with one hand.

In addition, the operation apparatus 1 is secondly characterized by a configuration wherein of the attachment member 8 and the band member 9 constituting the mounting member 7, the attachment position of the band member 9 in relation to the attachment member 8 attached to the apparatus main body 2 (casing 3) can be adjusted. This realizes an easy operation independent of the size of the hand to which the operation apparatus 1 is mounted.

Further, the operation apparatus 1 is thirdly characterized by a configuration wherein at the time of mounting it to one hand, additional fastening can be performed in a state in which the band member 9 is mounted along the palm and the back of the hand. This enhances the degree of close contact of the operation apparatus 1 to the one hand, and enhances the accuracy in detection of a user's operation and the mounting feeding of the operation apparatus 1.

Each of the configurations of the operation apparatus 1 by which the first to third characteristics are realized will be described below. Note that the operation apparatus 1 need not have all of the first to third characteristics, and an operation apparatus that realizes at least one of the first to third characteristics can also be configured.

Configuration of Apparatus Main Body

Figure 6:
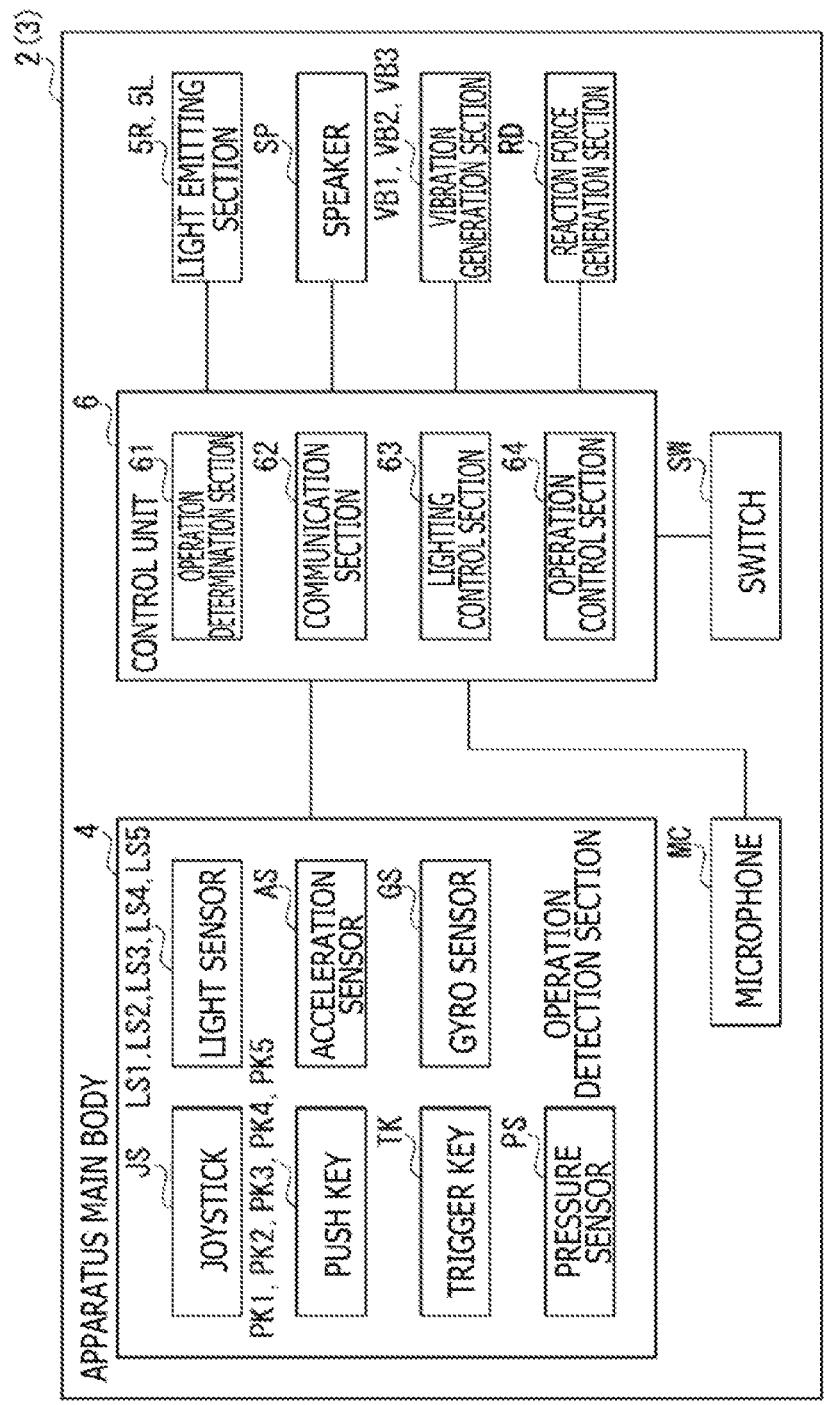
FIG. 6 is a block diagram depicting the configuration of the apparatus main body in the embodiment.

FIG. 6 is a block diagram depicting the configuration of the apparatus main body 2.

As depicted in FIG. 6, the apparatus main body 2 includes a casing 3 that constitutes an armor, an operation detection section 4 disposed in the casing 3, light emitting sections 512 and 5L and a switch SW, and a microphone MC, a speaker SP, three vibration generation sections VB1 to VB3, a reaction force generation section RD and a control unit 6 which are disposed in the casing 3. The operation detection section 4, the light emitting sections 5R and 5L, the switch SW, the microphone MC, the speaker SP and the vibration generation sections VB1 to VB3 are connected to the control unit 6 by signal wires.

Of these components, the operation detection section 4 detects a user's operation. For example, the operation detection section 4 detects a pressing operation by a user's finger, a tilting operation of the finger, and a movement of the user's hand to which the operation apparatus 1 is mounted. Such an operation detection section 4, in the present embodiment, includes a joystick JS, push keys PK1 to PK 5, a trigger key TK, a pressure sensor PS, a light sensors LS1 to LS5, an acceleration sensor AS and a gyro sensor GS. However, these components are not limitative, and the operation detection section 4 need not have all of these. For example, some of them may be lacking, and other detection sections may be provided.

While the details will be described later, the light emitting sections 5L and 5R are disposed on the left side and the right side of an upper portion of the casing 3, and are turned ON under control by the control unit 6.

The switch SW detects the presence/absence of mounting of the attachment member 8 (8R), which constitutes the mounting member 7, to the casing 3. Based on the results of detection by the switch SW, the control unit 6 grasps the attachment position of the mounting member 7.

The microphone MC outputs to the control unit 6 an audio signal according to a voice or sound in the exterior of the operation apparatus 1.

The speaker SP outputs a voice or sound according to the audio signal input from the control unit 6.

The vibration generation sections VB1 to VB3 each have an actuator such as a motor for generating a vibration, and are each driven to generate a vibration under control by the control unit 6.

The reaction force generation section RD has an actuator such as a motor driven under control by the control unit 6, and generates a reaction force against pressing of the trigger key TK by the user.

The control unit 6 controls operations of the apparatus main body 2, and is configured as a control unit in which circuit elements such as an arithmetic processing circuit are disposed. The control unit 6 includes an operation determination section 61, a communication section 62, a lighting control section 63 and an operation control section 64.

The operation determination section 61 determines the kind of an input operation conducted on the apparatus main body 2 by the user, based on an operation signal input from the operation detection section 4.

The communication section 62 performs communication with the above-mentioned information processing device PD, and transfers information between itself and the information processing device PD. In the present embodiment, the communication section 62 is composed of a module that can perform communication with the information processing device PD by at least one of a communication system according radio local area network (LAN) communication standard, such as Institute of Electrical and Electronics Engineers (IEEE) 802.11 (for example, IEEE 802.11a/b/g/n/ac), and short-range radio communication standard, such as Bluetooth (registered trademark). The communication section 62 transmits, for example, operation information according to the results of determination by the operation determination section 61 to the information processing device PD. This operation information includes also audio information according to the voice or sound detected by the microphone MC.

When transmitting such operation information, the communication section 62 determines whether the operation apparatus 1 is being utilized as a right-use operation apparatus or a left-use operation apparatus, based on the ON/OFF state of the switch SW, and transmits mounting information based on the determination results. Specifically, when the switch SW is determined to be in an ON state, the communication section 62 determines that the attachment member 8 is attached to the right side surface 3R and the operation apparatus 1 is being utilized as a right-use operation apparatus, and transmits the mounting information indicative of the determination results together with the above-mentioned operation information. On the other hand, when the switch SW is determined to be in the OFF state, the communication section 62 determines that the attachment member 8 is attached to the left side surface 3L and the operation apparatus 1 is being utilized as a left-use operation apparatus, and transmits the mounting information indicative of the determination results together with the above-mentioned operation information.

The lighting control section 63 controls turning-ON of the light emitting sections 5L and 5R. Specifically, the lighting control section 63 turns ON the light emitting section 5R in a predetermined color, in the case where the operation apparatus 1 is determined to be being utilized as a right-use operation section, based on the ON/OFF state of the switch SW, in the same manner as the communication section 62. Besides, in the case where the operation apparatus 1 is determined to be being utilized as a left-use operation apparatus, the lighting control section 63 turns ON the light emitting section 5L in a predetermined color. The lighting colors of the light emitting sections 5L and 5R may be preliminarily set by the user, as above-mentioned, or may be set according to information received from the information processing device PD through the communication section 62, or may be prescribed colors.

The operation control section 64 controls operations of the vibration generation sections VB1 to VB3 and the reaction force generation section RD. For instance, the operation control section 64 outputs to the speaker SP a voice or sound according to the audio information contained in the information received from the information processing device PD. In addition, the operation control section 64 causes the vibration generation sections VB1 to VB3 and the reaction force generation section RD to operate according to driving signals contained in the received information.

Note that in the following description, a depth direction from a front surface 3A toward a back surface 3B side of the casing 3 will be referred to as +Z direction (corresponding to a first direction in the present invention), and a height direction that is orthogonal to the +Z direction and that is from a bottom surface 3D toward a top surface 3C of the casing 3 will be +Y direction (corresponding to a second direction in the present invention). Further, a left-right direction that is orthogonal to the +Y direction and the +Z direction and that is from a right side surface 3R toward a left side surface 3L of the casing 3 will be +X direction. In other words, the direction in which each of fingers RH2 to RH5 extends in a state wherein the fingers of the right hand RH to which the operation apparatus 1 is mounted are extended is the +Z direction, the direction which is orthogonal to the +Z direction and in which the thumb RH1 extends is the +Y direction, and the direction that is orthogonal to the +Z direction and the +Y direction and that is from the right side toward the left side is the +X direction. In addition, the direction opposite to the +Z direction is referred to as a −Z direction. The same applies also to a −X direction and a −Y direction.

Configuration of Casing

FIGS. 7 to 11 individually depict a right side view, a left side view, a front view, a back elevation and a bottom view of the apparatus main body 2.

Figure 7:
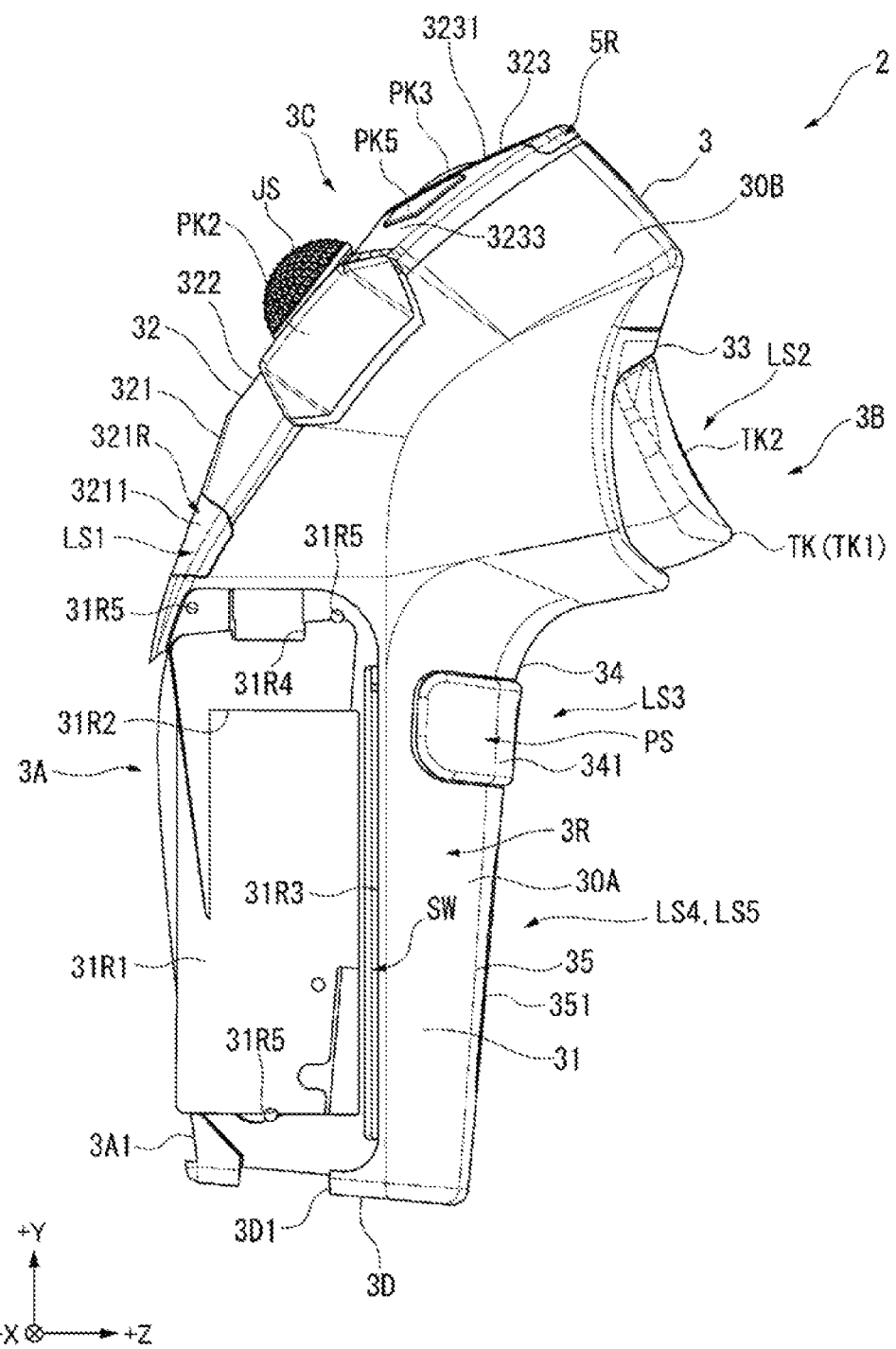
FIG. 7 is a right side view depicting the apparatus main body in the embodiment.
Figure 8:
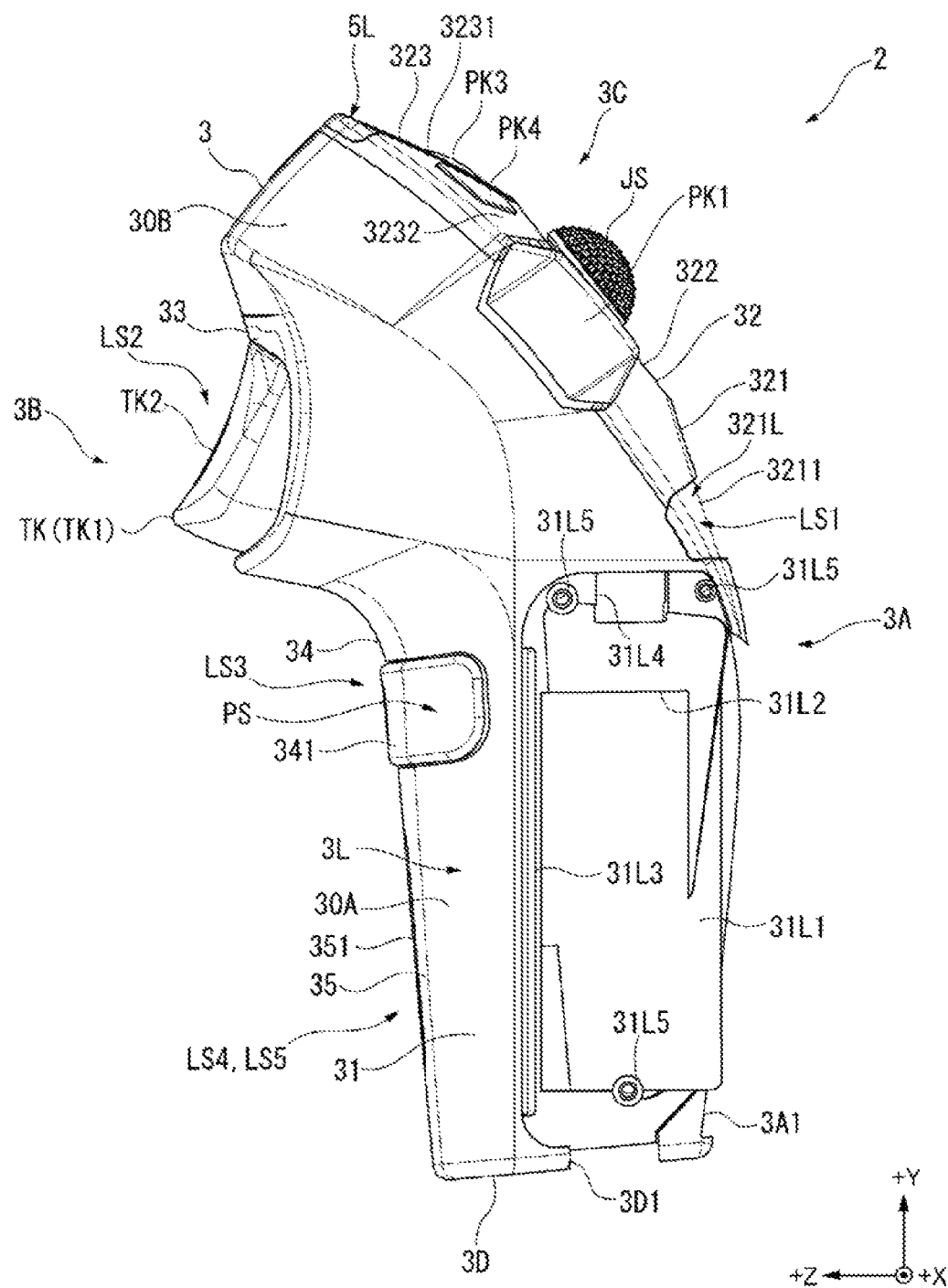
FIG. 8 is a left side view depicting the apparatus main body in the embodiment.

The casing 3 is a synthetic resin-made casing that constitutes an armor of the apparatus main body 2. As depicted in FIGS. 7 to 11, the casing 3 has the front surface 3A, the back surface 3B, the top surface 3C, the bottom surface 3D, the left side surface 3L and the right side surface 3R, and is formed to be symmetrical about a center plane CP (FIGS. 9 to 11) that passes through the center in regard of the +X direction and lies along the YZ plane, or in left-right symmetry. As depicted in FIGS. 7 and 8, the casing 3 is formed in an inverted L shape as viewed from the +X direction side and the −X direction side. More in detail, the casing 3 has a shape of extending from the bottom surface 3D along the +Y direction and then being inclined at approximately 60 degrees toward the +Z direction side, in relation to the +Y direction.

As depicted in FIGS. 7 to 11, the casing 3 as above has a configuration wherein a lower casing portion 30A and an upper casing portion 30B are integrally formed. The lower casing portion 30A is a columnar portion which constitutes a lower portion (a portion on the −Y direction side) of the casing 3 and whose section in the YZ plane is formed in a substantially trapezoidal columnar shape. In addition, the upper casing portion 30B is an inclined portion that constitutes an upper portion (a portion on the +Y direction side) of the casing 3 and that is inclined to the +Z direction side while being erected in the +Y direction from the lower casing portion 30A. Besides, the lower casing portion 30A constitutes the front surface 3A and the bottom surface 3D, and constitutes respective lower-side portions of the back surface 3B, the left side surface 3L and the right side surface 3R. On the other hand, the upper casing portion 30B constitutes the top surface 3C, and constitutes respective upper-side portions of the back surface 3B, the left side surface 3L and the right side surface 3R. The vertical sizes (the sizes in the +Y direction) of the lower casing portion 30A and the upper casing portion 30B are substantially the same, but the width size (the size along the +X direction) of the lower casing portion 30A is smaller than the width size of the upper casing portion 30B.

The lower casing portion 30A is the columnar portion having a substantially trapezoidal sectional shape as abovementioned, and it is so formed that, while the width size (the size in the +X direction) thereof on the front surface 3A side is substantially constant, the width size on the back surface 3B side increases in going from an end portion on the lower side (namely, the bottom surface 3D) toward the upper side (+Y direction side). The shape on the back surface 3B side of the lower casing portion 30A is an arcuate shape wherein a central portion in regard of the width direction (+X direction) is projecting toward the depth side (+Z direction side). In addition, when the operation apparatus 1 is mounted to one hand of a user, the upper end on the front surface 3A side (an end portion on the +Y direction side) of the lower casing portion 30 is located at a position according to the root of the thumb, whereas the upper end on the back surface 3B side is located at a position between the index finger and the middle finger. From these upper ends, the upper casing portion 30B is erected.

At left and right portions of the lower casing portion 30A as above, attachment portions 31L1 and 31R1 which will be described later are located; in addition, at portions on the back surface 3B side, operation sections 34 and 35 which will be described later are located.

A portion on the front surface 3A side of the upper casing portion 30B is erected to the upper side while inclining toward the depth side (+Z direction side) from an upper end on the front surface 3A side of the lower casing portion 30A, and, similarly, a portion on the back surface 3B side is erected to the upper side while inclining toward the depth side from an upper end on the back surface 3B side of the lower casing portion 30A. In addition, of the upper casing portion 30B, the inclination angle (in the present embodiment, approximately 60 degrees) relative to the +Y direction of a portion on the front surface 3A side (specifically, a second inclined portion 322 which will be described later) is smaller than the inclination angle (in the present embodiment, approximately 70 degrees) relative to the +Y direction of a portion on the back surface 3B side. These inclination angles can be changed as required.

Note that portions on the sides of the left side surface 3L and the right side surface 3R of the upper casing portion 30B are erected upward while inclining to the left side (+X direction side) and the right side (−X direction side), respectively, from the upper end of the lower casing portion 30A.

A surface oriented to the +Y direction side of the upper casing portion 30B as above is the top surface 3C; an operation section 32 which will be described later is located at the top surface 3C, and an operation section 33 which will be described later is located at a portion on the back surface 3B side.

As depicted in FIGS. 3 and 7 to 11, the casing 3 as above has a grasping section 31 and the operation sections 32 to 35.

The grasping section 31 is located at that part of the lower casing portion 30A which can be grasped by one hand of the user. To be more specific, the grasping section 31 is that part of the lower casing portion 30A which can be grasped by the palm, the ring finger and the little finger, or the like. The configuration of the grasping section 31 will be described in detail later.

Configuration of Operation Section

Figure 9:
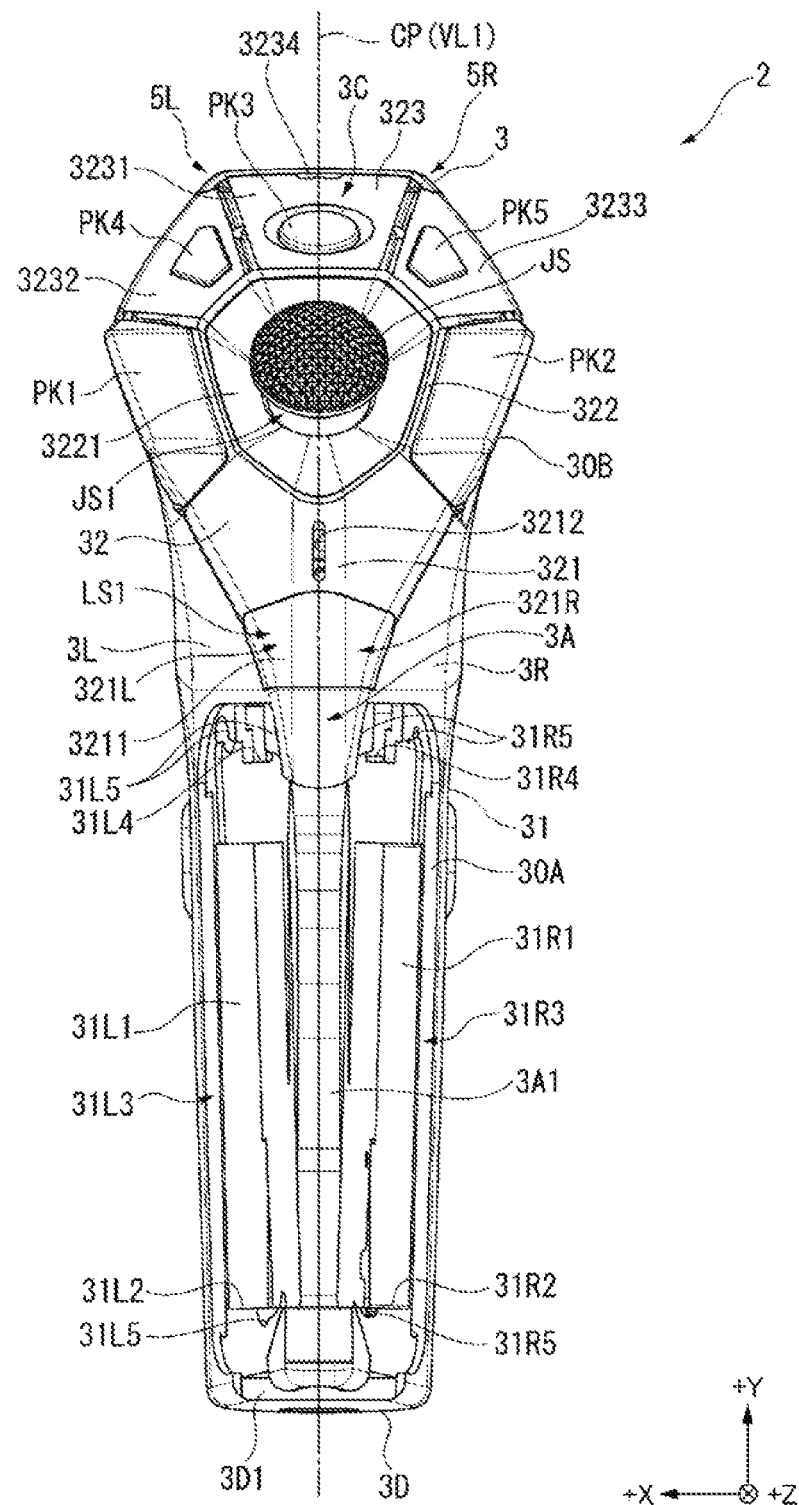
FIG. 9 is a front view depicting the apparatus main body in the embodiment.

The operation section 32 corresponds to a first operation section in the present invention; as depicted in FIGS. 2 and 3, it is located at that part of the upper casing portion 30B which can be operated by the thumb (either of the thumbs RH1 and LH1) of the user. Specifically, as depicted in FIGS. 7 to 9, the operation section 32 is located at the top surface 3C, which is inclined to the +Z direction side in relation to the +Y direction, of the casing 3. The operation section 32 (or the top surface 3C) is formed in a substantially vertically elongated hexagonal shape in front view. Such an operation section 32 as this has a first inclined portion 321, the second inclined portion 322 and a third inclined portion 323 which differ in inclination angle to the +Z direction side in relation to the +Y direction.

The first inclined portion 321 is that portion of the operation section 32 which is located on the most −Y direction side, and, as depicted in FIGS. 7 and 8, it is inclined at approximately 20 degrees to the +Z direction side in relation to the +Y direction. The first inclined portion 321 is inclined in a gradually curved shape to the +Z direction side and the −Y direction side, in going in the +X direction side and the −X direction side from the center in regard of the +X direction. At that part of the first inclined portion 321 which is on the −Y direction side, namely, at a position according to a proximal phalanx between the joint and the root of the thumb, there is disposed a light sensor LS1 that detects the inclination position of the thumb toward the +Z direction side, as depicted in FIGS. 7 to 9. The light sensor LS1 emits detection light such as infrared light radiation toward the outside, and detects the quantity of detection light impinging on and reflected by the thumb, which is an object of detection. The light sensor LS1 is composed of a sensor which is located on the +X direction side and of which the emission direction of the detection light is inclined to the +X direction side in relation to the −Z direction, and a sensor which is located on the −X direction side and of which the emission direction of the detection light is inclined toward the −X direction side in relation to the −Z direction. The light quantity detected by these sensors is output to the control unit 6 by the light sensor LS1, and the control unit 6 analyzes the position of the thumb on the basis of the light quantity. Note that the light sensor LS1 is covered with a cover 3211 which permits transmission of the detection light therethrough. Of the two sensors constituting the light sensor LS1, one is disposed at a surface 321L which is inclined to the +Z direction side and the −Y direction side in going in the +X direction side, whereas the other is disposed on a surface 321R which is inclined to the +Z direction side and the −Y direction side in going toward the −X direction side. By this, the range of detection of the thumb by the sensors disposed in the inclined state as above-mentioned can be enlarged, and the position of the thumb, which can be inclined not only to the front and rear sides but also to the left and right sides more than the fingers, can be detected appropriately.

In addition, at that part of the first inclined portion 321 which is on the +Y direction side, there is formed a hole 3212 through which a voice or sound from the speaker SP is output to the exterior.

Note that the first inclined portion 321 need not be inclined in the curved surface shape as above-mentioned; for example, like the third inclined portion 323, the first inclined portion 321 may be configured to have a plurality of flat surfaces, which are inclined to the +Z direction side and the −Y direction side by predetermined angles.

As depicted in FIGS. 7 to 9, the second inclined portion 322 is a portion located on the +Y direction side from the first inclined portion 321, and is inclined at approximately 40 degrees to the +Z direction side in relation to the +Y direction, as depicted in FIGS. 7 and 8. Unlike the first inclined portion 321 and the third inclined portion 323, the second inclined portion 322 is formed to be substantially flat, exclusive of a position where a recess 3221 which will be described later is formed. Specifically, both ends in regard of the +X direction of the second inclined portion 322 are projecting to the −Z direction side and the +Y direction side, as compared to both ends in regard of the +X direction of the first inclined portion 321 and the third inclined portion 323. This, however, is not limitative, the second inclined portion 322 may not be formed to be substantially flat, and, like the first inclined portion 321 and the third inclined portion 323, the second inclined portion 322 may be inclined to the +Z direction side and the −Y direction side in going toward the +X direction side and the −X direction side from the center in regard of the +X direction.

As depicted in FIG. 9, the second inclined portion 322 is formed in a substantially inverted trapezoidal shape in front view, and the joystick JS is disposed in the center of the second inclined portion 322. The joystick JS has a shaft portion JS1 which is substantially orthogonal to the second inclined portion 322, and the shaft portion JS1 can be tilted to the front and rear sides and the left and right sides (±Z directions and ±X directions). The joystick JS detects the tilting direction of the shaft portion JS1, and outputs the detection results to the control unit 6. The joystick JS as a whole is configured to be capable of projection and depression relative to the second inclined portion 322, and when an operation of depressing the joystick JS is conducted, a push key (not depicted) disposed on the back side of the joystick JS is depressed. By the push key, a pressing operation on the joystick JS is detected. Note that the second inclined portion 322 is provided in the periphery of the joystick JS with a recess 3221 which is recessed to the inside, whereby a tilting amount of the shaft portion JS1 is secured. In addition, at those positions on the second inclined portion 322 on the left and right sides (±X direction sides) of the joystick JS, there are disposed push keys PK1 and PK2 which each have a parallelogram key top. These push keys PK1 and PK2 output operation signals according to input operations to the control unit 6.

As depicted in FIGS. 7 to 9, the third inclined portion 323 is a portion located on the +Y direction side from the second inclined portion 322, and it is inclined at approximately 60 degrees to the +Z direction side in relation to the +Y direction, as depicted in FIGS. 7 and 8. The third inclined portion 323 is formed in a trapezoidal shape in front view, and push keys PK3 to PK5 and light emitting sections 5L and 5R are disposed at the third inclined portion 323.

Of the push keys PK3 to PK5, the push key PK3 is disposed substantially in the center of the third inclined portion 323, and has a key top which is circular in front view. In addition, the push keys PK4 and PK5 are disposed at positions on the left and right sides (±X direction sides) of the push key PK3, and each have a key top which is pentagonal in front view. Like the push keys PK1 and PK2, these push keys PK3 to PK5 output operation signals according to input operations to the control unit 6.

Note that as depicted in FIG. 9, the third inclined portion 323 includes an inverted trapezoidal disposing surface 3231 at which the push key PK3 is disposed, an inverted trapezoidal surface 3232 at which the push key PK4 is disposed, and an inverted trapezoidal surface 3233 at which the push key PK5 is disposed. While these surfaces 3231 to 3233 are flat surfaces, and the surfaces 3232 and 3233 are inclined in the same direction in relation to the surface 3231. Specifically, the surface 3232 is inclined to the +Z direction side and the −Y direction side in going in the +X direction, whereas the surface 3233 is inclined to the +Z direction side and the −Y direction side in going toward the −X direction side. This ensures such a layout that the push keys PK3 to PK5 to be operated (depressed) by a tip portion of the thumb can be easily operated.

Note that an end portion on the +X direction side of the third inclined portion 323 may not be inclined as above-mentioned, and may entirely be formed flat. On the other hand, the third inclined portion 323 may be formed in a curved surface shape, like the above-mentioned first inclined portion 321.

The light emitting sections 5L and 5R individually have solid-state light sources such as light emitting diodes (LEDs), and are disposed on the left and right sides of an upper end (an end portion on the +Y direction side) of the third inclined portion 323.

These light emitting sections 5L and 5R are controlled as to turning-ON thereof by the control unit 6. For example, in the case where the mounting section 7 is attached to the right side surface 3R, the operation apparatus 1 becomes a right-use operation apparatus, so that the light emitting section 5R is turned ON by the control unit 6. On the other hand, in the case where the mounting section 7 is attached to the left side surface 3L, the operation apparatus 1 becomes a left-use operation apparatus, so that the light emitting section 5L is turned ON by the control unit 6. The lighting colors of these light emitting sections 5L and 5R are set by the control unit 6. In addition, at that part of the third inclined portion 323 which is on the upper side (+Y direction side) relative to the push key PK3, there is formed a microphone hole 3234, as depicted in FIG. 9, and a microphone MC is disposed in the casing 3 at a part corresponding to the microphone hole 3234.

In this way, the operation section 32 is in left-right symmetry in shape, with the center plane CP as a center of symmetry, and the layout of the joystick JS, the push keys PK1 to PK5 and the light sensor LS1 is also in left-right symmetry. Specifically, the joystick JS and the push key PK3 are included in the center plane CP, together with the hole 3212 and the microphone hole 3234, and are disposed on a virtual line VL1 along the vertical direction (±Y direction). Besides, the push keys PK2 to PK5, the sensors of the light sensor LS1 and the light emitting sections 5L and 5R are disposed in left-right symmetry with respect to the virtual line VL1.

At least one of the operation sections 33 to 35 corresponds to a second operation section in the present invention.

Figure 10:
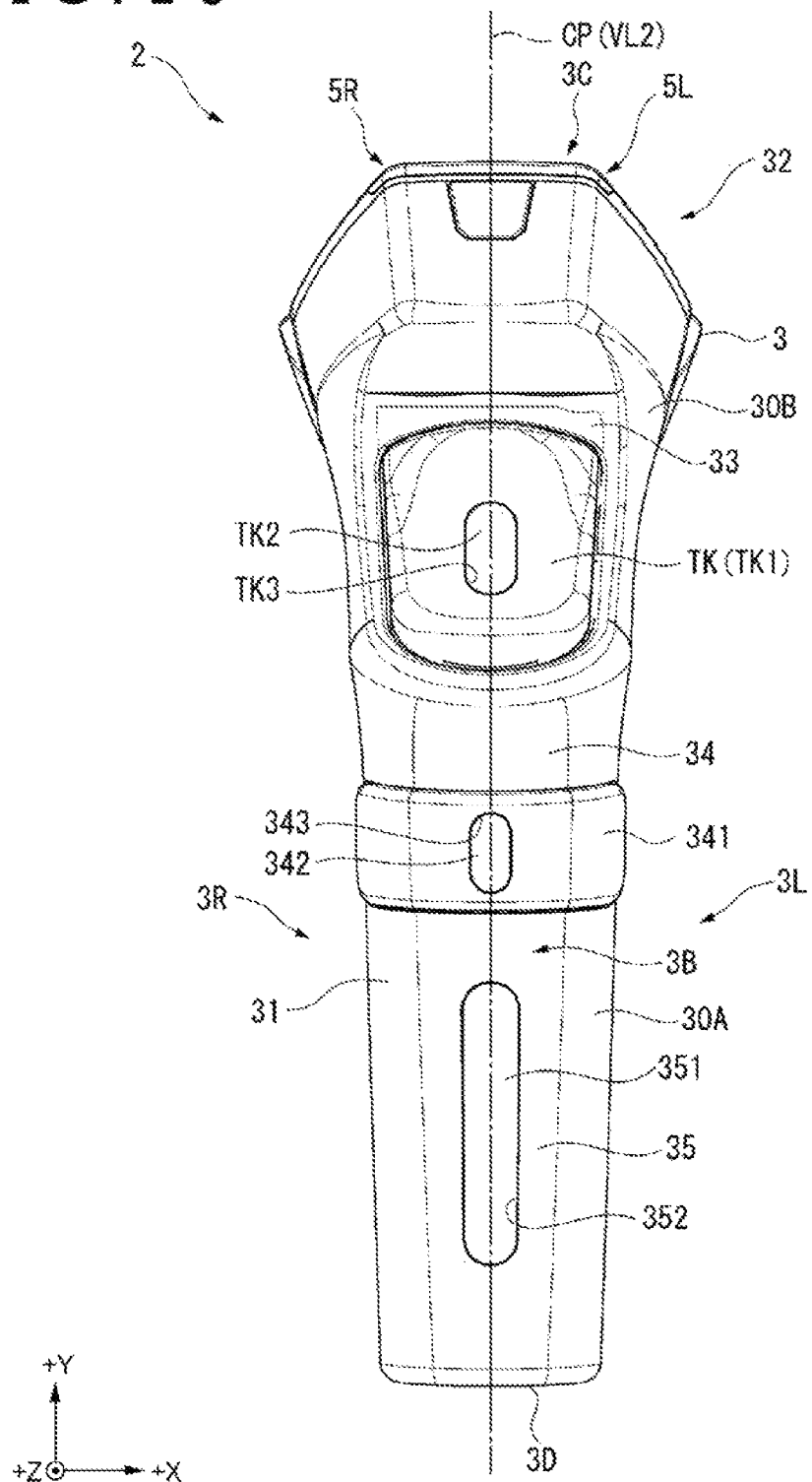
FIG. 10 is a back elevation depicting the apparatus main body in the embodiment.

As depicted in FIGS. 2 and 3, the operation section 33 is located at that part of the upper casing portion 30B which is on the back surface 3B side and at a part capable of being operated by the index finger (either of the index fingers RH2 and LH2) of the user. Specifically, as depicted in FIGS. 7, 8 and 10, the operation section 33 is located at that part of the back surface 3B of the casing 3 which is on the upper side (at a part further on the lower side relative to a part inclined downward in going toward the depth side from the upper end of the top surface 3C), and is located at a part projecting to the depth side (+Z direction side) relative to the part where the operation sections 34 and 35 are located, as above-mentioned. In addition, at that position inside the casing 3 which corresponds to the trigger key TK, the light sensor LS2 is disposed, and the above-mentioned reaction force generation section RD and the above-mentioned vibration generation section VB1 (see FIG. 6) are disposed.

The trigger key TK is a key wherein a rotary shaft along the +X direction is set at an end portion on the +Y direction side of the key top TK1, and an end portion on the -Y direction side of the key top TK1 is moved in the +Z direction, with the rotary shaft as a center. When such a key top TK1 is input (depressed), the trigger key TK outputs to the control unit 6 an operation signal indicating that an input is made.

The light sensor LS2 emits detection light toward the exterior, and detects the quantity of the detection light reflected by the index finger, which is the object of detection, like the light sensor LS1. As depicted in FIG. 10, the light sensor LS2 emits the detection light to the exterior through a light-transmitting member TK2 fitted in a detection window TK3 formed substantially in the center of the key top TK1, and detects the quantity of the detection light incident thereon. Then, the quantity of light detected by the light sensor LS2 is output to the control unit 6, and, based on the light quantity, the control unit 6 analyzes the position of the index finger.

The vibration generation section VB1 transmits a generated vibration to the key top TK1. By this, the vibration can be transmitted to the tip of the user's index finger which touches the key top TK1.

The reaction force generation section RD generates, on the key top TK1 of the trigger key TK, a reaction force in the direction (+Z direction) opposite to the direction in which the key top TK1 is depressed, as above-mentioned.

As depicted in FIGS. 2 and 3, the operation section 34 is located at that upper part (+Y direction side) of the lower casing portion 30A which is on the back surface 3B side, in other words, located at a part which can be operated by the middle finger (either of the middle fingers RH3 and LH3) of the user. Specifically, as depicted in FIGS. 7, 8 and 10, the operation section 34 is located at a substantially central part of the back surface 3B of the casing 3. The above-mentioned pressure sensor PS is disposed at the operation section 34. In addition, inside the casing 3 at a position according to the operation section 34, a light sensor LS3 is disposed, and the above-mentioned vibration generation section VB2 (see FIG. 6) is disposed.

The pressure sensor PS detects a pressure exerted on the casing 3 by the user's middle finger. The pressure sensor PS is covered with a cover member 341, and the pressure detected by the pressure sensor PS is a pressure exerted on the cover member 341 by the middle finger. The pressure sensor PS as above outputs the detected pressure to the control unit 6.

Like the light sensors LS1 and LS2, the light sensor LS3 emits detection light toward the exterior, and detects the quantity of the detection light reflected by the middle finger, which is the object of detection. As depicted in FIG. 10, the light sensor LS3 emits the detection light to the exterior through a light-transmitting member 342 fitted in a detection window 343 formed substantially in the center of the cover member 341, and detects the quantity of the detection light incident thereon. Then, the quantity of light detected by the light sensor LS3 is output to the control unit 6, and, based on the light quantity, the control unit 6 analyzes the position of the middle finger.

The vibration generation section VB2 transmits a generated vibration to the cover member 341. By this, the vibration can be transmitted to the tip of the middle finger which touches the cover member 341.

As depicted in FIGS. 2 and 3, the operation section 35 is located at that lower part of the lower casing portion 30A which is on the back surface 3B side, in other words, located at a part which can be operated by the ring finger (either of the ring fingers RH4 and LH4) and the little finger (either of the little fingers RH5 and LH5) of the user. Specifically, as depicted in FIGS. 7, 8 and 10, the operation section 35 is located at a part on the lower side (-Y direction side) of the back surface 3B of the casing 3, in other words, at another part of the grasping section 31. In the inside of the casing 3 according to the operation section 35 as above, light sensors LS4 and LS5 are disposed, and the above-mentioned vibration generation section VB3 (see FIG. 6) is disposed.

Like the light sensors LS1 to LS3, the light sensors LS4 and LS5 detect the quantities of detection light reflected by objects of detection. Specifically, the light sensor LS4 detects the quantity of detection light reflected by the ring finger, which is the object of detection, whereas the light sensor LS5 detects the quantity of detection light reflected by the little finger, which is the object of detection. Then, the quantities of light detected by the light sensors LS4 and LS5 are output to the control unit 6, and, based on the light quantities, the control unit 6 analyzes the positions of the ring finger and the little finger. The light sensors LS4 and LS5 as above each emit the defection light through a light-transmitting member 351 fitted in a detection window 352 formed in the operation section 35, and receive the detection light incident thereon.

The vibration generation section VB3 has a motor of a larger size than motors possessed by the vibration generation sections VB1 and VB2, thereby generating a larger vibration than the vibrations generated by the vibration generation sections VB1 and VB2. The vibration generation section VB3 as above vibrates the casing 3 as a whole.

Here, as depicted in FIG. 10, a virtual line VL2 connecting the centers of the operation sections 33 to 35 overlaps with the virtual line VL1 when the casing 3 is viewed from the front surface 3A side or the back surface 3B side. In other words, the virtual line VL2 is contained in the center plane CP. Specifically, the trigger key TK, the pressure sensor PS and the light sensors LS2 to LS5 are disposed on the center plane CP. More in detail, the shapes of the operation sections 33 to 35 are in left-right symmetry, with the center plane CP as a center of symmetry, and the layout of the trigger key TK, the pressure sensor PS and the light sensors LS2 to LS5 is in left-right symmetry, with the center plane CP (virtual line VL2) as a center of symmetry.

Configuration of Grasping Section

Figure 11:
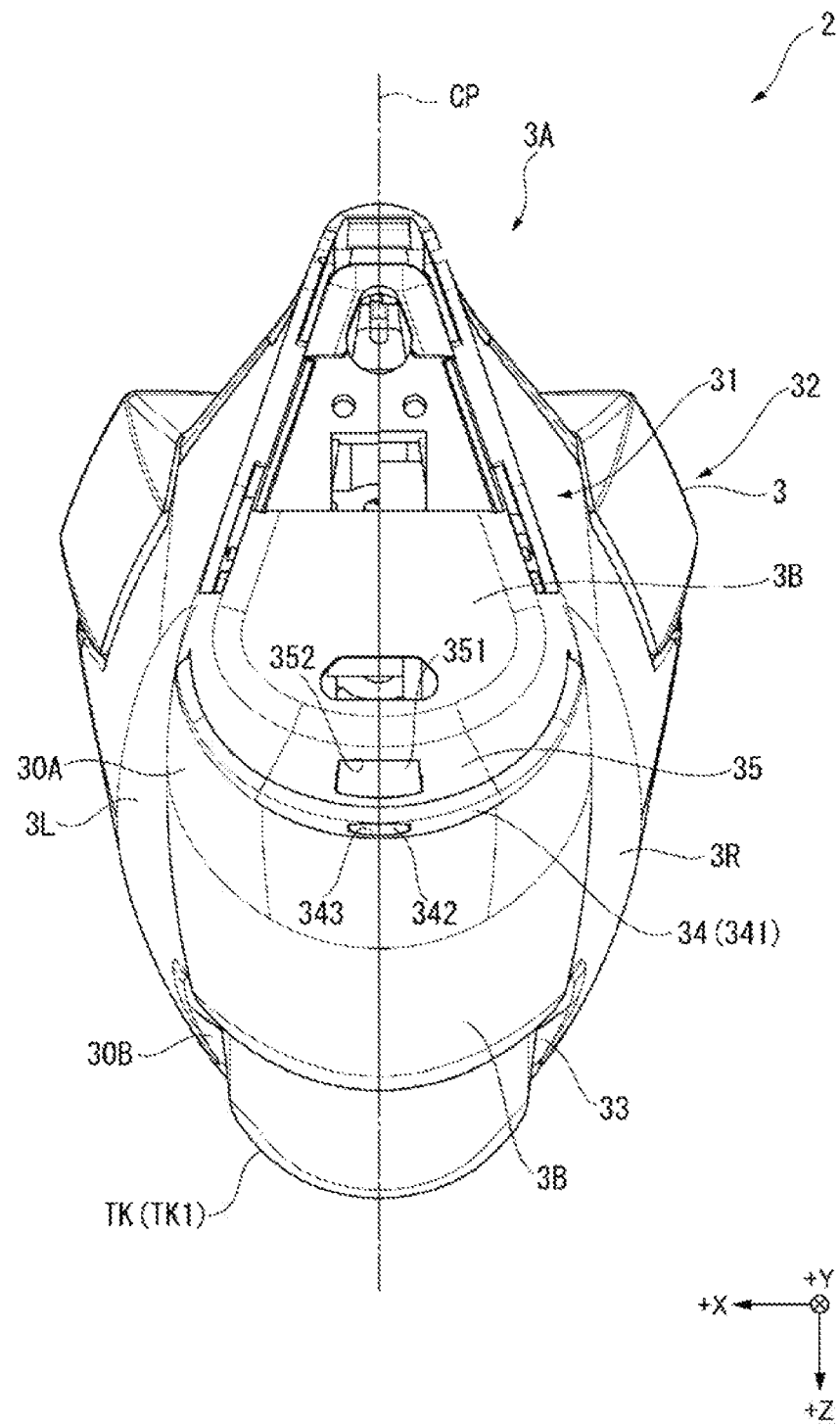
FIG. 11 is a bottom view depicting the apparatus main body in the embodiment.

As depicted in FIGS. 7 to 11, the grasping section 31 is that part of the casing 3 which is on the −Y direction side, it is located at the lower casing portion 30A, and it is a part which can be grasped mainly by the palm, the ring finger and the little finger, as above-mentioned. As depicted in FIG. 11, the grasping section 31 has a configuration wherein its width size (the size along the +X direction) on the front surface 3A side is smaller than its width size on the back surface 3B side, its sectional shape along the YZ plane is a substantially trapezoidal columnar shape, and it is structured in left-right symmetry, with the center plane CP as a center of symmetry.

At that part of the grasping section 31 which is formed by the left side surface 3L, there is located the attachment portion 31L1, as depicted in FIGS. 8 and 9, and at that part of the grasping section 31 which is formed by the right side surface 3R, there is located the attachment portion 31R1, as depicted in FIGS. 7 and 9.

The attachment portion 31L1 is a recessed portion to which an attachment member 8L constituting the mounting member 7 is attached in the case of using the operation apparatus 1 as a left-use operation apparatus, and to which a battery case BCL (see FIG. 14) is attached in the case of using the operation apparatus 1 as a right-use operation apparatus. As depicted in FIGS. 8 and 9, the attachment portion 31L1 has a recess 31L2 where part of a battery is disposed when the battery case BCL is attached, and has a terminal section (not depicted) connected to a terminal of the battery.

In addition, the attachment portion 31L1 has recesses 31L3 and 31L4. The recess 31L3 is located at a part on the +Z direction side in the attachment portion 31L1, and extends along the +Y direction. Besides, the recess 31L4 is located at a part on the +Y direction side in the attachment portion 31L1.

Further, at that part of the attachment portion 31L1 which is on the +Y direction side, two fixation portions 31L5 are located at both ends, and at that part of the attachment portion 31L1 which is on the −Y direction side, one fixation portion 31L5 is located in the center. Screws (not depicted) for fixing the attachment member 8L are fixed to these fixation portions 31L5.

Note that the front surface 3A and the bottom surface 3D are formed with recesses 3A1 and 3D1 for connection between the attachment portions 31L1 and 31R1.

The attachment portion 31R1 is a recessed portion to which the attachment member 8R constituting the mounting member 7 is attached in the case of using the operation apparatus 1 as a right-use operation apparatus, and to which a battery case BCR (see FIG. 15) is attached in the case of using the operation apparatus 1 as a left-use operation apparatus. As depicted in FIGS. 7 and 9, the attachment portion 31R1 is structured substantially in mirror symmetry with the attachment portion 31L1, and has a terminal portion (not depicted), recesses 31R2 to 31R4 and fixation portions 31R5 which are similar to the terminal portion, the recesses 31L2 to 31L4 and the fixation portions 31L5, respectively.

Note that the above-mentioned switch SW changed over between an ON state and an OFF state by being pressed by the attachment member 8R is disposed at a bottom portion of the recess 31R3.

The switch SW may be provided at the attachment portion 31L1 (for example, a bottom portion of the recess 31L3), or may be disposed at such a position as to be pressed in the case where the battery case BCR is attached to the attachment portion 31R1 or in the case where the battery case BCL is attached to the attachment portion 31L1. In addition, instead of providing such a switch SW, the control unit 6 may detect and grasp to which of the hands the operation apparatus 1 is mounted, by determining which of the terminal portions of the attachment portions 31L1 and 31R1 is connected to the battery.

Parts Attached to Casing

Figure 12:
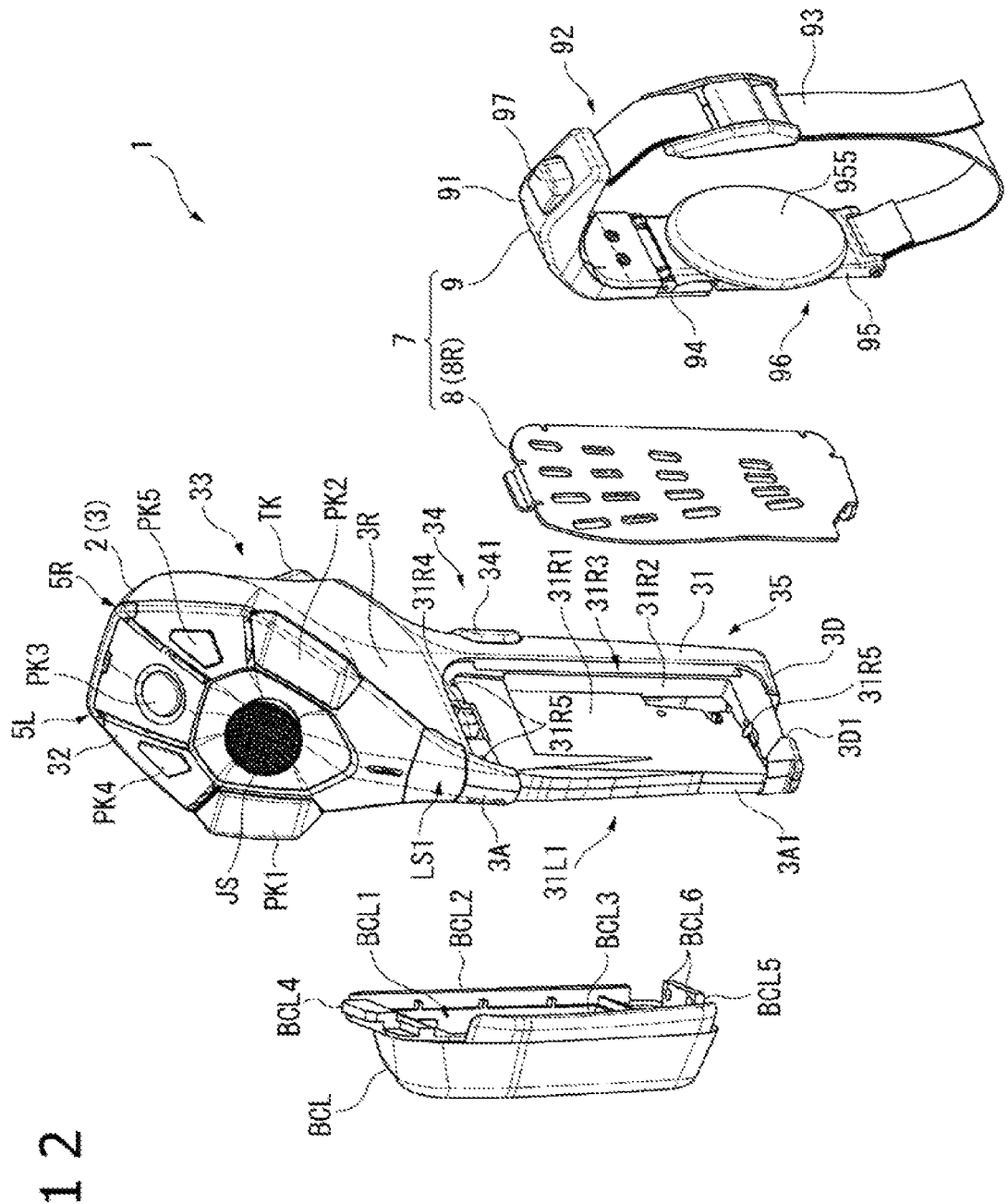
FIG. 12 is an exploded perspective view depicting the operation apparatus in the embodiment.

FIG. 12 is an exploded perspective view depicting the operation apparatus 1 in the case where the mounting member 7 is attached to the attachment portion 31R1 and the battery case BCL is attached to the attachment portion 31L1. In addition, FIG. 13 is an exploded perspective view of the operation apparatus 1 in the case where the mounting member 7 is attached to the attachment portion 31L1 and the battery case BCR is attached to the attachment portion 31R1.

Figure 13:
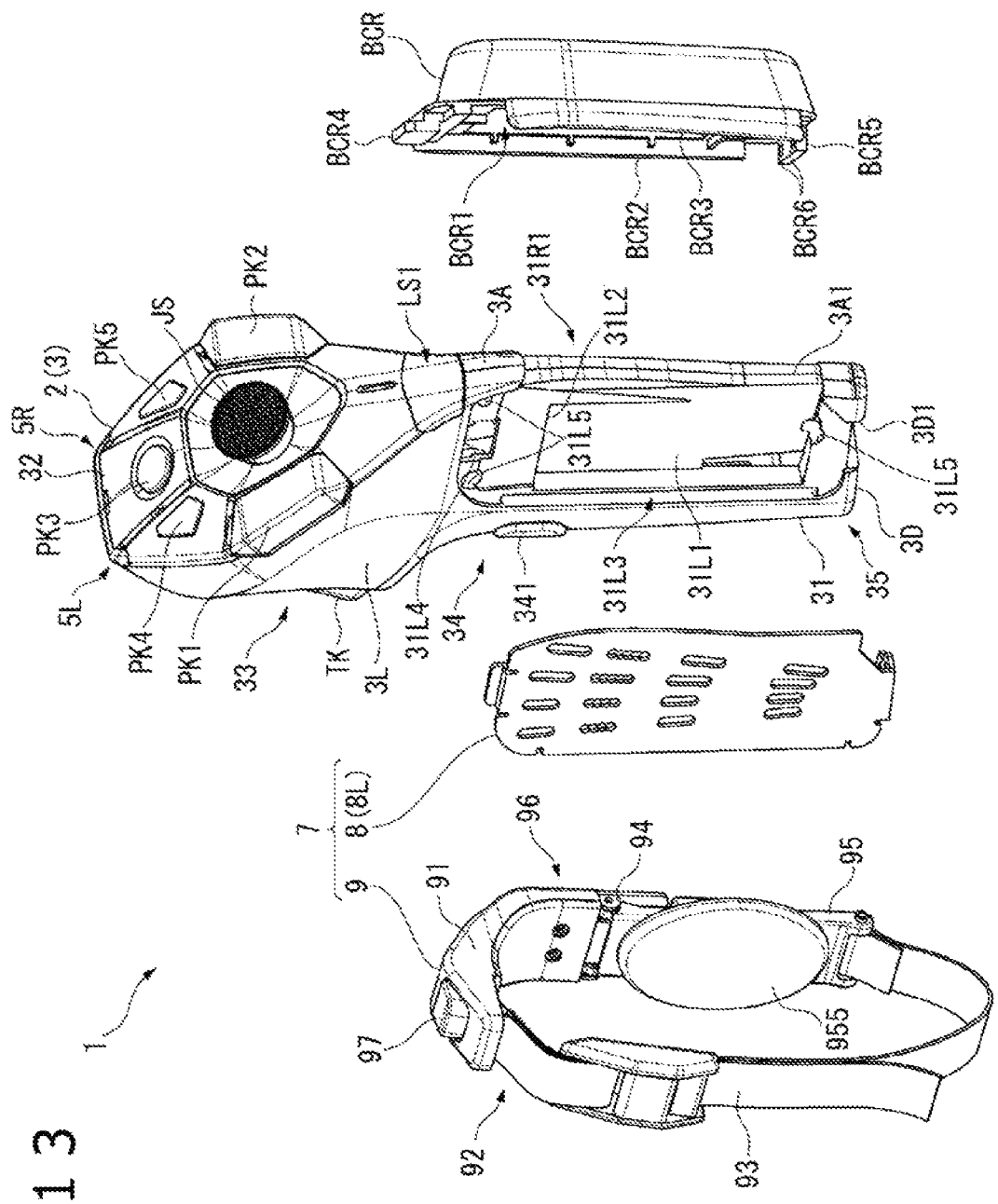
FIG. 13 is an exploded perspective view depicting the operation apparatus in the embodiment.

To one of the attachment portions 31R1 and 31L1, the mounting member 7 is attached, as depicted in FIGS. 12 and 13, and the mounting member 7 is mounted to one hand of the user, whereby the operation apparatus 1 is mounted to the user's one hand. Besides, to the other attachment portion, that one of the battery cases BCL and BCR which corresponds to the other attachment portion is attached, whereby electric power is supplied to the operation apparatus 1.

Configurations of the battery cases BCL and BCR and the mounting member 7 will be described in detail below.

Configuration of Battery Case

Figure 14:
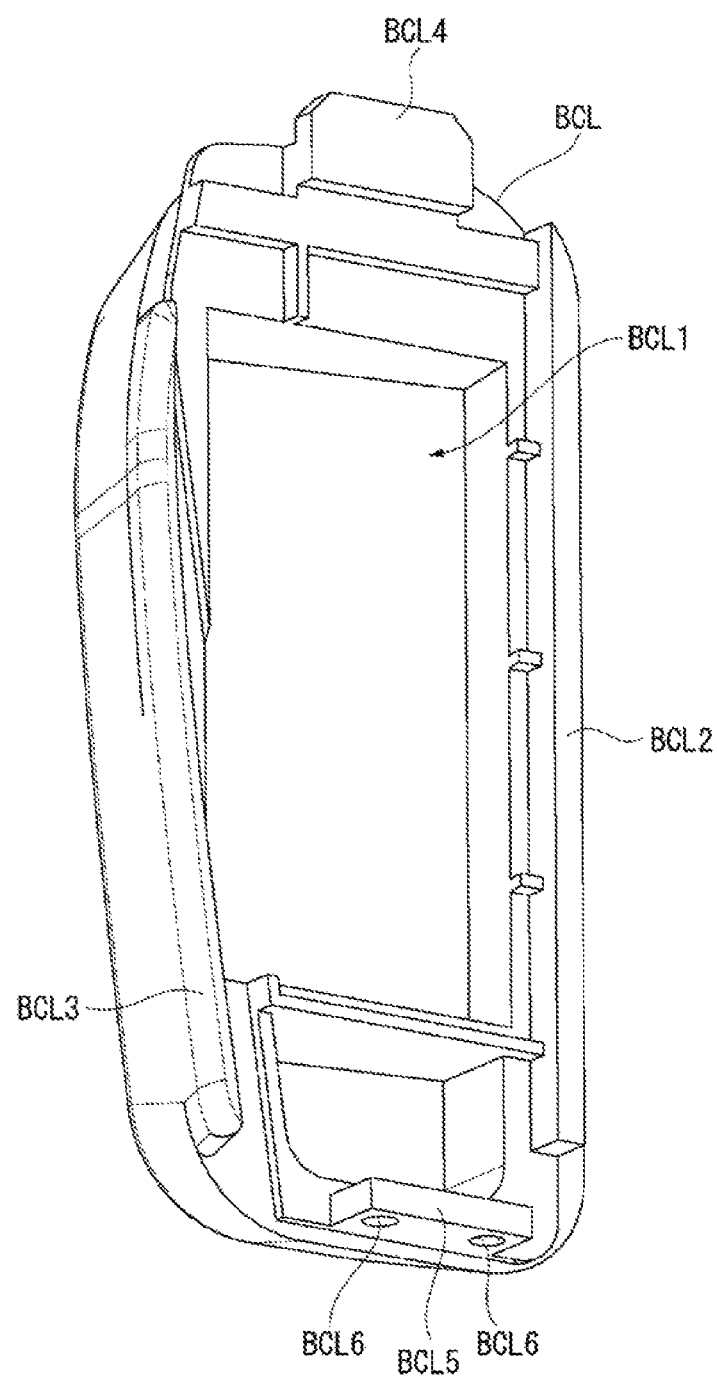
FIG. 14 is a perspective view depicting a battery case for left-side attachment in the embodiment.

FIG. 14 is a perspective view of the battery case BCL for left-side attachment, as viewed from the casing 3 side.

As depicted in FIG. 14, the battery case BCL includes an accommodation section BCL1 located substantially in the center, and erected portions BCL2 and BCL3 erected respectively along a left-side end portion and a right-side end portion when the battery case BCL is viewed in such a manner as to face the accommodation section BCR1.

A battery (not depicted) in a substantially rectangular parallelepiped shape is accommodated inside the accommodation section BCL1.

The erected portions BCL2 and BCL3 are projecting to the attachment portion 31L1 side. The erected portion BCL2 is inserted into the recess 31L3 in the attachment portion 31L1, whereas the erected portion BCL3 is fitted into the recess 3A1.

In addition, the battery case BCL has a projecting portion BCL4 projecting upward from an end portion on the upper side, and has a projecting portion BCL5 projecting to the attachment portion 31L1 side from an end portion on the lower side. The projecting portion BCL4 is inserted into the recess 31L4, whereas the projecting portion BCL5 is fitted into the recess 3D1. The projecting portion BCL5 is formed with two holes BCL6 in which screws (not depicted) for fixing the battery case BCL to the attachment portion 31L1 are inserted and passed.

Figure 15:
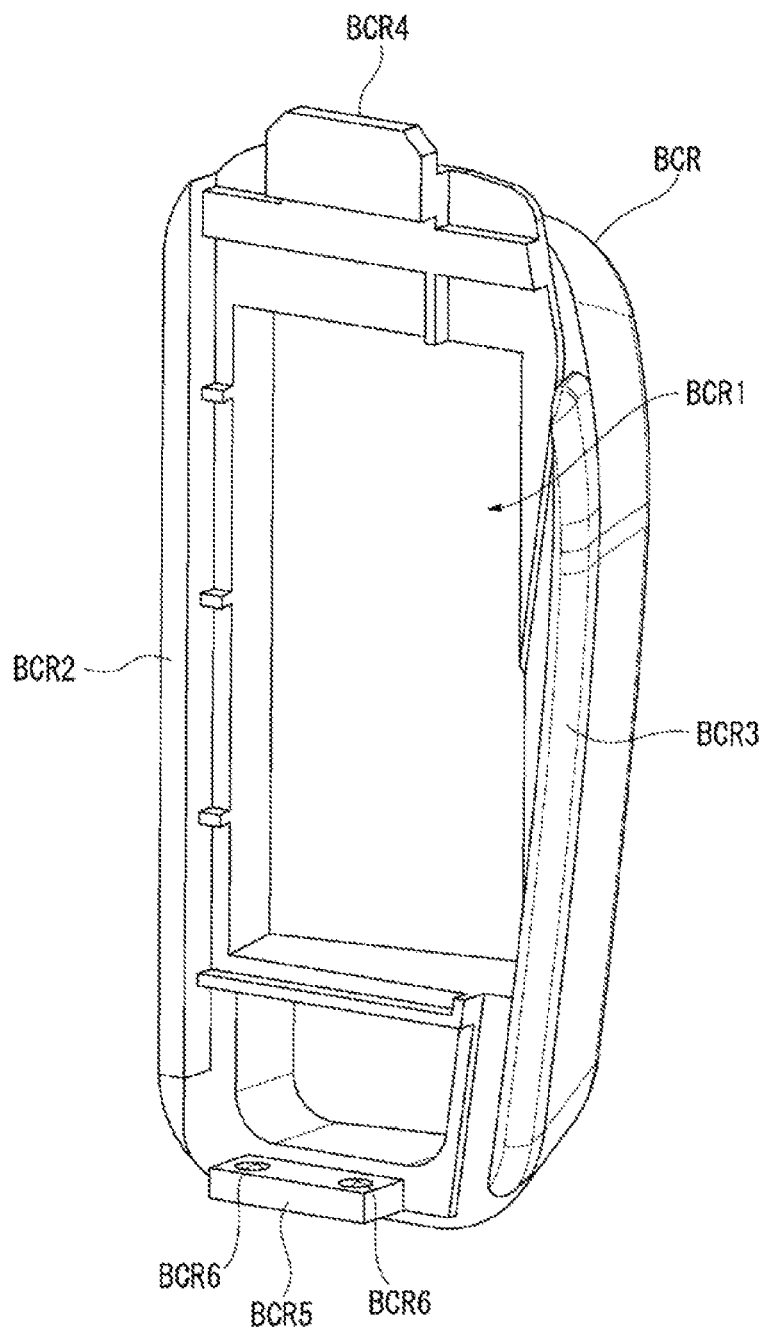
FIG. 15 is a perspective view depicting a battery case for right-side attachment in the embodiment.

FIG. 15 is a perspective view of the battery case BCR for right-side attachment, as viewed from the casing 3 side.

On the other hand, the battery case BCR is structured to be substantially in mirror symmetry with the battery case BCL. As depicted in FIG. 15, the battery case BCR has in the center thereof an accommodation section BCR1 in which to accommodate the battery. In addition, the battery case BCR has erected portions BCR2 and BCR3 and projecting portions BCR4 and BCR5 which are similar to the erected portions BCL2 and BCL3 and the projecting portions BCL4 and BCL5, respectively. Besides, the projecting portion BCR5 has two holes BCR6 which are similar to the two holes BCL6.

Configuration of Mounting Member

The mounting member 7 is a member for mounting the apparatus main body 2 to the left hand LH or the right hand RH of the user, as above-mentioned. As depicted in FIGS. 12 and 13, the mounting member 7 has the attachment members 8 (8L, 8R) and the band member 9, and is attached to one of the left and right attachment portions 31L1 and 31R1 according to the use condition of the operation apparatus 1 (whether it is used as a right-use operation apparatus or used as a left-use operation apparatus). Specifically, the attachment member 8L is used in the case of attaching the mounting member 7 to the attachment portion 31L1, as depicted in FIG. 13, and the attachment member 8R is used in the case of attaching the mounting member 7 to the attachment portion 31R1, as depicted in FIG. 12.

Configuration of Attachment Member

Figure 16:
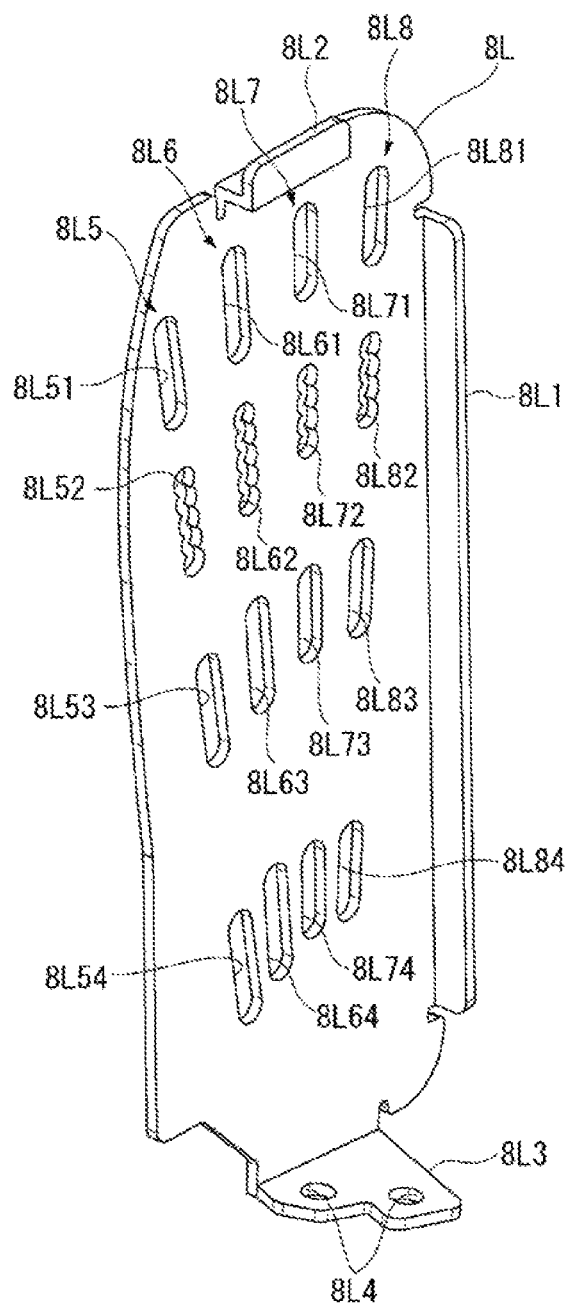
FIG. 16 is a perspective view depicting an attachment member for left-side attachment in the embodiment.
Figure 17:
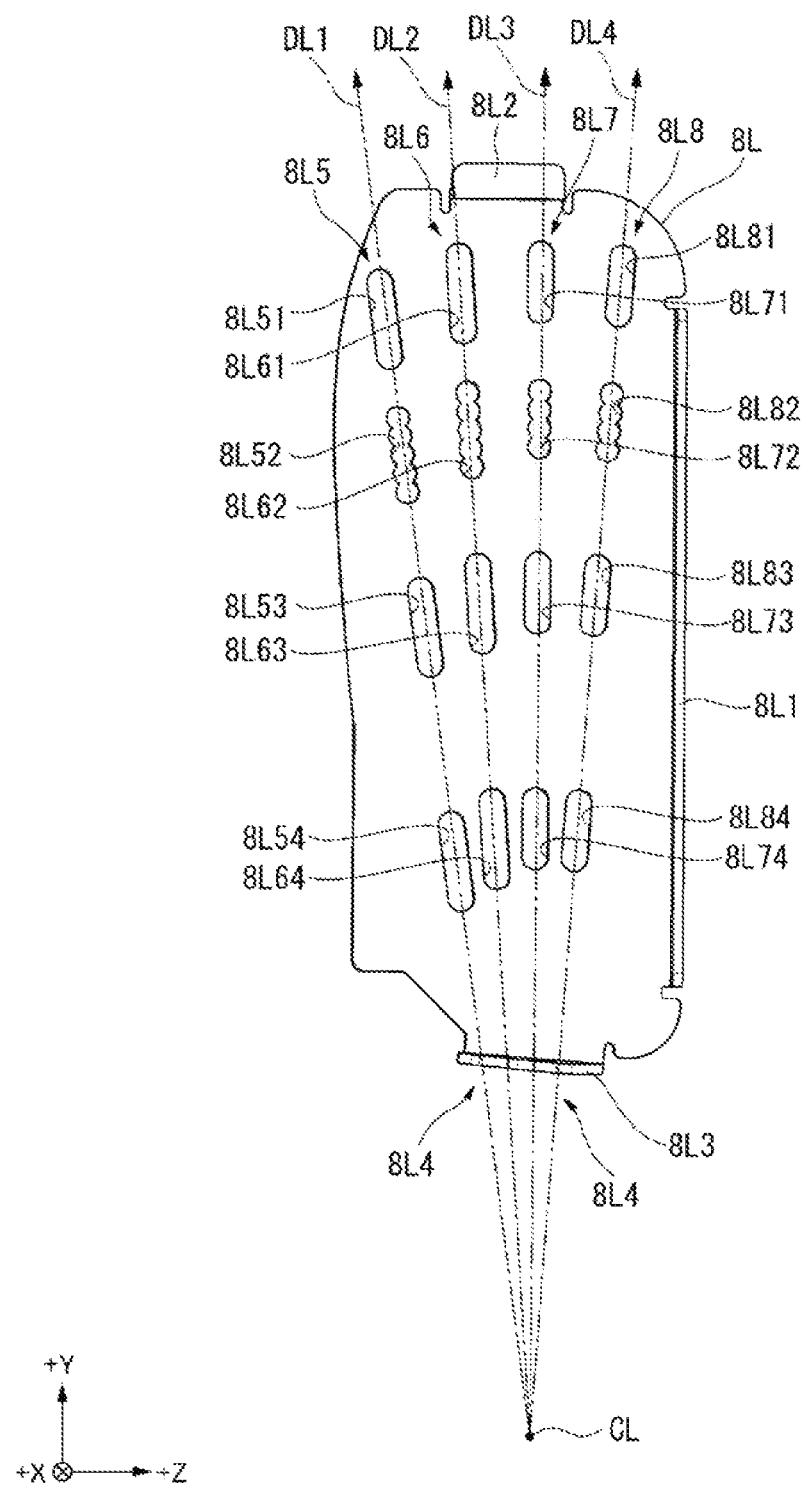
FIG. 17 is a figure depicting the attachment member for left-side attachment in the embodiment.

FIG. 16 is a perspective view of the attachment member 8L as viewed from the casing 3 side, and FIG. 17 is a view of the attachment member 8L as viewed from the casing 3 side. Note that in FIG. 17, the +X direction, the +Y direction and the +Z direction when the attachment member 8L is attached to the attachment portion 31L1 are illustrated.

The attachment member 8L is a member for attaching the mounting member 7 to the casing 3, by being attached to the attachment portion 31L1 in a state in which the band member 9 is fixed. The attachment member 8L is configured such that the attachment position in attaching the band member 9 to the attachment member 8L can be adjusted, whereby the position of the apparatus main body 2 in the left hand LH to which the band member 9 is mounted can be adjusted.

As depicted in FIGS. 16 and 17, the attachment member 8L as above is a metal-made plate-shaped body formed in a substantially rectangular shape according to the recessed attachment portion 31L1, and is attached in the manner of being fitted into the attachment portion 31L1. The attachment member 8L includes an erected portion 8L1 which is erected toward the outside of the surface at one end in regard of a transverse direction and which extends in a longitudinal direction, projecting portions 8L2 and 8L3 projecting to the outside of the surface at one end and the other end in regard of the longitudinal direction, holes 8L4, and four position adjustment sections 8L5 to 8L8.

The erected portion 8L1 is formed at a position according to the recess 31L3, like the erected portion BCL2. The erected portion 8L1 is erected to the attachment portion 31L1 side from an end portion of the attachment member 8L, and is inserted in the recess 31L3.

The projecting portions 8L2 and 8L3 are formed at positions according to the recess 31L4 in the attachment portion 31L1 and the recess 3D1 in the bottom surface 3D, like the projecting portions BCL4 and BCL5. Of these portions, the projecting portion 8L2 is inserted into the recess 31L4, whereas the projecting portion 8L3 is fitted into the recess 3D1. The projecting portion 8L3 has the two holes 8L4 in which screws (not depicted) for fixing the attachment member 8L to the attachment portion 31L1 are inserted and passed.

The position adjustment sections 8L5 to 8L8 are parts for adjusting the attachment position of the band member 9, and, hence, parts for adjusting the position of the apparatus main body 2 in the left hand LH. The position adjustment sections 8L5 to 8L8 each have four grooves. Specifically, the position adjustment section 8L5 has grooves 8L51 to 8L54, and the position adjustment section 8L6 has grooves 8L61 to 8L64. In addition, the position adjustment section 8L7 has grooves 8L71 to 8L74, and the position adjustment section 8L8 has grooves 8L81 to 8L84. These grooves 8L51 to 8L54, 8L61 to 81L64, 8L71 to 8L74, and 8L81 to 8L84 are grooves in which shaft portions of screws for fixing the attachment member 8L to the band member 9 are inserted and passed, and the groove width of these grooves 8L51 to 8L54, 8L61 to 8L64, 8L71 to 8L74, and 8L81 to 8L84 is set to a groove width obtained by adding a predetermined clearance to the diameter of the shaft portions of the screws.

Of these grooves, the grooves 8L52, 8L62, 8L72 and 8L82 correspond to first grooves in the present invention, and the other grooves correspond to second grooves in the present invention.

The grooves 8L52, 8L62, 8L72 and 8L82 each have a configuration wherein a plurality of circular holes are adjacently disposed in series, and the grooves are connected to one another. For instance, the grooves 8L52 and 8L62 are each formed of five holes, whereas the grooves 8L72 and 8L82 are each formed of four holes. The inside diameter of these holes is set to such a size that the shaft portions of the screws are inserted and passed therethrough. Therefore, the shaft portion inserted in one hole is restrained from entering the other hole adjacent to the one hole.

The groove directions (the extending directions of the grooves) of the grooves 8L51 to 8L54, 8L61 to 8L64, 8L71 to 8L74, and 8L81 to 8L84 constituting the position adjustment sections 8L5 to 8L8 are coincident for the same position adjustment section. For example, the groove directions of the grooves 8L51 to 8L54 are the same, and the groove directions of the grooves 8L71 to 8L74 are the same.

In addition, as depicted in FIG. 17, the groove directions of the position adjustment sections 8L5 to 8L8 are radial directions, with a predetermined center point CL as a center. Specifically, the groove direction DL1 of the position adjustment section 8L5 (the grooves 8L51 to 8L54), the groove direction DL2 of the position adjustment section 8L6 (the grooves 8L61 to 8L64), the groove direction DL3 of the position adjustment section 8L7 (the grooves 8L71 to 8L74), and the groove direction DL4 of the position adjustment section 8L8 (the grooves 8L81 to 8L84) intersect one another on the outside of the attachment member 8L and at the center point CL set at a position on the −Y direction side in relation to the attachment member 8L. In other words, the groove directions DL1 to DL4 are directions of extending radially from the center point CL.

Besides, when the attachment member 8L is attached to the attachment portion 31L1, these groove directions DL1 to DL4 are inclined in relation to the +Y direction.

Specifically, the groove directions DL1 and DL2 of the position adjustment sections 8L5 and 8L6 located on the −Z direction side are inclined in relation to the +Y direction in such a manner as to be inclined toward the −Z direction side in going toward the +Y direction side. Note that the intersection angle between the groove direction DL1 and the +Y direction is greater than the intersection angle between the groove direction DL2 and the +Y direction.

On the other hand, the groove directions DL3 and DL4 of the position adjustment sections 8L7 and 8L8 located on the +Z direction side are inclined in relation to the +Y direction in such a manner as to be inclined toward the +Z direction side in going toward the +Y direction side; the intersection angle between the groove direction DL4 and the +Y direction is greater than the intersection angle between the groove direction DL3 and the +Y direction.

Note that in the present embodiment, the intersection angle between the groove directions DL1 and DL2, the intersection angle between the groove directions DL2 and DL3, and the intersection angle between the groove directions DL3 and DL4 are each approximately 4 degrees. This, however, is not limitative, and the intersection angles can be modified as required, and at least one of the intersection angles may be different from the other intersection angles. In addition, the center point CL may not be located on the outside of the attachment member 8L, and may be on the attachment member 8L. Further, the groove directions DL1 to DL4 may not intersect one another at the center point CL. For example, the position adjustment sections may be formed in such a manner that the groove directions DL1 and DL2 intersect each other at a first center point, and the groove directions DL3 and DL4 intersect each other at a second center point set at a position different from the first center point.

Figure 18:
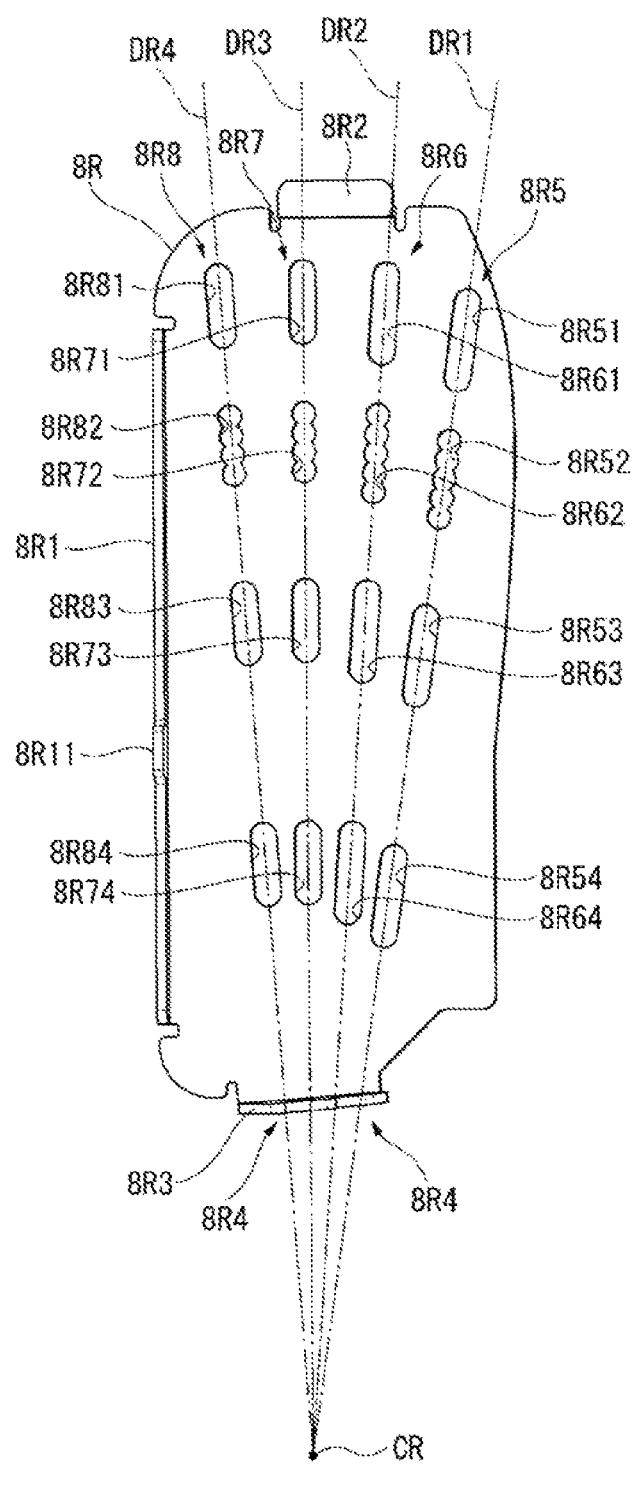
FIG. 18 is a figure depicting an attachment member for right-side attachment in the embodiment.

FIG. 18 is a view of the attachment member 8R as viewed from the casing 3 side.

The attachment member 8R is a member for attaching the mounting member 7 to the casing 3, by being fitted into and fixed to the attachment portion 31R1 in a state in which the band member 9 is fixed, as above-mentioned. The attachment member 8R is a metal-made plate-shaped body structured to be substantially in mirror symmetry with the attachment member 8L; as depicted in FIG. 18, the attachment member 8R includes an erected portion 8R1, projecting portions 8R2 and 8R3, holes 8R4, and four position adjustment sections 8R5 to 8R8 which are similar to the erected portion 8L1, the projecting portions 8L2 and 8L3, the holes 8L4 and the four position adjustment sections 8L5 to 8L8, respectively. Note that the erected portion 8R1 is projectingly provided with a projecting portion 8R11 for inputting the switch SW disposed at a bottom portion of the recess 31R3.

In addition, the position adjustment section 8R5 has four grooves 8R51 to 8R54 formed along a groove direction DR1 extending from a center point CR, which is set on the outside of the attachment member 8R and at a position on the −Y direction side in relation to the attachment member 8R, whereas the position adjustment section 8R6 has four grooves 8R61 to 8R64 formed along a groove direction DR2 extending from the center point CR. In addition, the position adjustment section 8R7 has four grooves 8R71 to 8R74 formed along a groove direction DR3 extending from the center point CR, whereas the position adjustment section 8R8 has four grooves 8R81 to 8R84 formed along a groove direction DR4 extending from the center point CR. Of these, the grooves 8R52, 8R62, 8R72 and 8R82 each have a configuration wherein a plurality of circular holes are adjacently disposed in series, like the grooves 8L52, 8L62, 8L72 and 8L82, and these holes are connected to one another in the same position adjustment section.

In addition, the groove directions DR1 and DR2 of the position adjustment sections 8R5 and 8R6 located on the −Z direction side are inclined to the −Z direction side in going toward the +Y direction side, and the intersection angle between the groove direction DR1 and the +Y direction is greater than the intersection angle between the groove direction DR2 and the +Y direction.

Besides, the groove directions DR3 and DR4 of the position adjustment sections 8R7 and 8R8 located on the +Z direction side are inclined to the +Z direction side in going toward the +Y direction side, and the intersection angle between the groove direction DR4 and the +Y direction is greater than the intersection angle between the groove direction DR3 and the +Y direction. Note that in the present embodiment, the intersection angle between the groove directions DR1 and DR2, the intersection angle between the groove directions DR2 and DR3, and the intersection angle between the groove directions DR3 and DR4 are each approximately 4 degrees. In other words, the groove directions DR1 to DR4 extend radially from the center point CR, in the same manner as above.

Besides, while the details will be described later, in the case where the attachment member 8R is used, the band member 9 is attached to the groove possessed by one of the position adjustment sections 8R5 to 8R8. In addition, in the case where the attachment member 8L is used, the band member 9 is attached to the groove possessed by one of the position adjustment sections 8L5 to 8L8. By this, the position of the apparatus main body 2 relative to the mounting member 7, in other words, the position of the apparatus main body 2 (the operation sections 32 to 35) in the one hand to which the mounting member 7 is mounted, can be adjusted.

Note that the modifications as to the attachment member 8L as above-mentioned are also applicable to the attachment member 8R.

Configuration of Band Member

Figure 19:
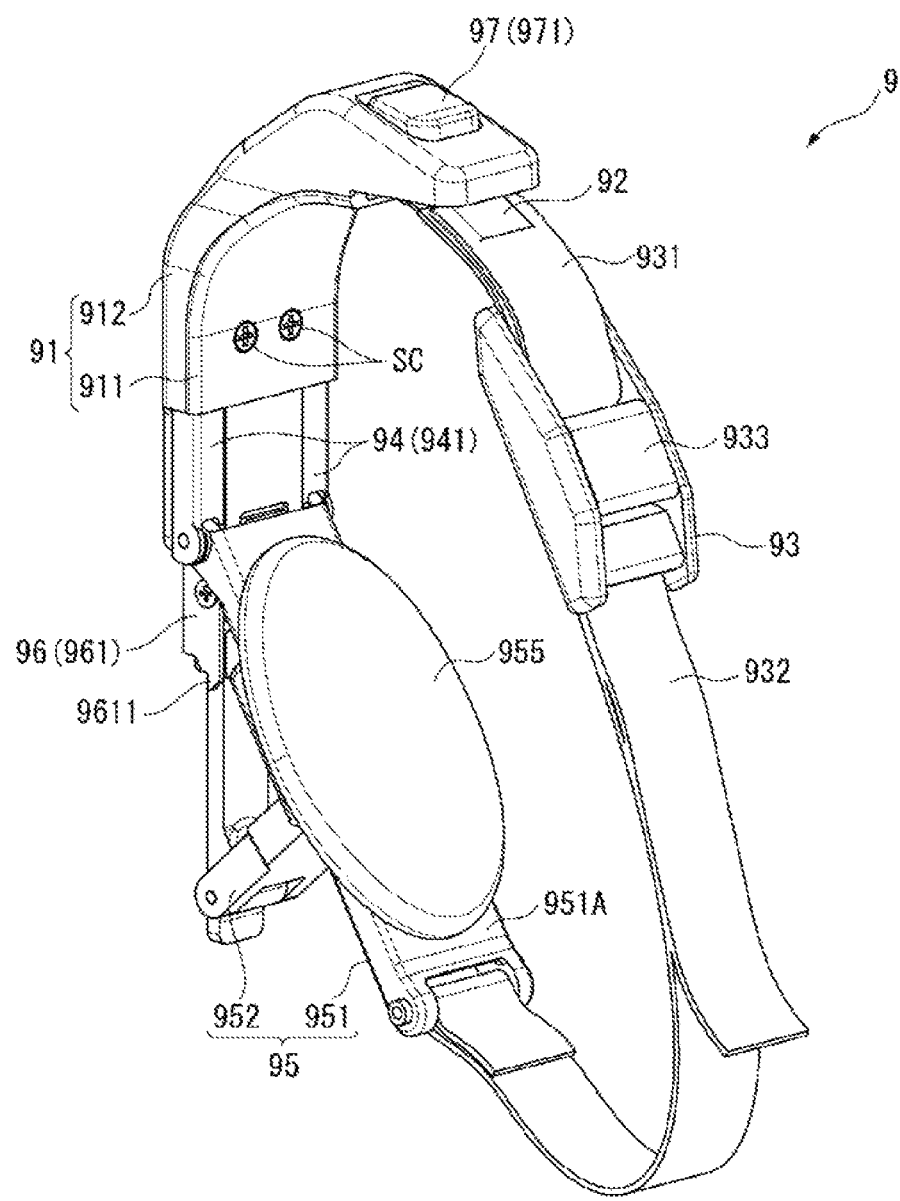
FIG. 19 is a perspective view depicting a band member in an extended state in the embodiment.
Figure 20:
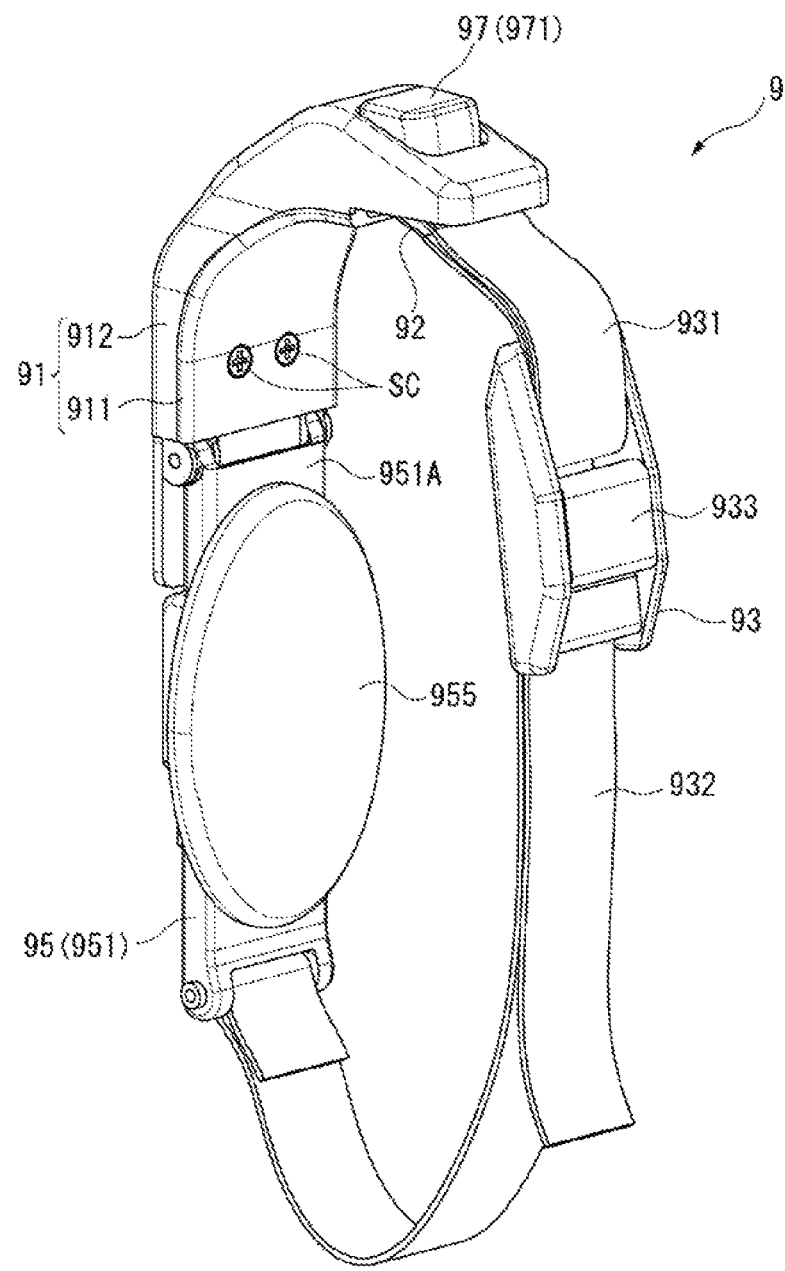
FIG. 20 is a perspective view depicting the band member in a contracted state in the embodiment.

FIG. 19 is a perspective view depicting the band member 9 in an extended state, and FIG. 20 is a perspective view depicting the band member 9 in a contracted state.

As depicted in FIGS. 2 and 3, the band member 9 is a member which is mounted to one hand of the user by winding it in the manner of connecting the palm and the back of the hand through an area between the root of the thumb and the root of the index finger and through the area between the root of the little finger and the wrist. The band member 9 has a configuration wherein when it is deformed from the extended state depicted in FIG. 19 into the contracted state depicted in FIG. 20, the circumferential size (inside circumference size) of the band member 9 is contracted, whereby additional fastening in mounting the mounting member 7 can be performed. Particularly, in the operation apparatus 1 in the present embodiment, the light sensors LS1 to LS5 detect the positions of the thumb and fingers, so that all the thumb and fingers are assumed to separate from the operation apparatus 1; in addition, since the acceleration sensor AS and the gyro sensor GS detect movements of the one hand to which the operation apparatus 1 is mounted, the operation apparatus 1 should be mounted to the one hand stably. Therefore, with the band member 9 configured such that additional fastening can be performed, the degree of close contact of the operation apparatus 1 with the one hand is enhanced.

Figure 21:
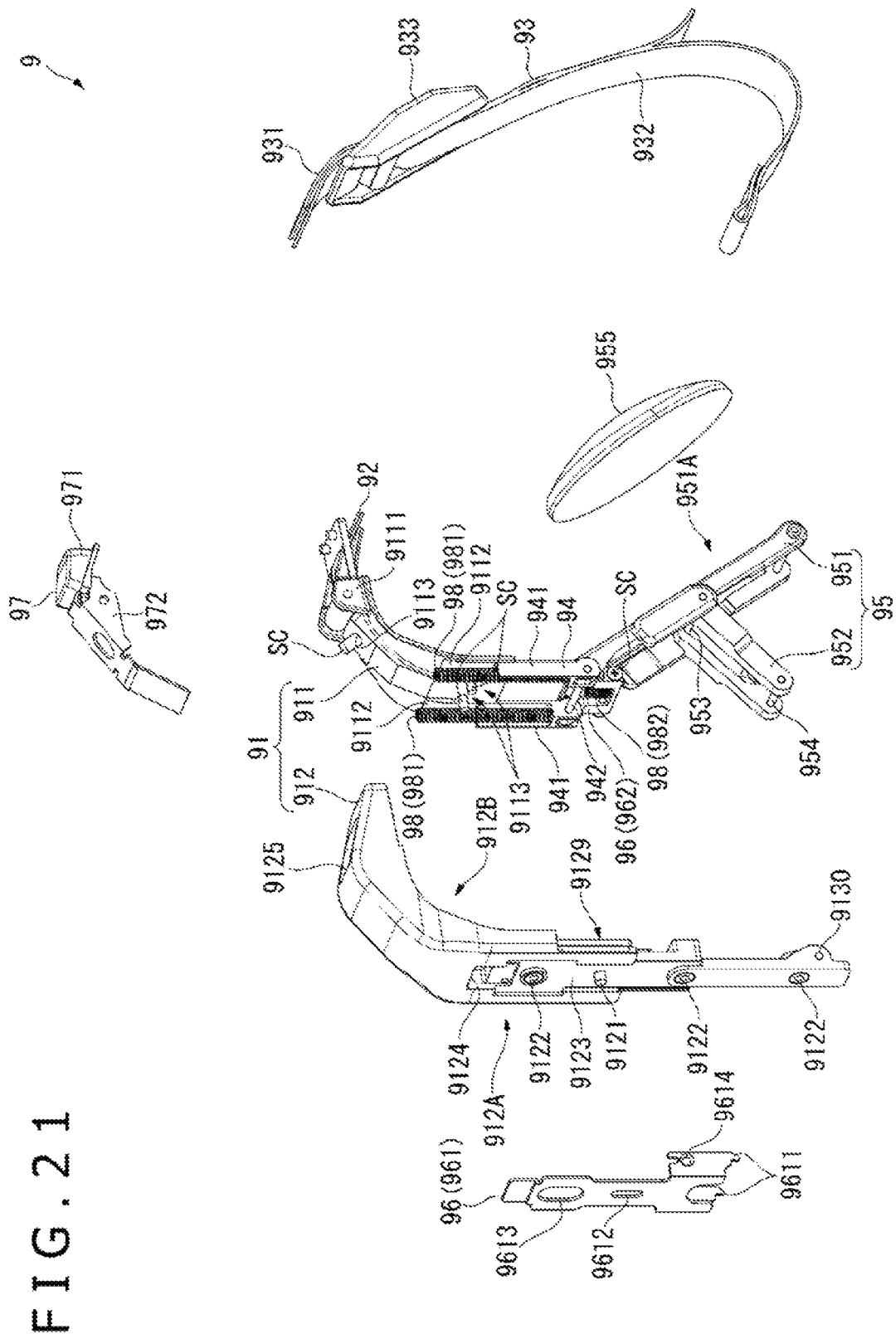
FIG. 21 is an exploded perspective view depicting the band member in the extended state in the embodiment.
Figure 22:
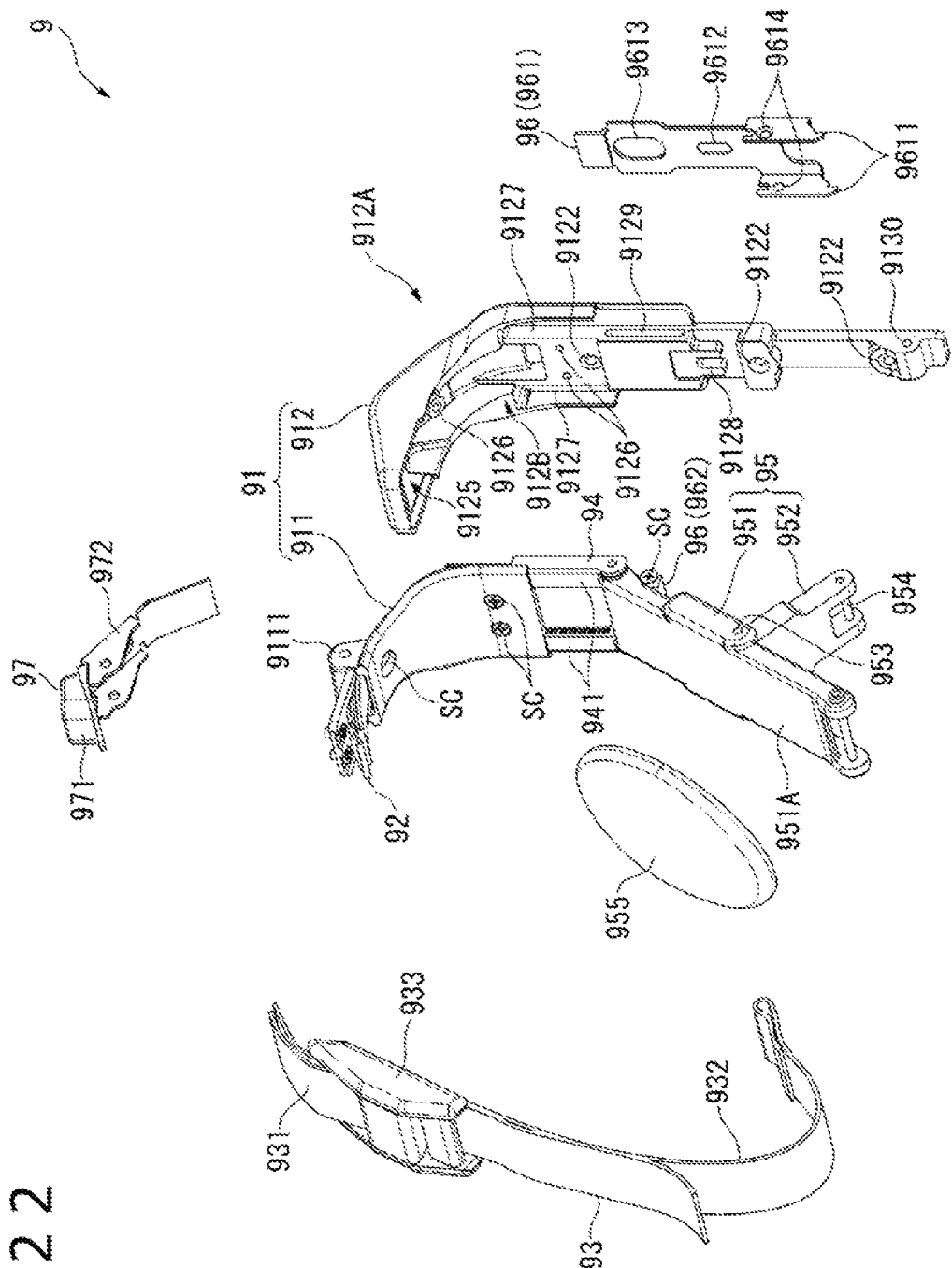
FIG. 22 is an exploded perspective view depicting the band member in the extended state in the embodiment.
Figure 23:
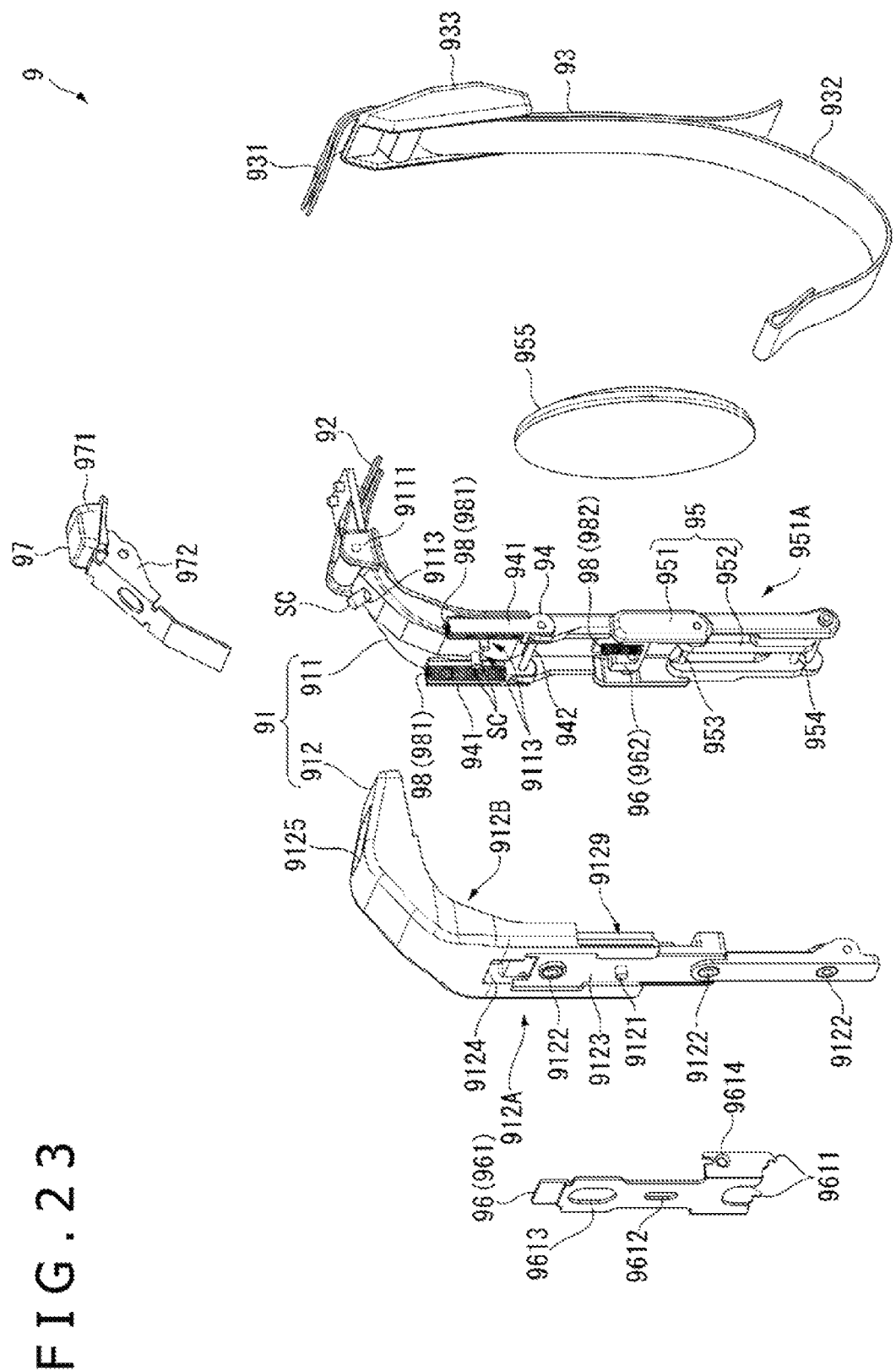
FIG. 23 is an exploded perspective view depicting the band member in the contracted state in the embodiment.
Figure 24:
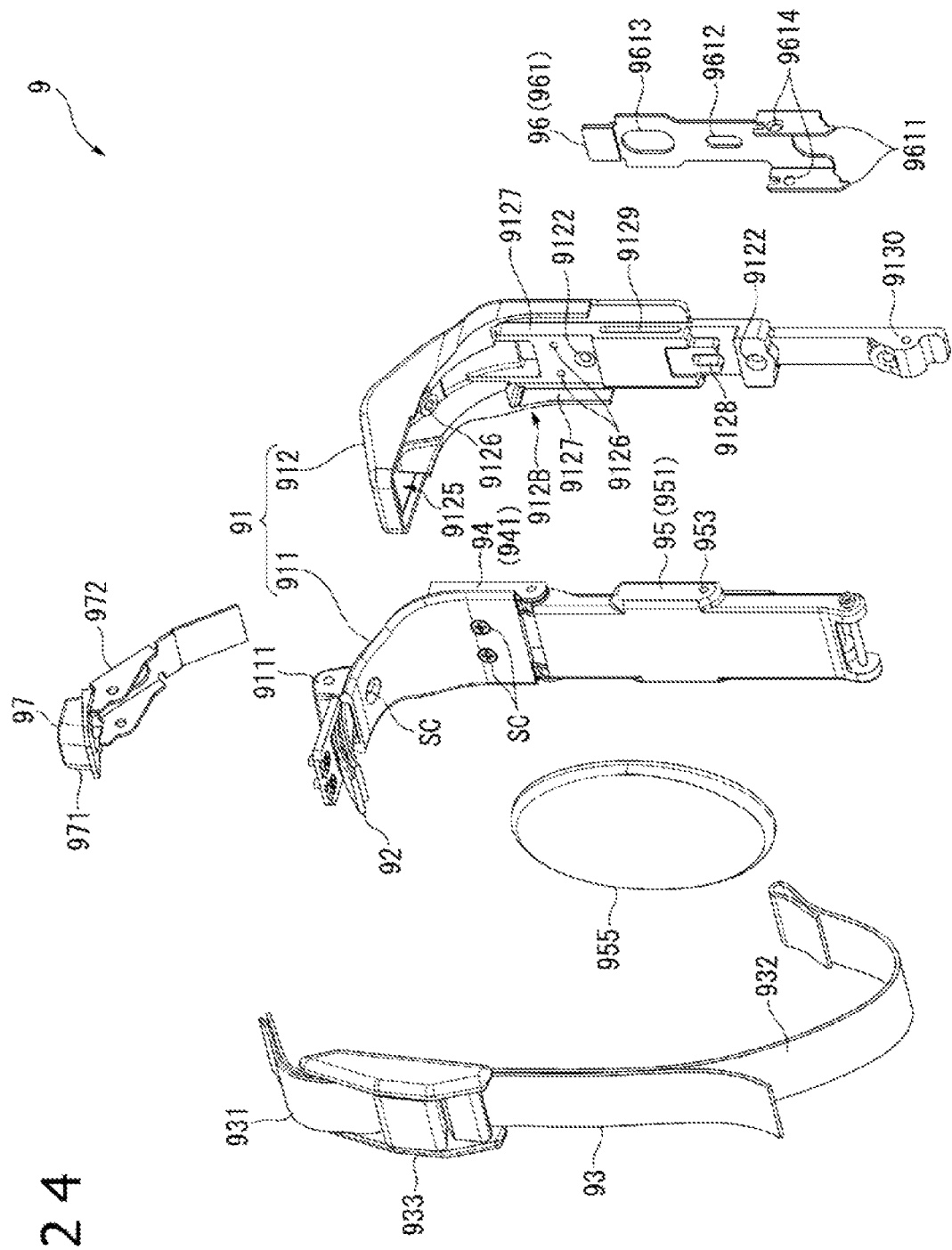
FIG. 24 is an exploded perspective view depicting the band member in the contracted state in the embodiment.

FIGS. 21 and 22 are exploded perspective views depicting the band member 9 in the extended state, and FIGS. 23 and 24 are perspective views depicting the band member 9 in the contracted state. Note that FIGS. 21 and 23 are exploded perspective views of the band member 9 as viewed from the side of attachment thereof to the casing 3, whereas the FIGS. 22 and 24 are exploded perspective views of the band member 9 as viewed from the side opposite to the side of attachment thereof to the casing 3.

As depicted in FIGS. 21 to 24, the band member 9 as above includes a main body member 91, an extendable member 92, a belt-shaped member 93, a slide member 94, a link member 95, a locking member 96, an operation member 97 and a biasing member 98. Of these, the slide member 94 and the link member 95 constitute a sliding mechanism in the present invention.

Configuration of Main Body Member

The main body member 91 is a substantially L-shaped member disposed at the root portion of the thumb when the mounting member 7 is mounted to one hand. The main body member 91 is configured by combining a first main body section 911 and a second main body section 912 with each other. Besides, parts of the slide member 94 and the operation member 97 and the biasing member 98 are disposed in the manner of being sandwiched between the main body sections 911 and 912.

As depicted in FIGS. 21 and 23, the first main body section 911 has on one end side thereof an attachment portion 9111 to which the extendable member 92 is attached, and has on the other end side thereof two recesses 9112 where movable bodies 941 of the slide member 94 are disposed. Bottom portions of these recesses 9112 function as guide surfaces for guiding sliding in the vertical direction (±Y direction) of the movable bodies 941.

In addition, the first main body section 911 has, at a position interposed between the pair of recesses 9112 and at a position on the one end side, holes 9113 in which screws SC to be fixed to the second main body section 912 are inserted and passed.

At that surface 912A of the second main body section 912 which is on the side opposite to the first main body section 911 side, there are provided a positioning projection 9121 and three fixation portions 9122 which are located on the same straight line. While the details will be described later, the positioning projection 9121 and the three fixation portions 9122 are utilized when the band member 9 is attached to the attachment members 8L and 8R. Note that the fixation portion 9122 is composed of an insert nut in the present embodiment.

In addition, the second main body section 912 has in the surface 912A a recess 9123 where the locking member 96 is disposed, and has an opening 9124 connected to the recess 9123. In the opening 9124, a connection portion 972 connected to a locking piece 961 disposed in the recess 9123 is inserted and passed.

Further, the second main body section 912 is formed on one end side thereof with an opening 9125 through which an operation button 971 is exposed.

As depicted in FIGS. 22 and 24, the second main body section 912 has, at a surface 912B on the first main body section 911 side, three fixation portions 9126, two disposing portions 9127 and one disposing portion 9128.

The screws SC inserted and passed through the holes 9113 are fixed to the three fixation portions 9126.

The two disposing portions 9127 are portions where first biasing members 981 of the biasing member 98 which will be described later are disposed along the vertical direction. Some of these disposing portions 9127 face the recess 9112 of the first main body section 911, and another part is covered with the slide member 94.

The one disposing portion 9128 is a portion which is located at a part on the lower side, of a surface 912B, and at which a second biasing member 982 of the biasing member 98 is disposed along the vertical direction.

Further, as depicted in FIGS. 21 to 24, the second main body section 912 has a hole 9129, penetrating the second main body section 912 along the transverse direction of the second main body section 912, and an attachment portion 9130.

In the hole 9129, a bar-shaped portion 942 of the slide member 94 is inserted and passed in the transverse direction. The slide member 94 is slidable in the vertical direction, and, therefore, the hole 9129 is also a hole elongated in the vertical direction.

A second link member 952 of the link member 95 is rotatably attached to the attachment portion 9130.

Configuration of Extendable Member

The extendable member 92 is attached to the attachment portion 9111 of the first main body section 911. The extendable member 92 is composed of an elastic (extendable) band of rubber or the like, and its free end when it is attached to the attachment portion 9111 is connected to a first belt-shaped portion 931 of the belt-shaped member 93. The extendable member 92 has a function of adjusting the inside circumference size of the band member 9, through contraction and extension, and enhancing the degree of close contact of the mounting member 7 with the one hand.

Configuration of Belt-Shaped Member

The belt-shaped member 93 is disposed on the back of the hand when the band member 9 is mounted to one hand. The belt-shaped member 93 includes the first belt-shaped portion 931 connected to the extendable member 92, a second belt-shaped portion 932 connected to a first link member 951 of the link member 95, and a buckle 933 interconnecting the first belt-shaped portion 931 and the second belt-shaped portion 932.

The length size of the belt-shaped member 93 as above is preliminarily adjusted by the user according to the circumference size of the user's one hand when the band member 9 is mounted to the one hand.

Configuration of Slide Member

The slide member 94 is attached to the main body member 91 so as to be slidable in the vertical direction. The slide member 94 includes the two movable bodies 941 and one bar-shaped portion 942.

The two movable bodies 941 are each formed to be substantially L-shaped in cross section, and are accommodated in the above-mentioned two recesses 9112 (see FIGS. 21 and 23).

As depicted in FIGS. 21 and 23, the bar-shaped portion 942 interconnects the two movable bodies 941. The bar-shaped portion 942 is inserted and passed through the hole 9129, whereby the slide member 94 is restrained from falling off the main body member 91, and sliding of the slide member 94 along the vertical direction is guided.

Configuration of Link Member

The link member 95 is a member for sliding the slide member 94 along the vertical direction. As depicted in FIGS. 21 to 24, the link member 95 has the first link member 951 and the second link member 952.

The first link member 951 is rotatably supported by the bar-shaped portion 942 of the slide member 94 at one end thereof. To the other end of the first link member 951, is connected an end portion on the side opposite to the buckle 933 side, of the second belt-shaped portion 932 of the belt-shaped member 93.

In addition, that surface of the first link member 951 which is on the side opposite to the second main body section 912 side is a flat surface, and is a contact surface 951A with which the palm of the user can make contact. The contact surface 951A is provided with a bulging member 955 having a shape according to a recess located in the center of the palm.

The second link member 952 has a size of approximately one half the size of the first link member 951. Of the second link member 952, one end is rotatably supported by a bar-shaped portion 953 suspended from a substantially central portion of the first link member 951, and the other end is rotatably supported on the attachment portion 9130 of the second main body section 912 by the bar-shaped portion 954.

When the second link member 952 projects from the second main body section 912 in the manner of inclining relative to the second main body section 912 and the first link member 951 is moved downward while inclining relative to the second main body section 912, the slide member 94 to which the first link member 951 is connected is slid downward, as depicted in FIGS. 21 and 22.

On the other hand, when the second link member 952 is rotated in the manner of coming along the second main body section 912 and the first link member 951 is moved upward while rotating in the manner of coming along the second main body section 912, the slide member 94 is slid upward, as depicted in FIGS. 23 and 24.

Configuration of Locking Member

The locking member 96, by locking the bar-shaped portion 953, maintains a state in which the slide member 94 has been slid upward, namely, as contracted state of the band member 9. As depicted in FIGS. 21 to 24, the locking member 96 includes the locking piece 961 vertically slidably disposed in the recess 9123 in the second main body section 912, and a fixation portion 962.

The locking piece 961 is provided at a lower end portion thereof with a pair of locking claws 9611 for locking the bar-shaped portion 953, and has slots 9612 and 9613 and a pair of tapped holes 9614.

When the first link member 951 and the second link member 952 are disposed along the second main body section 912, the pair of locking claws 9611 lock the bar-shaped portion 953 which is a connection portion between these link members 951 and 952. Note that those end portions of the pair of locking claws 9611 which are on the first link member 951 side are inclined in the direction for spacing more from the first link member 951 in going downward. This ensures that when the pair of locking claws 9611 lock the bar-shaped portion 953, the locking piece 961 is slid upward, and is then slid downward, thereby locking the bar-shaped portion 953.

In the slots 9612 and 9613, the positioning projection 9121 and the fixation portions 9122 located in the recess 9123 are inserted and passed.

The screws SC inserted and passed through the fixation portion 962 are fixed to the tapped holes 9614.

That end portion of the locking piece 961 which is on the side opposite to the locking claws 9611 is connected to the operation member 97.

The fixation portion 962 is disposed on the side opposite to the locking piece 961, with the second main body section 912 interposed therebetween, and is fixed to the locking piece 961 by a process in which the screws SC inserted and passed through the fixation portion 962 are fixed to the above-mentioned tapped holes 9614. As depicted in FIGS. 21 and 23, the second biasing member 982 making contact with an upper end surface of the above-mentioned disposing portion 9128 (see FIGS. 22 and 24) at its one end makes contact with the fixation portion 962 at its other end. By this, the locking piece 961 with the fixation portion 962 fixed thereto is biased downward, namely, in a direction in which the locking piece 961 locks the bar-shaped portion 953.

Configuration of Operation Member

The operation member 97 is operated when the band member 9 is extended and detached from one hand, to slide the locking piece 961 upward, thereby releasing the locking of the bar-shaped portion 953 by the locking piece 961, namely, releasing the contracted state of the band member 9. As depicted in FIGS. 21 to 24, the operation member 97 includes the operation button 971 and the connection portion 972.

The operation button 971 is exposed to the exterior through the opening 9125. Of the operation button 971, an end portion on the connection portion 972 side is rotatably supported in the main body member 91.

Besides, the connection portion 972 is connected to the operation button 971 on one end side thereof, and is connected to the locking piece 961 on the other end side. Therefore, when that end portion of the operation button 971 which is on the side opposite to the connection portion 972 side is depressed, the connection portion 972 is pulled up by the principle of lever, and the locking piece 961 is pulled up. As a result, the locking of the bar-shaped portion 953 by the locking piece 961 is released.

Configuration of Biasing Member

As depicted in FIGS. 21 and 23, the biasing member 98 is configured to have the two first biasing members 981 and the one second biasing member 982. In the present embodiment, the first biasing members 981 and the second biasing member 982 are each composed of a compression coil spring.

The two first biasing members 981 are disposed along the vertical direction at the disposing portions 9127. Each of the first biasing members 981 is in contact with an upper surface of an inner surface of the disposing portion 9127 at one end thereof, and is in contact with the movable body 941 at the other end thereof. Therefore, each of the first biasing members 981 is biasing each of the movable bodies 941 downward. In other words, the first biasing members 981 are biasing the slide member 94 in such a manner as to bring the band member 9 into the extended state. Note that the number of the first biasing members 981 is not limited to two, and may be one or may be three or more.

The one second biasing member 982 is disposed along the vertical direction at the disposing portion 9128 (see FIGS. 22 and 24). The second biasing member 982 is in contact with an upper surface of an inner surface of the disposing portion 9128 at one end thereof, and is in contact with the fixation portion 962 of the locking member 96 at the other end thereof. Therefore, the second biasing member 982 is biasing the locking member 96 downward, as above-mentioned. Note that the number of the second biasing member or members 982 is not limited to one, and may be two or more.

Additional Fastening of Band Member

Figure 25:
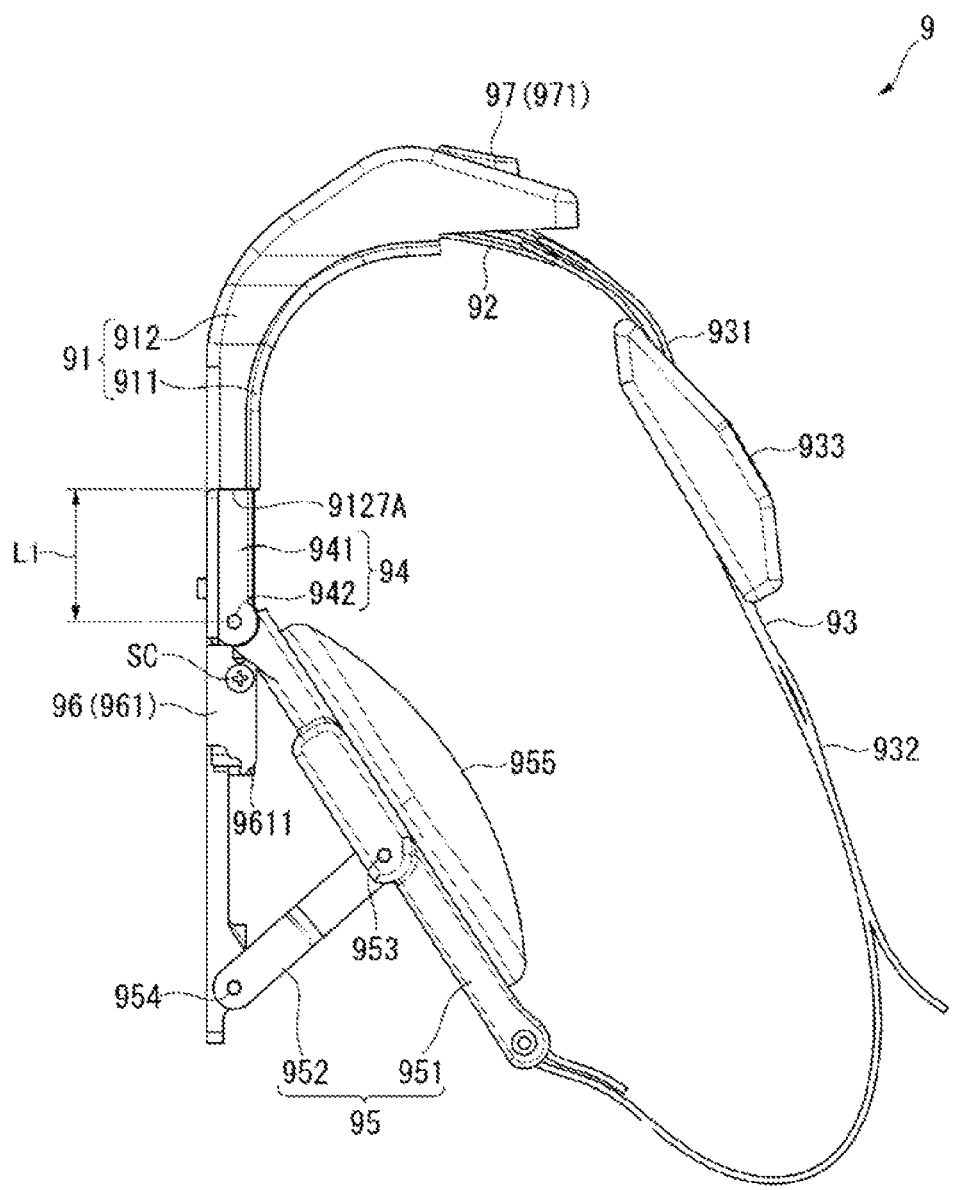
FIG. 25 is a side view depicting the band member in the extended state in the embodiment.
Figure 26:
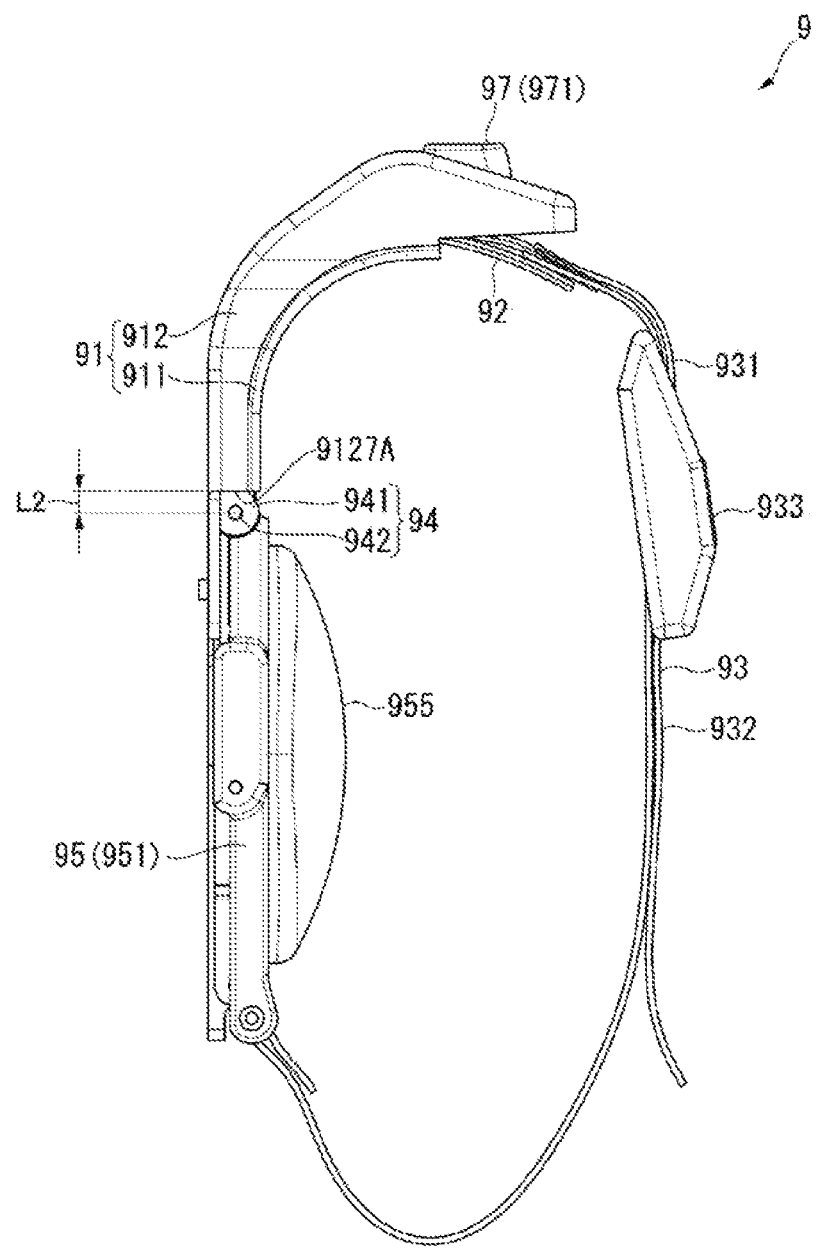
FIG. 26 is a side view depicting the band member in the contracted state in the embodiment.

FIG. 25 is a side view depicting the band member 9 in an extended state, and FIG. 26 is a side view depicting the band member 9 in a contracted state.

As above-mentioned, in the band member 9, with the slide member 94 slid upward from its position in the extended state, additional fastening of the band member 9 can be performed even after the length size of the belt-shaped member 93 is adjusted.

Specifically, when the link member 95 is rotated such as to come along the second main body section 912 and the slide member 94 is thereby slid upward, starting from a state in which the band member 9 in the extended state depicted in FIG. 25 is mounted to one hand, the band member 9 is brought into the contracted state, as depicted in FIG. 26.

In this contracted state, the size L2 between a lower end 9127A of the disposing portion 9127 and the bar-shaped portion 942 of the slide member 94 is smaller than the size L1 (see FIG. 25) between the lower end 9127A and the bar-shaped portion 942 in the extended state.

In this way, by pressing the contact surface 951A toward the second main body section 912 side to rotate the link members 951 and 952 and to slide the slide member 94 upward, starting from the state in which the band member 9 is mounted to one hand, the band member 9 can be additionally fastened by an amount (L1-L2). Therefore, the degree of close contact of the band member 9, and hence the operation apparatus 1, with the one hand can be enhanced.

Note that as above-mentioned, with the operation button 971 of the operation member 97 depressed, the locking of the bar-shaped portion 953 by the locking piece 961 is released, and the slide member 94 is slid downward by the biasing force of the first biasing members 981, whereby the band member 9 is brought into the extended state. As a result, the band member 9, and hence the operation apparatus 1, can be easily detached from the one hand.

Adjustment of Position of Apparatus Main Body in One Hand

Figure 27:
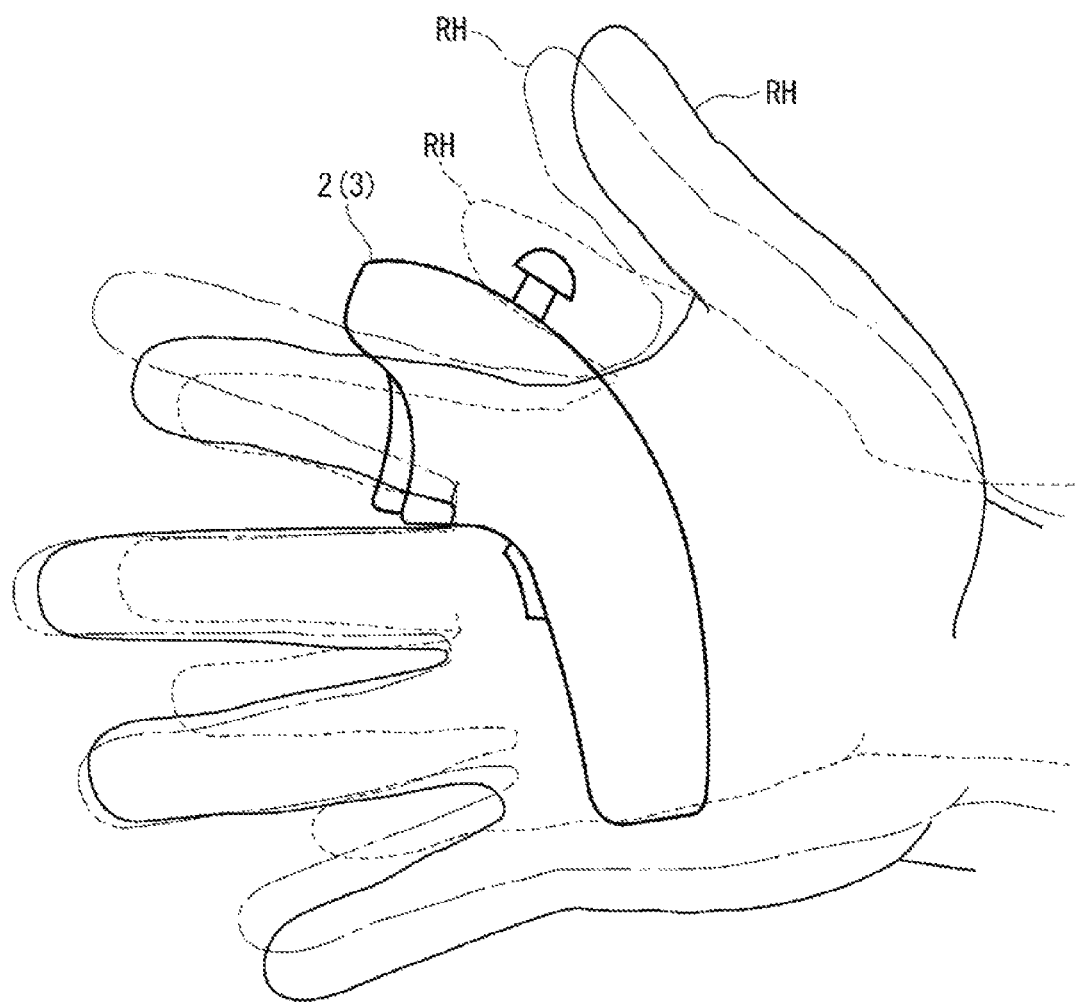
FIG. 27 is a figure for explaining the size of one hand, varying from user to user, in the embodiment.
Figure 28:
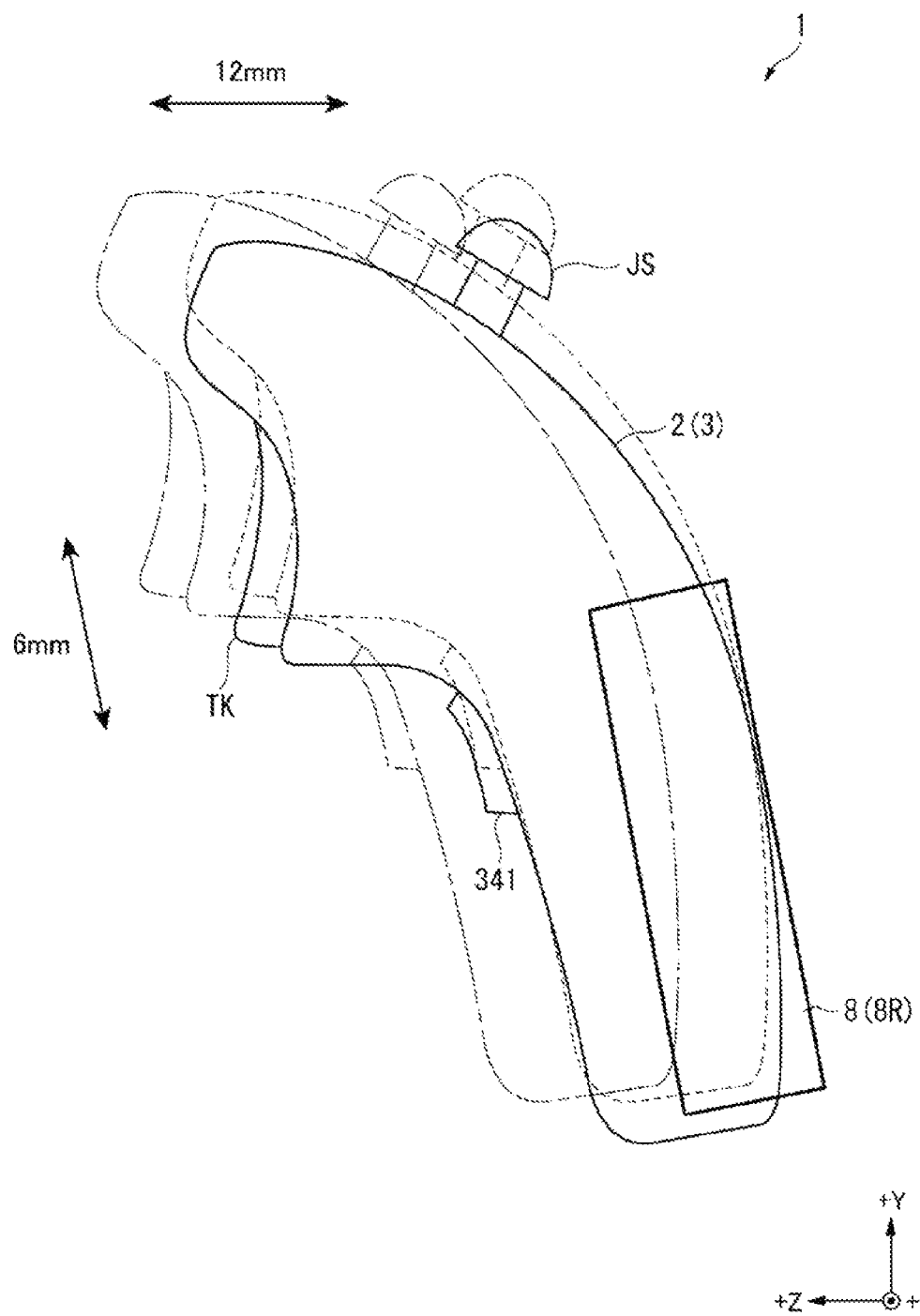
FIG. 28 is a figure for explaining a control range of the position of the apparatus main body in relation to the attachment member in the embodiment.

FIG. 27 is a figure for explaining the size of one hand, varying from user to user, to which the operation apparatus 1 is mounted, and FIG. 28 is a figure for explaining a control range of the position of the apparatus main body 2 in relation to the attachment member 8 (8R).

As above-mentioned, the band member 9 is attached to the attachment members 8 (8R, 8L), and the attachment members 8 are attached to the attachment portions 31R1 and 31L1, whereby the mounting member 7 is attached to the casing 3 of the apparatus main body 2, and the operation apparatus 1 can be mounted to one hand of the user.

Here, as depicted in FIG. 27, the size of one hand (for example, the right hand RH indicated by dotted line, alternate long and short dash line, and solid line) varies from user to user; therefore, by adjusting the position of the apparatus main body 2 relative to the mounting member 7 (attachment members 8) according to the size of the one hand, the positions of the operation sections 32 to 35 can be disposed at positions corresponding to the thumb and fingers, thereby facilitating operations of the operation apparatus 1. The adjustment range of the position of the apparatus main body 2 (casing 3) in relation to the mounting member 7, as depicted in FIG. 28, which range permits differences in the size of one hand among men and women of the ages assumed as the users, is found, by the present inventors, to vary by 12 mm in the front-rear direction (±Z direction) and by 6 mm in the vertical direction (±Y direction), based on a reference case where the operation apparatus 1 is mounted to one hand of an average size.

In order to enable an adjustment of the relative positions of the apparatus main body 2 and the mounting member 7 in such a position adjustment range, in the present embodiment, the relative attachment positions of the attachment members 8 (8R, 8L) attached to the attachment portions 31R1 and 31L1 of the apparatus main body 2 and the band member 9 mounted to one hand are adjustable, as above-mentioned.

Specifically, the attachment positions can be adjusted by a process wherein the position adjustment section in which the positioning projection 9121 possessed by the second main body section 912 of the band member 9 is inserted and passed and in which the screws fixed to the fixation portions 9122 are inserted and passed, of the four position adjustment sections in the attachment members 8R and 8L, is selected according to the size of the one hand.

FIGS. 29 to 32 are figures depicting the relative positions of the attachment member 8R and the band member 9.

Figure 29:
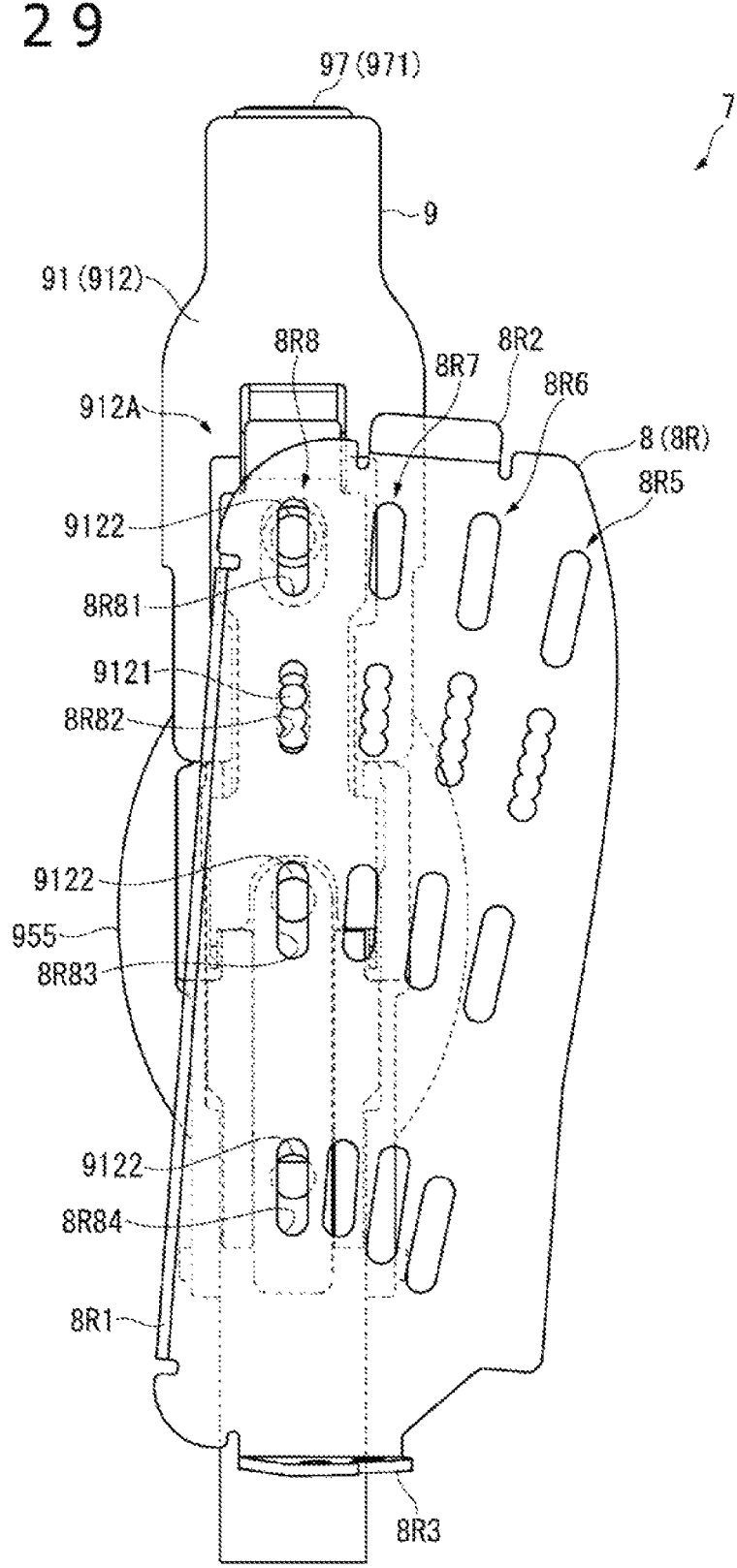
FIG. 29 is a figure depicting relative positions of the attachment member and the band member in the embodiment.

For example, with the band member 9 attached to the attachment member 8R by use of a position adjustment section 8R8 located most on the +Z direction side of the attachment member 8R, as depicted in FIG. 29, the apparatus main body 2 can be disposed most on the −Z direction side in the above-mentioned position adjustment range. In addition, where the hole in which to insert the positioning projection 9121 (see FIGS. 21 and 23) is selected from among the four holes possessed by the groove 8R82, the position of the band member 9 in the ±Y direction in relation to the attachment member 8R can be thereby adjusted.

Figure 30:
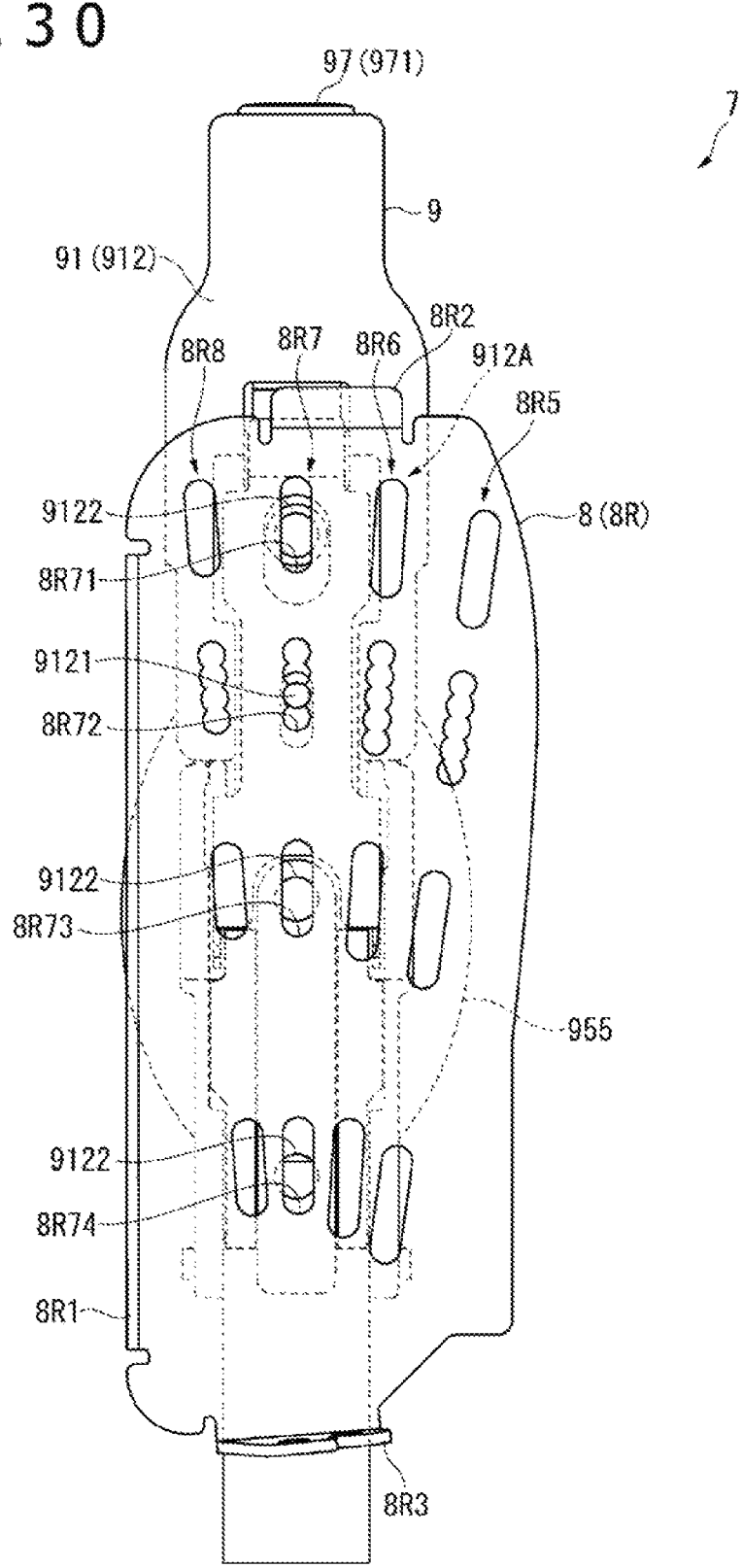
FIG. 30 is a figure depicting relative positions of the attachment member and the band member in the embodiment.
Figure 31:
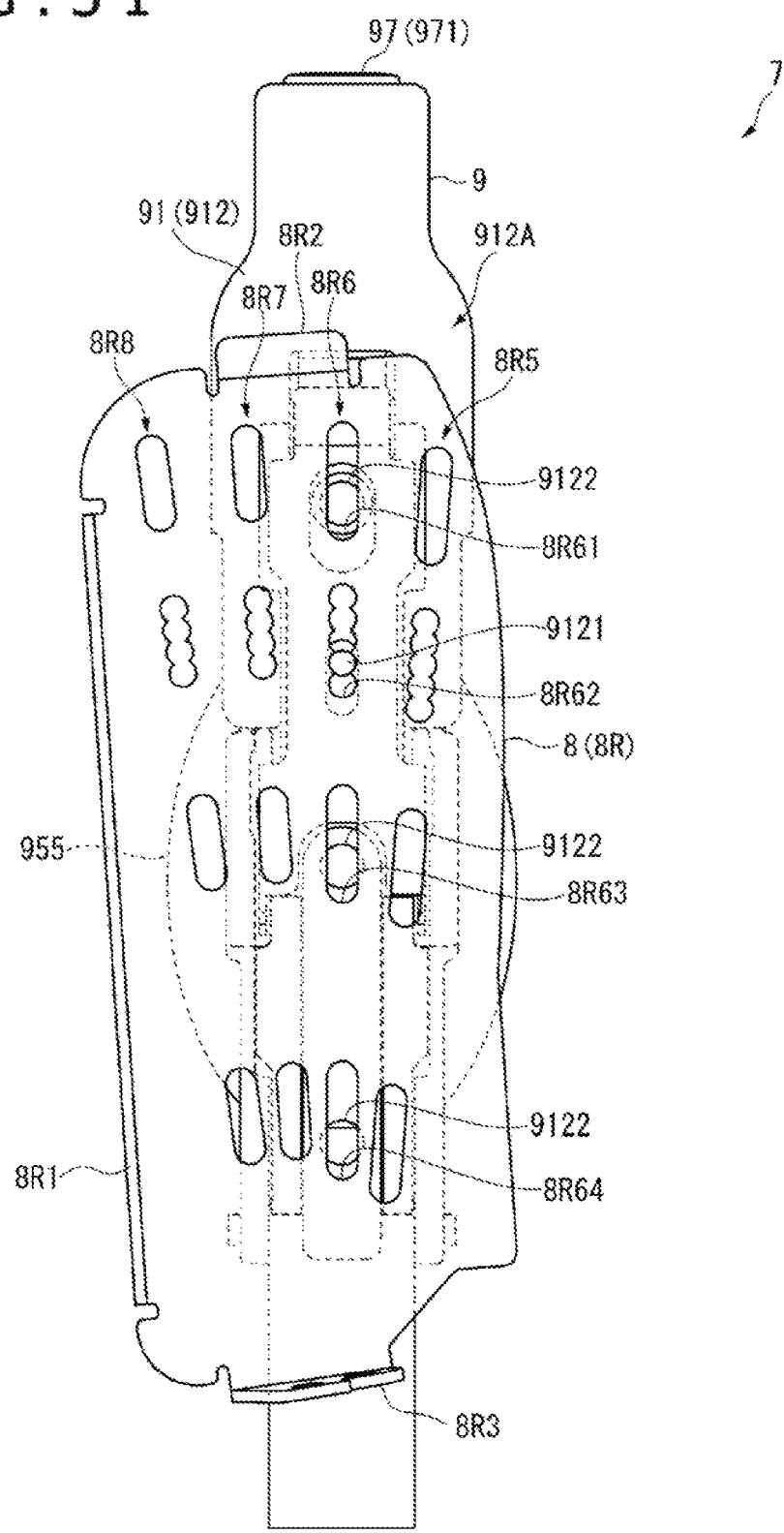
FIG. 31 is a figure depicting relative positions of the attachment member and the band member in the embodiment.

Besides, with the band member 9 attached to the attachment member 8R by use of a position adjustment section 8R7 or a position adjustment section 8R6 which is located on the −Z direction side relative to the position adjustment section 8R8 of the attachment member 8R, as depicted in FIGS. 30 and 31, the apparatus main body 2 can be disposed on the +Z direction side as compared to the case of using the position adjustment section 8R8. In addition, where the hole in which to insert the positioning projection 9121 is selected from among the four holes possessed by the groove 8R72 or from among the five holes possessed by the groove 8R62, the position of the band member 9 in the ±Y direction in relation to the attachment member 8R can be thereby adjusted.

Figure 32:
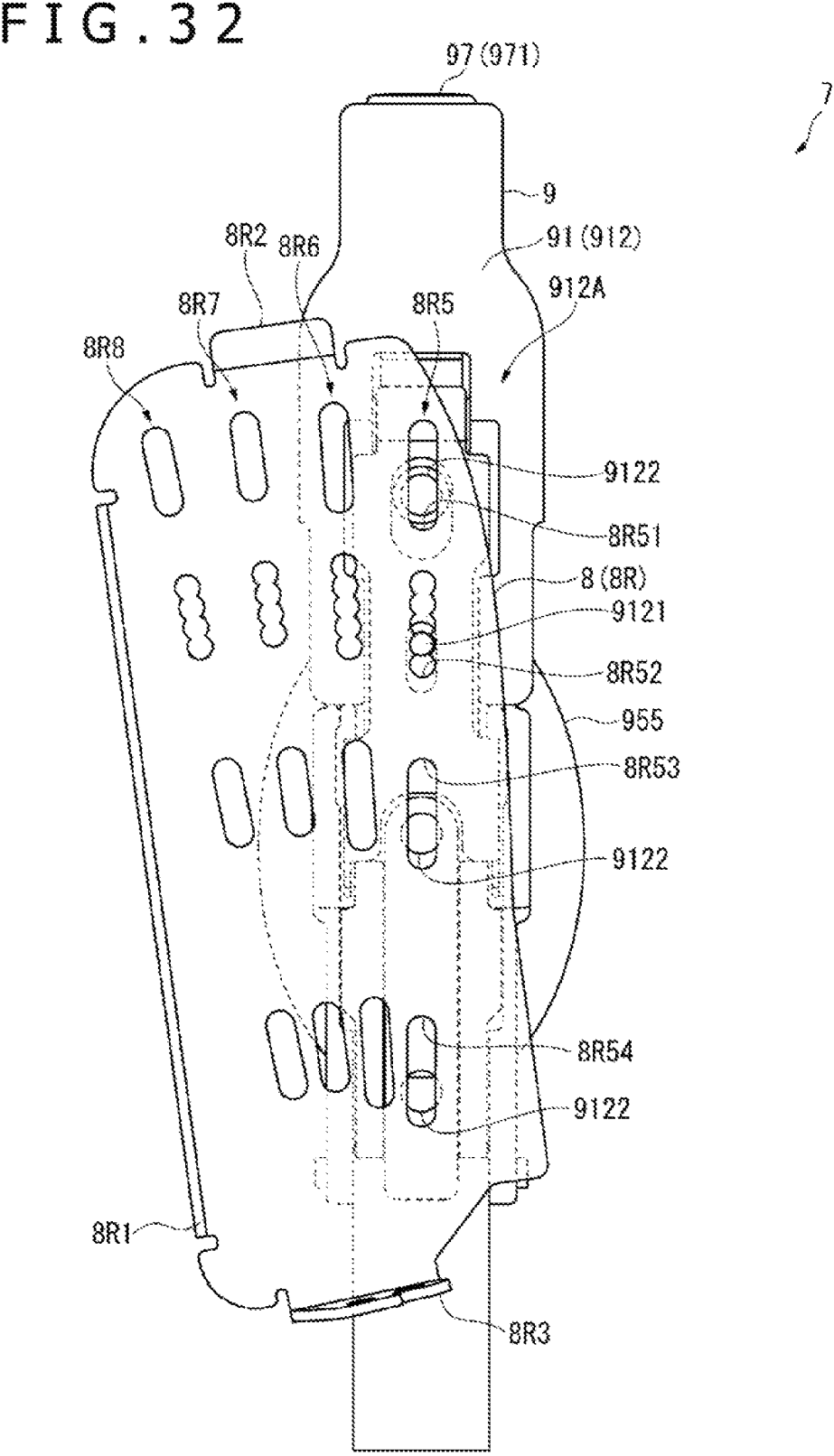
FIG. 32 is a figure depicting relative positions of the attachment member and the band member in the embodiment.

Further, with the band member 9 attached to the attachment member 8R by use of the position adjustment section 8R5 located most on the −Z direction side of the attachment member 8R, as depicted in FIG. 32, the apparatus main body 2 can be disposed most on the +Z direction side in the above-mentioned adjustment range. In addition, where the hole in which to insert the positioning projection 9121 is selected from among the five holes possessed by the groove 8R52, the position of the band member 9 in the ±Y direction in relation to the attachment member 8R can be thereby adjusted.

In this way, where the position adjustment section to be used when attaching the band member 9 to the attachment member 8R is selected from among the position adjustment sections 8R5 to 8R8 and where the hole in which to insert the positioning projection 9121 is selected from among the plurality of holes possessed by the grooves 8R52, 8R62, 8R72 and 8R82, the position of the apparatus main body 2 can be thereby adjusted in the right hand RH to which the band member 9 is mounted. The same applies also to the case where the band member 9 is attached to the attachment member 8L.

Note that if the adjustment of the positions of the attachment member 8 and the band member 9 in the above-mentioned position adjustment range, or the adjustment of the position of the apparatus main body 2 in one hand, is only to be performed, the groove directions DR1 to DR4 of the position adjustment sections 8R5 to 8R8 and the groove directions DL1 to DL4 of the position adjustment sections 8L5 to 8L8 may be parallel to the +Y direction.

On the other hand, in the present embodiment, the groove directions DR1 to DR4 are directions extending radially from the above-mentioned center point CR and are inclined relative to one another. Similarly, the groove directions DL1 to DL4 are directions extending radially from the above-mentioned center point CL and are inclined relative to one another.

This is for ensuring that the position of the operation section 32 (the joystick JS) is adjusted along arcuate virtual lines (not depicted) centered on the center points CR and CL, without largely varying the position of the operation section 33 (the trigger key TK) in one hand the size of which differs from user to user, whereby the operation section 32 is disposed at a position where the joystick JS and the push keys PK1 to PK5 are easy to operate with the thumb, independently of the size of the one hand to which the operation apparatus 1 is mounted.

Note that when attaching the band member 9 to the attachment member 8 (8L, 8R), which one of the respective four position adjustment sections 8L5 to 8L8 and 8R5 to 8R8 is to be used and in which one of the plurality of holes possessed by the grooves 8L52, 8L62, 8L72, 8L82, 8R52, 8R62, 8R72 and 8R82 the positioning projection 9121 is to be inserted can be predicted according to the size of one hand to which the band member 9 is mounted. Therefore, the information processing device PD may inform the user of the position adjustment section and the hole to be used, by the image display device DS or the like, based on the measurement results of the size of the one hand.

Left-Right Symmetry of Operation Apparatus

As above-mentioned, the casing 3 is configured in left-right symmetry, with the center plane CP as a center of symmetry. Besides, as depicted in FIGS. 9 and 10, the joystick JS, the push key PK3, the trigger key TK and the light sensors LS2 to LS4 which are disposed in the casing 3 are contained in the center plane CP and are disposed on the virtual lines VL1 and VL2 along the +Y direction. In addition, the push keys PK1 and PK4 and the push keys PK2 and PK5 are disposed in left-right symmetry, with the virtual line VL1 as a center of symmetry, as depicted in FIG. 9. Similarly, the two sensors constituting the light sensor LS1 are also disposed in left-right symmetry, with the virtual line VL1 as a center of symmetry.

In other words, not only in regard of the shape of the casing 3 but also in regard of the layout of the components of the operation detection section 4, the apparatus main body 2 is configured in left-right symmetry, with the center plane CP as a center of symmetry.

Figure 33:
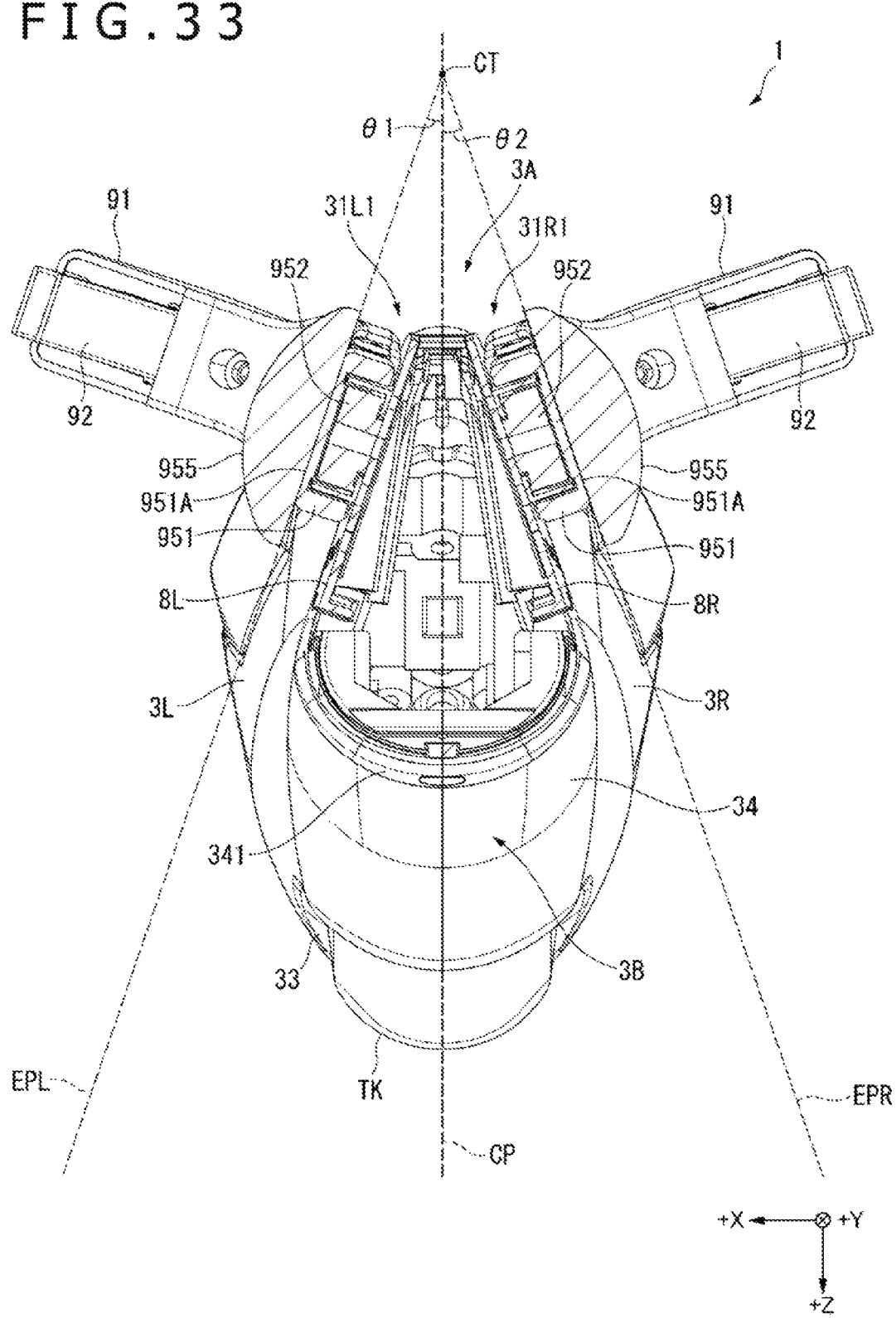
FIG. 33 is a sectional view depicting the operation apparatus wherein the mounting member is attached to left and right attachment portions individually.

FIG. 33 is a sectional view, taken along the XZ plane in the center of the first link member 951, of the operation apparatus 1 wherein the mounting member 7 is attached individually to the left and right attachment portions 31R1 and 31L1. Note that the attachment of the mounting member 7 individually to the left and right attachment portions 31R1 and 31L1 is not conducted in normal use of the operation apparatus 1, FIG. 33 depicts a state in which the mounting member 7 is attached to each of the attachment portions 31R1 and 31L1, for explaining the left-right symmetry of the operation apparatus 1.

On the other hand, also in the case where the mounting member 7 is attached individually to the attachment portions 31L1 and 31R1 of the casing 3, as depicted in FIG. 33, the apparatus main body 2 and the left and right mounting members 7 are configured in left-right symmetry, with the center plane CP as a center of symmetry.

In the mounting member 7 disposed in this way, the contact surface 951A of the first link member 951 is a contact surface with which the palm of the user can make contact, and extension planes EPL and EPR formed by extending the contact surfaces 951A when the mounting members 7 are in the contracted state are inclined at the same angle in relation to the center plane CP.

Specifically, the extension plane EPL intersects the center plane CP at an angle of θ1 at an intersection point CT located on the −Z direction side relative to the apparatus main body 2, and the extension plane EPR intersects the center plane CP at an angle θ2 at the intersection point CT. These angles θ1 and θ2 are equal. In other words, the center plane CP is a plane which contains a bisector of the intersection angle between the extension planes EPL and EPR. Thus, the extension plane EPL or EPR of the contact surface 951A of the mounting member 7 attached to either one of the left and right sides of the casing 3 is inclined relative to the center plane CP in such a manner as to be spaced more from the center plane CP in going in the +Z direction, whereby it is ensured that the shape of the casing 3 conforms to the shape of the one hand (the left hand LH or the right hand RH) that grasps the operation apparatus 1. For this reason, grasping of the operation apparatus 1 by the one hand can be facilitated. In addition, the shape of the casing 3 and the layout of the components of the operation detection section 4 are in left-right symmetry, whereby it is ensured that where the operation apparatus 1 is mounted to either the right hand RH or the left hand LH, the grasping of the operation apparatus 1 can be facilitated, and operations of the operation apparatus 1 can be facilitated.

Note that in the present embodiment, the angles θ1 and θ2 are individually set to 20 degrees.

Note that the extension plane EPL is parallel to a virtual plane interconnecting end edges of the attachment portion 31L1 formed in a recessed shape in the left side surface 3L (that attachment plane of the casing 3 to which the attachment member 8L is attached), and to a virtual plane obtained by extending an outer surface of the attachment member 8L attached to the attachment portion 31L1 (that attachment plane of the casing 3 having the attachment member 8L attached thereto to which the band member 9 is attached). Similarly, the extension plane EPR is parallel to a virtual plane interconnecting end edges of the attachment portion 31R1 formed in a recessed shape in the right side surface 3R (that attachment plane of the casing 3 to which the attachment member 8R is attached), and to a virtual plane obtained by extending an outer surface of the attachment member 8R attached to the attachment portion 31R1 (that attachment plane of the casing 3 having the attachment member 8R attached thereto to which the band member 9 is attached).

Thus, each of the virtual planes (attachment planes) is inclined in such a direction as to be spaced more from the center plane CP in going toward the +Z direction side, whereby the extension planes EPL and EPR of the contact surface 951A can be securely inclined as above-mentioned. On the other hand, even in the case of grasping the grasping section 31 of the casing 3 in a state in which the band member 9 is not attached, the grasping of the casing 3 (apparatus main body 2) can be facilitated, whereby the same effects as above can be produced.

Effects of the Embodiment

According to the operation apparatus 1 of the present embodiment as described above, the following effects are obtained.

The operation apparatus 1 includes the operation section 32 that is located on the front surface 3A side and that can be operated by the thumb RH1 or LH1 of the right hand RH or the left hand LH, the operation sections 33 to 35 that are located on the back surface 3B side and that can be operated by the fingers RH2 to RH5 or LH2 to LH5 other than the thumb RH1 or LH1, and the contact surface 951A with which the palm of the right hand RH or the left hand LH makes contact. Besides, the extension plane EPR of the contact surface 951A when the mounting member 7 is attached to the attachment portion 31R1 and the extension plane EPL of the contact surface 951A when the mounting member 7 is attached to the attachment portion 31L1 are inclined in such directions as to be spaced more, in going in the +Z direction, from the center plane CP which is a virtual plane defined by the +Z direction that is the first direction from the front surface 3A side toward the back surface 3B side and the +Y direction that is the second direction being orthogonal to the +Z direction and directed from the bottom surface 3D side toward the top surface 3C side.

As a result of this, the shape of that part of the operation apparatus 1 which is grasped by one hand of the user can be made to conform to the shape of the one hand used in grasping the part. Therefore, grasping of the operation apparatus 1 by one hand can be facilitated, and operations of the operation apparatus 1 can be facilitated.

The operation apparatus 1 has the contact surface 951A located on the right side relative to the center plane CP in the case of attaching the mounting member 7 to the attachment portion 31R1, and has the contact surface 951A located on the left side relative to the center plane CP in the case of attaching the mounting member 7 to the attachment portion 31L1. Specifically, these contact surfaces 951A are located on the opposite sides of the center plane CP, as depicted in FIG. 33; one of the contact surface 951A located on the right side and the contact surface 951A located on the left side corresponds to a first contact surface in the present invention, and the other corresponds to a second contact surface in the present invention. In addition, each of the extension planes EPR and EPL of the contact surface 951A is inclined in such a direction as to be spaced more from the center plane CP in going in the +Z direction.

As a result of this, the operation apparatus 1 can be mounted to and grasped by the right hand RH and the left hand LH, independently. Accordingly, an operation apparatus 1 which can be used individually by the right hand RH and the left hand LH can be configured.

The casing 3 possessed by the operation apparatus 1 has the above-mentioned operation sections 32 to 35, and the center plane CP as the virtual plane in the present invention is a center plane of the casing 3 that contains the bisector of the intersection angle of the above-mentioned extension planes EPL and EPR.

As a result of this, the casing 3 can be structured in left-right symmetry, and the components of the operation sections 32 to 35 can be laid out in left-right symmetry. Therefore, the operation apparatus 1 can be configured as an operation apparatus for both left use and right use, and it is unnecessary to manufacture a right-use operation apparatus and a left-use operation apparatus; accordingly, the manufacturing cost of the operation apparatus 1 can be cut down, and versatility of the operation apparatus 1 can be enhanced.

In the operation apparatus 1, the intersection angle between the extension plane EPL and the center plane CP is 20 degrees, the intersection angle between the extension plane EPR and the center plane CP is 20 degrees, and the intersection angle between these extension planes EPL and EPR is 40 degrees, which is an acute angle. In other words, the intersection angle between the extension plane of the contact surface 951A of the mounting member 7 disposed on one of the left and right sides and the side surface on the other side is 40 degrees, which is an acute angle.

This ensures that the thumb and fingers can be put easy around the operation apparatus 1, as compared to the case where the extension planes EPL and EPR intersect each other at an obtuse angle, and, therefore, the operation apparatus 1 can be grasped easily by one of the left and right hands. Accordingly, operations of the operation apparatus 1 by the one hand can be facilitated.

The operation apparatus 1 includes the casing 3 that has the operation sections 32 to 35, and the mounting member 7 for mounting the casing 3 to one hand of the user. The mounting member 7 includes the attachment member 8 (8L, 8R) attached to the casing 3, and the band member 9 that is attached to the attachment member 8 and that is wound along the palm and the back of the right hand RH or the left hand LH.

As a result of this, the state in which the casing 3 (apparatus main body 2) having the operation sections 32 to 35 is mounted to one hand of the user can be maintained by the band member 9, even in the case where all the thumb and fingers are put off the casing 3. Therefore, utility of the operation apparatus 1 can be enhanced, and the sensors LS1 to LS5 can securely detect the positions of the thumb and fingers RH1 to RH5, or LH1 to LH5.

In the operation apparatus 1, the attachment member 8R attached to the attachment portion 31R1 of the casing 3 has the position adjustment sections 8R5 to 8R8 capable of individually adjusting the position of the band member 9 in the +Y direction, and the position adjustment sections 8R5 to 8R8 are disposed juxtaposedly along the +Z direction which is the depth direction of the operation apparatus 1. Similarly, the attachment member 8L attached to the attachment portion 31L1 of the casing 3 has the position adjustment sections 8L5 to 8L8 capable of individually adjusting the position of the band member 9 in the +Y direction, and the position adjustment sections 8L5 to 8L8 are disposed juxtaposedly along the +Z direction.

As a result of this, the position of the attachment member 8L or 8R in one hand to which the band member 9 is mounted can be adjusted, and, hence, the position of the casing 3 (apparatus main body 2) in the one hand can be adjusted. Therefore, the position of the apparatus main body 2 can be adjusted according to the size of one hand of the user, the operation sections 32 to 35 can be disposed at such positions that they are easy for the user to operate, and, accordingly, operations of the operation apparatus 1 can be facilitated.

In the operation apparatus 1, the band member 9 includes the positioning projection 9121 projecting to the attachment member 8L or 8R side, and the three fixation portions 9122 to which the fixture (screws) inserted and passed through the attachment member 8L or 8R are fixed. The position adjustment section 8R5 of the attachment member 8R includes the groove 8R52 as the first groove having the plurality of holes in which to insert the positioning projection 9121, and the grooves 8R51, 8R53 and 8R54 as the second grooves in which to insert and pass the fixtures. The other position adjustment sections 8R6 to 8R8 of the attachment member 8R are configured in the same manner, and the same applies also to the position adjustment sections 8L5 to 8L8 possessed by the attachment member 8L.

As a result of this, adjustment of the position of the casing 3 (apparatus main body 2) in the +Y direction in relation to the attachment member 8L or 8R can be carried out in a reliable manner.

Accordingly, operations of the operation apparatus 1 can be facilitated assuredly.

The groove 8R52 as the first groove and the grooves 8R51, 8R53 and 8R54 as the second grooves, which constitute the position adjustment section 8R5, are formed along the groove direction DR1. In addition, the position adjustment section 8R5 and the other position adjustment sections 8R6 to 8R8, which are configured in the same manner as the position adjustment section 8R5, are provided along the +Z direction that intersects the groove direction DR1.

This ensures that where the position adjustment section to be utilized in attaching the band member 9 to the attachment member 8R is selected from among the position adjustment sections 8R5 to 8R8, it is thereby enabled to reliably carry out the adjustment of the position of the band member 9 in the +Z direction in the attachment member 8R, and, hence, the adjustment of the position of the apparatus main body 2 in the +Z direction in one hand. Accordingly, operations of the operation apparatus 1 can be facilitated reliably. Such an effect can be similarly produced also by the attachment member 8L and the band member 9.

In the attachment member 8R, the groove directions DR1 to DR4 of the position adjustment sections 8R5 to 8R8 extend radially, with the center point CR as a center. Similarly, in the attachment member 8L, the groove directions DL1 to DL4 of the position adjustment sections 8L5 to 8L8 extend radially, with the center point CL as a center.

This ensures that the position of the joystick JS disposed in the operation section 32 can be adjusted according to the size of one hand of the user, without largely changing the position of the trigger key TK disposed in the operation section 33 according to the size of the one hand of the user. In other words, the operation section 32 can be disposed at such a position that it can be easily operated by the thumb RH1 or LH1 of the user. As a result, operations of the operation apparatus 1 can be further facilitated.

The band member 9 includes the main body member 91, the belt-shaped member 93 that is connected to the main body member 91 through the extendable member 92 at one end thereof and that is wound around one hand, a sliding mechanism (the slide member 94 and the link member 95) that is connected to the main body member 91 and the other end of the belt-shaped member 93, that slides relative to the main body member 91 and that extends and contracts the inside circumference size of the band member 9, and the locking member 96 that locks the bar-shaped portion 953 of the link member 95 in a state in which the inside circumference size of the band member 9 is contracted.

This ensures that even after the band member 9 is mounted to one hand by preliminarily adjusting the size of the belt-shaped member 93, the inside circumference size of the band member 9 can be further contracted by sliding the slide member 94. By this, the degree of close contact of the band member 9 with the one hand can be enhanced; therefore, operations of the operation apparatus 1 can be facilitated, and noises due to shaking of the apparatus main body 2 connected to the mounting member 7 can be restrained from being included in the results of detection by the acceleration sensor AS and the gyro sensor GS.

The band member 9 has the first biasing members 981 as an extension-side biasing member for biasing the slide member 94 in such a direction that the inside circumference size of the band member 9 is extended.

This ensures that at the time of detaching the band member 9 from one hand, the inside circumference size of the band member 9 can be easily enlarged by sliding the slide member 94. Therefore, detachment of the band member 9 from the one hand can be easily carried out.

The locking member 96 is configured to be slidable along the sliding direction of the slide member 94 in the recess 9123. In addition, the band member 9 has the second biasing member 982 as the contraction-side biasing member for biasing the locking member 96 in such a direction that the locking member 96 locks the sliding mechanism (the bar-shaped portion 953). This makes it possible to securely maintain a state in which the inside circumference size of the band member 9 is contracted. Therefore, at the time of utilizing the operation apparatus 1, the slide member 94 can be restrained from unintentionally sliding to extend the inside circumference size of the band member 9, causing the band member 9, and hence the operation apparatus 1, to fall off the one hand.

The band member 9 includes the slide member 94 that is connected to the main body member 91 and that slides relative to the main body member 91, and the link member 95 that is connected to the slide member 94 and the second main body section 912 of the main body member 91. Of these components, the link member 95 includes the first link member 951 that is rotatably connected to the slide member 94 at one end thereof and that is connected to the second belt-shaped portion 932 of the belt-shaped member 93 at the other end thereof, and the second link member 952 that is rotatably connected to the first link member 951 at one end thereof and that is rotatably connected to the second main body section 912 at the other end thereof. Besides, the locking member 96 locks the bar-shaped portion 953 which is a connection portion between the first link member 951 and the second link member 952.

As a result of this, sliding of the slide member 94 can be securely prevented by restraining the rotation of the first link member 951 and the second link member 952. Therefore, a contracted state of the band member 9 can be maintained reliably.

Further, in the extended state of the band member 9, the first link member 951 is projecting to the palm side, and, by turning the wrist, it is possible to rotate the first link member 951 toward the side of approaching the second main body section 912, and, hence, it is possible to slide the slide member 94 in the +Y direction, which is the direction for transition of the band member 9 into the contracted state. As a result of this, transition of the band member 9 from the extended state into the contracted state can be effected, and, therefore, an operation of contracting the inside circumference size of the band member 9 can be easily carried out.

The band member 9 has the operation member 97 that releases the locking of the sliding mechanism (the bar-shaped portion 953) by the locking member 96. This ensures that with the operation button 971 of the operation member 97 depressed, the connection portion 972 connected to the operation button 971 can move the locking member 96 (locking piece 961) in the +Y direction, or such a direction as to release the locking of the bar-shaped portion 953. Therefore, changeover of the band member 9 from the contracted state into the extended state can be easily carried out, and detachment of the band member 9 from the one hand can be easily performed.

In the band member 9, the contact surface 951A brought into contact with the palm of one hand is possessed by the first link member 951, and the first link member 951 has the bulging member 955 at the contact surface 951A. The bulging member 955 has a shape according to the recess (hollow) located in the center of the palm.

As a result of this, with the bulging member 955 fitted in the recess, oscillation of the band member 9 mounted to one hand in the +Z direction and the +Y direction can be restricted. Therefore, the band member 9, and hence the operation apparatus 1, can be stably mounted to the one hand. In addition, by this, the noises can be securely restrained from being included in the results of detection by the acceleration sensor AS and the gyro sensor GS.

Modification of the Embodiment

The present invention is not limited to the above embodiment, and modifications and improvements and the like within the scope in which the object of the present invention can be achieved are included in the present invention.

In the above embodiment, the casing 3 has had the operation section 32 as the first operation section and the operation sections 33 to 35 as the second operation sections. However, this is not limitative, and the casing 3 need only have at least one of the operation sections 33 to 35 as the second operation section.

In addition, the configurations of the lower casing portion 30A and the upper casing portion 30B, the configurations disposed in the operation sections 32 to 35 and the layout thereof are also not limited to the above-mentioned, and can be modified as required. For instance, the joystick JS need not be disposed in the operation section 32, and may be disposed on the operation section 33. In addition, the trigger key TK may not be disposed in the operation section 33, and may be disposed in the operation section 34 or the operation section 35. Further, the light sensors LS1 to LS5 may not be provided according to the thumb and fingers, and all the push keys PK1 to PK5 may not necessarily be disposed in the operation section 32. In addition, at least one of the operation sections 32 to 35 may not be configured in symmetry with respect to the center plane CP, and may not be located on the virtual lines VL1 and VL2 contained in the center plane CP. Besides, at least one of the operation sections 32 to 35 may be absent; for example, an operation apparatus having the operation section 32 and one of the operation sections 33 to 35 may be configured, and an operation apparatus lacking the operation section 32 may be configured.

In the above embodiment, the extension plane EPL of the contact surface 951A when the mounting member 7 is attached to the attachment portion 31L1 has intersected the center plane CP as a virtual plane at the intersection angle θ1 of approximately 20 degrees. In addition, the extension plane EPR of the contact surface 951A when the mounting member 7 is attached to the attachment portion 31R1 has intersected the center plane CP at the intersection angle θ2 of approximately 20 degrees. However, this is not limitative, and the intersection angles θ1 and θ2 may be any degrees, and the contact surface 951A and the center plane CP may directly intersect each other. In other words, the center plane CP may not be a virtual plane that contains the bisector of the intersection angle between the extension planes EPL and EPR, and the angles θ1 and θ2 may be angles different from each other.

In addition, the virtual plane intersected by the contact surface 951A and the extension planes EPL and EPR may not be the center plane CP that passes the center in regard of the +X direction of the casing 3 and that lies along the YZ plane. Specifically, the contact surface 951A and the extension planes EPL and EPR need only be inclined in such a direction as to be spaced more from the virtual plane (the virtual plane along the YZ plane), which is defined by the +Z direction (first direction) from the front surface 3A side toward the back surface 3B side and the +Y direction (second direction) being orthogonal to the +Z direction and directed from the bottom surface 3D toward the top surface 3C, in going in the +Z direction.

Further, so long as either the contact surface contacted by one hand (the palm) of the user or the extension plane of the contact surface is inclined in such a direction as to be spaced more from the virtual plane (for example, the center plane CP) along the YZ plane in going in the +Z direction, the attachment surface of the casing to which the mounting member is attached may not be parallel to the contact surface, and the configuration of the casing and the configuration of the mounting member are not restricted. For example, the attachment surface may not be inclined similarly to the contact surface, and may be parallel to the YZ plane.

In the above embodiment, the casing 3 has been configured in left-right symmetry, with the center plane CP as a center of symmetry, and the configurations of the operation detection section 4 disposed in the casing 3 have been disposed in left-right symmetry, with the center plane CP as a center of symmetry. However, this is not restrictive, and the shape of the casing 3 and the layout of the configurations of the operation detection section 4 may not be in left-right symmetry.

Besides, the casing 3 has been provided at the right side surface 3R with the attachment portion 31R1 to which either the battery case BCR or the mounting member 7 can be attached, and has been provided at the left side surface 3L with the attachment portion 31L1 to which either the battery case BCL or the mounting member 7 can be attached. However, this is not limitative, and the casing 3 of the apparatus main body 2 may be configured in such a manner that the mounting member 7 can be attached to only one of the right side surface 3R and the left side surface 3L, and the battery case can be attached to only the other.

In the above embodiment, the mounting member 7 attached to the casing 3 of the apparatus main body 2 and wound around one hand of the user has had the attachment member 8 (8L, 8R) and the band member 9. However, this is not limitative, and the configuration of the mounting member may be other configuration; the operation apparatus 1 may be utilized with the operation main body 2 grasped by the user's one hand, without using the mounting member 7. In the latter case, also, the same ease of grasping as above can be realized if the virtual plane interconnecting the end edges of the attachment portion 31L1 or 31R1 is parallel to the contact surface 951A.

Besides, in the above embodiment, an example in which the mounting member 7 is applied to the operation apparatus 1 has been depicted. However, this is not limitative, and the mounting member 7 may be adopted as a mounting member for a wearable apparatus to be utilized by being mounted to the user. In this case, only the band member 9 may be used. Further, the part to which the band member 9 is to be mounted is not limited to the above-mentioned part of one hand, and may be other part (for example, the wrist) of the body of the user.

In the above embodiment, the attachment member 8L has had the position adjustment sections 8L5 to 8L8 capable of adjusting the attachment position of the band member 9, and hence the position of the apparatus main body 2 in the one hand to which the band member 9 is mounted, and, similarly, the attachment member 8R has had the position adjustment sections 8R5 to 8R8. However, this is not restrictive, and such position adjustment sections may be absent. Besides, even in the case where the attachment member has the position adjustment sections, the configuration of the position adjustment sections is not limited to the configuration of having the above-mentioned grooves, but may be other configuration, so long as the attachment position of the band member 9 (the position of the apparatus main body 2 in one hand) can be adjusted along at least one of the +Y direction and the +Z direction.

In the above embodiment, the position adjustment section 8R5 has had the groove 8R52 as the first groove, and the grooves 8R51, 8R53 and 8R54 as the second grooves. However, this is not limitative, and the position adjustment section may be configured to have at least one first groove and at least one second groove. In addition, the number of the holes possessed by the first groove is also not limited to the above-mentioned, and may be modified as required. The same applies also to the other position adjustment sections 8R6 to 8R8, and 8L5 to 8L8.

Further, the attachment member 8R has had the four position adjustment sections 8R5 to 8R8, and the attachment member 8L has had the four position adjustment sections 8L5 to 8L8. However, this is not restrictive, and the number of the position adjustment sections can be modified as required.

In other words, if there is a plurality of position adjustment sections, the band member 9 can be attached to a plurality of parts in the +Z direction, and, if there is a plurality of holes possessed by the first groove, the band member 9 can be attached to a plurality of parts in the +Y direction in one position adjustment section.

In the above embodiment, the groove directions DR1 to DR4 of the grooves possessed by the position adjustment sections 8R5 to 8R8 have extended radially, with the center point CR as a center. However, this is not restrictive, and the groove directions DR1 to DR4 may be parallel to one another. In addition, even in the case where the groove directions DR1 to DR4 extend radially, their angles relative to the +Y direction can be modified as required. The same applies also to the groove directions DL1 to DL4 of the grooves possessed by the position adjustment sections 8L5 to 8L8.

In the above embodiment, the band member 9 has had the sliding mechanism configured to have the slide member 94 and the link member 95. However, this is not limitative, and the band member 9 may not have the sliding mechanism. In other words, the band member 9 may not have a configuration wherein additional fastening can be performed.

Note that even in the case where the band member has the sliding mechanism, the link member 95 may not be provided. In this case, for example, the slide member 94 may be extended in the -Y direction, and an end portion of the belt-shaped member 93 may be connected to an end portion on the -Y direction side of the slide member 94.

In the above embodiment, there have been the first biasing members 981 as the extension-side biasing member for biasing the slide member 94 in the -Y direction, and the second biasing member 982 as the contraction-side biasing member for biasing the locking member 96 in the direction for locking the sliding mechanism. However, this is not restrictive, and there may be adopted a configuration wherein at least one of the biasing members 981 and 982 is absent. Further, the biasing members 981 and 982 may not each be composed of a compression coil spring, and the biasing member may be composed of an elastic member such as rubber so long as it can exert a suitable biasing force.

Besides, in the above embodiment, the locking member 96 has maintained the contracted state of the band member 9 by locking the bar-shaped portion 953. However, this is not limitative, and the locking member may be configured to lock at least one of the parts constituting the slide member 94 and the link member 95, so long as the contracted state can be maintained by locking the sliding of the slide member 94. For example, the locking member 96 may lock at least a part of the slide member 94, such as the bar-shaped portion 942 which is the connection portion between the slide member 94 and the first link member 951, and may lock at least either the first link member 951 or the second link member 952 that constitute the link member 95.

In the above embodiment, the band member 9 has had the operation member 97 that releases the locking of the sliding mechanism by the locking member 96. However, this is not restrictive, and such an operation member 97 may be absent. In this case, the slide member 94 may be slid such as to bring the band member 9 into the extended state, by, for example, rotating the link member 95 by the user himself or herself.

Besides, even in the case where the band member 9 has the operation member 9, the configuration wherein the operation button 971 and the connection portion 972 are provided may not be adopted. In other words, the configuration of the operation member may be other configuration, so long as the locked state by the locking member 96 can be released, according to a predetermined operation by the user.

In the above embodiment, the contact surface 951A has been provided with the bulging member 955 according to the recess in the palm. However, this is not restrictive, and the bulging member 955 may be absent. In addition, the shape and configuration of the bulging member 955 may not be as above-mentioned, so long as the bulging member 955 can be attached to the contact surface 951A and can restrict oscillation of the band member 9.

In the above embodiment, the operation apparatus 1 has been capable of radio communication with the information processing device PD. However, this is not limitative, and the operation apparatus 1 and the information processing device PD may be configured to perform wired communication. In addition, the operation apparatus 1 has been supplied with electric power by the battery in the battery case BCR or BCL attached thereto. However, this is not restrictive, and the operation apparatus may be configured to be supplied with electric power from the exterior through a cable.

REFERENCE SIGNS LIST

1 . . . Operation apparatus, 3 . . . Casing, 3A . . . Front surface, 3B . . . Back surface, 3 . . . Top surface, 3D . . . Bottom surface, 32 . . . Operation section (First operation section), 33 to 35 . . . Operation section (Second operation section), 7 . . . Mounting member, 8 (8L, 8R) . . . Attachment member, 8L5 to 8L8, 8R5 to 8R8 . . . Position adjustment section, 8L52, 8L62, 8L72, 8L82, 8R52, 8R62, 8R72, 8R82 . . . Groove (First groove), 8L51, 8L53, 8L54, 8L61, 8L63, 8L64, 8L71, 8L73, 8L74, 8L81, 8L83, 8L84, 8R51, 8R53, 8R54, 8R61, 8R63, 8R64, 8R71, 8R73, 8R74, 8R81, 8R83, 8R84 . . . Groove (Second groove), 9 . . . Band member, 91 . . . Main body member, 93 . . . Belt-shaped member, 94 . . . Slide member (Sliding mechanism), 951 . . . First link member (Sliding mechanism), 952 . . . Second link member (Sliding mechanism), 953 . . . Bar-shaped portion (Connection portion), 955 . . . Bulging member, 96 . . . Locking member, 97 . . . Operation member, 981 . . . First biasing member (Extension-side biasing member), 982 . . . Second biasing member (Contraction-side biasing member), 9121 . . . Positioning projection, 9122 . . . Fixation portion, 951A . . . Contact surface (First contact surface, Second contact surface), CL, CR . . . Center point, CP . . . Center plane (Virtual plane), DL1 to DL4, DR1 to DR4 . . . Groove direction, EPL, EPR-Extension plane, LH . . . Left hand (One hand), LH1, RH1 . . . Thumb, LH2, RH2 . . . Index finger (Finger other than thumb), LH3, RH3 . . . Middle finger (Finger other than thumb), LH4, RH4 . . . Ring finger (Finger other than thumb), LH5, RH5 . . . Little finger (Finger other than thumb), RH . . . Right hand (one hand), US . . . User, +Z . . . Direction (First direction), +Y . . . Direction (Second direction).

The invention claimed is:

1. An operation apparatus mountable to one hand of a user, the operation apparatus comprising:
   a casing;
   an operation section that is provided on the casing and that can be operated by the one hand; and
   a mounting member by which the casing is mounted to the one hand,
   wherein the mounting member includes
   an attachment member attached to the casing, and
   a band member that is attached to the attachment member and that is wound along a palm and a back of the one hand, and
   the band member includes
   a main body member,
   a belt member that is connected to the main body member at one end of the belt member and that is wound around the one hand,
   a sliding mechanism to which the main body member and an other end of the belt member are connected, and which slides relative to the main body member to extend or contract an inside circumference size of the band member, and
   a locking member that locks the sliding mechanism in a state in which the inside circumference size has been contracted by sliding of the sliding mechanism.

2. The operation apparatus according to claim 1, wherein the operation section includes
   a first operation section that is located on a front surface side of the casing and that can be operated by a thumb of the one hand, and
   a second operation section that is located on a back surface side of the casing and that can be operated by a finger other than the thumb of the one hand.

3. The operation apparatus according to claim 2, wherein the sliding mechanism has a first contact surface with which the palm of the one hand makes contact, and
   in the state in which the inside circumference size has been contracted by sliding of the sliding mechanism, at least one of the first contact surface and an extension plane of the first contact surface is inclined relative to a virtual plane in such a direction as to be spaced more therefrom in going in a first direction, the virtual plane being defined by the first direction from the front surface side of the casing toward the back surface side of the casing and a second direction being orthogonal to the first direction and directed from a bottom surface side of the casing toward a top surface side of the casing.

4. The operation apparatus according to claim 3, further comprising:
   a second contact surface which is located on an opposite side of the virtual plane from the first contact surface and with which the palm of the one hand on a side opposite to the one hand of the user can make contact,
   wherein at least one of the second contact surface and an extension plane of the second contact surface is inclined relative to the virtual plane in such a direction as to be spaced more therefrom in going in the first direction.

5. The operation apparatus according to claim 4, wherein the virtual plane is a center plane of the casing, the center plane containing a bisector of an intersection angle between at least one of the first contact surface and the extension plane of the first contact surface and at least one of the second contact surface and the extension plane of the second contact surface.

6. The operation apparatus according to claim 4, wherein the intersection angle between at least one of the first contact surface and the extension plane of the first contact surface and at least one of the second contact surface and the extension plane of the second contact surface is an acute angle.

7. The operation apparatus according to claim 1, wherein the attachment member has a position adjustment section capable of adjusting an attachment position of the band member along at least one of a first direction from a front surface side of the casing toward a back surface side of the casing and a second direction being orthogonal to the first direction and directed from a bottom surface side of the casing toward a top surface side of the casing.

8. The operation apparatus according to claim 7, wherein the band member includes
   a positioning projection that projects to the attachment member side, and
   a fixation section to which a fixture inserted and passed through the attachment member is fixed; and
   the position adjustment section includes
   a first groove having a plurality of holes into which the positioning projection is inserted, and
   a second groove in which the fixture is inserted and passed.

9. The operation apparatus according to claim 8, wherein the first groove and the second groove are formed along a predetermined groove direction, and
   a plurality of the position adjustment sections are provided along directions that intersect the predetermined groove direction.

10. The operation apparatus according to claim 9, wherein the respective groove directions of the plurality of the position adjustment sections extend radially, with a predetermined center point as a center.

11. The operation apparatus according to claim 1, wherein the band member has an extension-side biasing member that biases the sliding mechanism in a direction for extending the inside circumference size.

12. The operation apparatus according to claim 1, wherein the locking member is configured to be slidable in a sliding direction of the sliding mechanism, and
   the band member has a contraction-side biasing member that biases the locking member in a direction for the locking member to lock the sliding mechanism.

13. The operation apparatus according to claim 1, wherein the sliding mechanism includes
   a sliding member that is connected to the main body member and that slides relative to the main body member,
   a first link member that is rotatably connected to the sliding member at one end of the first link member and that is connected to the other end of the belt member at an other end of the first link member, and
   a second link member that is rotatably connected to the first link member at one end of the second link member and that is rotatably connected to the main body member at an other end of the second link member; and the locking member locks either a connection portion between the sliding member and the first link member or a connection portion between the first link member and the second link member.

14. The operation apparatus according to claim 13, wherein the first link member has a bulging member according to a recess in the palm of the one hand.

15. The operation apparatus according to claim 1, wherein the band member has an operation member that releases locking of the sliding mechanism by the locking member.

* * * * *